United States Patent [19]
Vynne et al.

[11] Patent Number: 5,960,081
[45] Date of Patent: Sep. 28, 1999

[54] EMBEDDING A DIGITAL SIGNATURE IN A VIDEO SEQUENCE

[75] Inventors: Thorbjorn Vynne, Aalborg, Denmark; Frederic Jordan, Les Rasalys, Switzerland

[73] Assignee: Cray Research, Inc., Eagan, Minn.

[21] Appl. No.: 08/869,792

[22] Filed: Jun. 5, 1997

[51] Int. Cl.$^6$ ............................ H04N 7/167; H04N 7/00; G09C 3/00
[52] U.S. Cl. ........................... 380/10; 348/461; 348/467; 380/14; 380/54
[58] Field of Search ................................ 380/14, 10, 20, 380/23, 54; 348/461, 467

[56] References Cited

U.S. PATENT DOCUMENTS

| | | | |
|---|---|---|---|
| 4,901,349 | 2/1990 | Metzger et al. | 380/11 |
| 5,034,981 | 7/1991 | Leonard et al. | 380/5 |
| 5,206,906 | 4/1993 | McNair | 380/14 |
| 5,208,857 | 5/1993 | Lebrat | 380/14 |
| 5,398,068 | 3/1995 | Liu et al. | 348/416 |
| 5,434,995 | 7/1995 | Oberlin et al. | 395/550 |
| 5,650,829 | 7/1997 | Sugimoto et al. | 348/699 |

OTHER PUBLICATIONS

Bender, W., et al., "Techniques for Data Hiding", *SPIE*, *2420*, 164–173, (1995).

Burgett, S., et al., "A Novel Method for Copyright Labeling Digitized Image Data". 12 pages.

Matsui, K., et al., "Video–Steganography: How to Secretly Embed a Signature in a Picture", *Interactive Multimedia Association: Intellectual Property Project Proceedings, vol. 1*, 187–206, (Jan. 1994).

van Schyndel, R.G., et al., "A Digital Watermark", *Proc. ICIP–94, vol. II*, Austin, TX, IEEE Computer Society Press, 86–90, (Nov. 13–16, 1994).

Zhao, J., "Look, It's Not There", *Byte*, http://www.byte.com/art/9701/sec18/artl.htm, 1–5, (Jan. 1997).

*Primary Examiner*—Stephen C. Buczinski
*Attorney, Agent, or Firm*—Schwegman, Lundberg, Woessner, and Kluth, P.A.

[57] ABSTRACT

Method and apparatus for watermarking digital video material by embedding a digital signature. One embodiment of the system integrates the embedding procedure into a block-based compression scheme. In one embodiment, a 32-bit digital signature is embedded into the x- and y-coordinates of motion vectors. Since not all motion vectors are suitable for coding (with regard to objectionable visible artifacts), three hybrid selection criteria have been developed for determining whether or not to code a motion vector. A probabilistic coding procedure has also been developed to avoid problems that arise when fewer than 16 blocks and/or vectors (where 16 vectors correspond to 32 bits) can be coded in a frame. One such procedure makes use of binary random sequences to virtually code the signature into the motion vectors. The system has been implemented on a CRAY T3D massively parallel supercomputer, where a near-real-time (5 frames per second) embedding of the signature is obtainable. The results show that it is possible to embed and retrieve a 32-bit signature if enough blocks over time are selected.

36 Claims, 59 Drawing Sheets

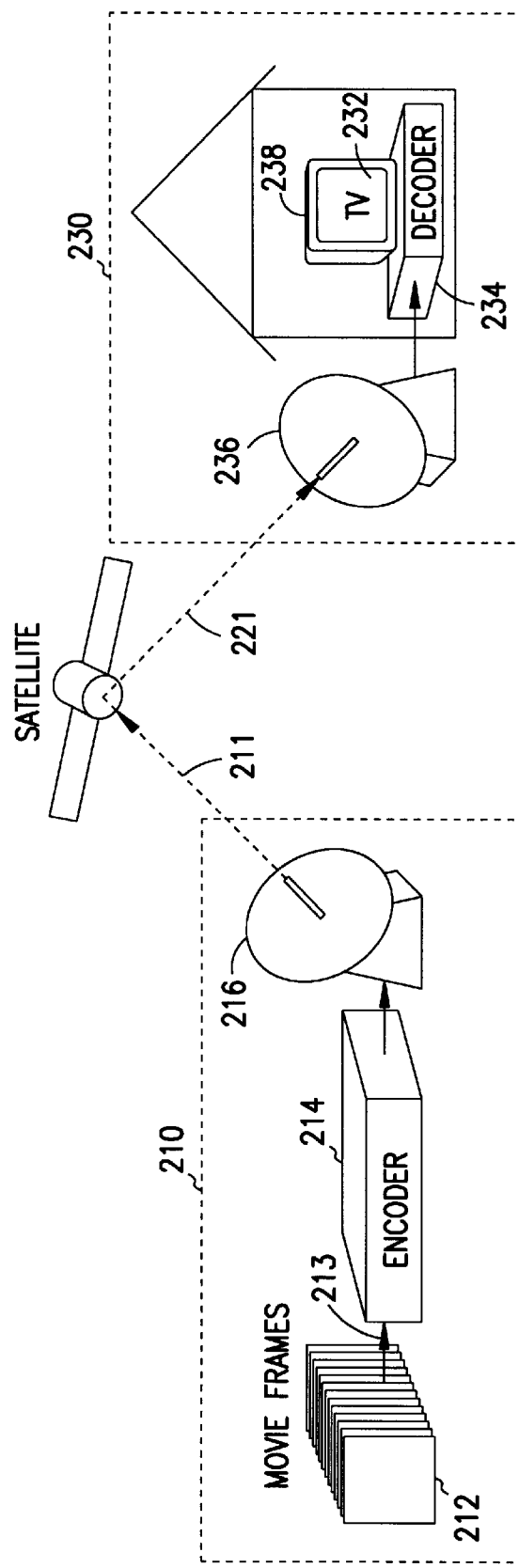
FIG. 2.1

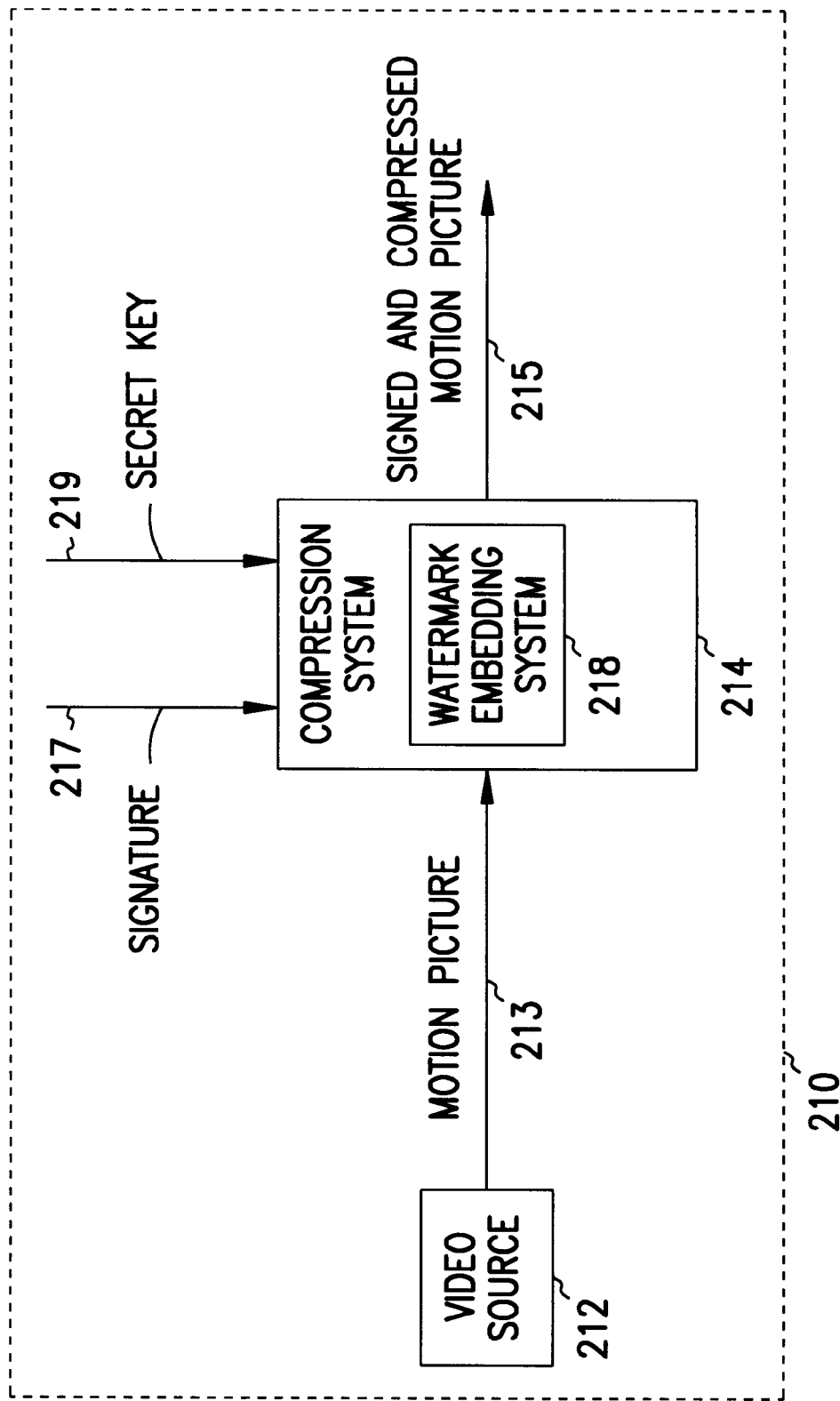
FIG. 2.2

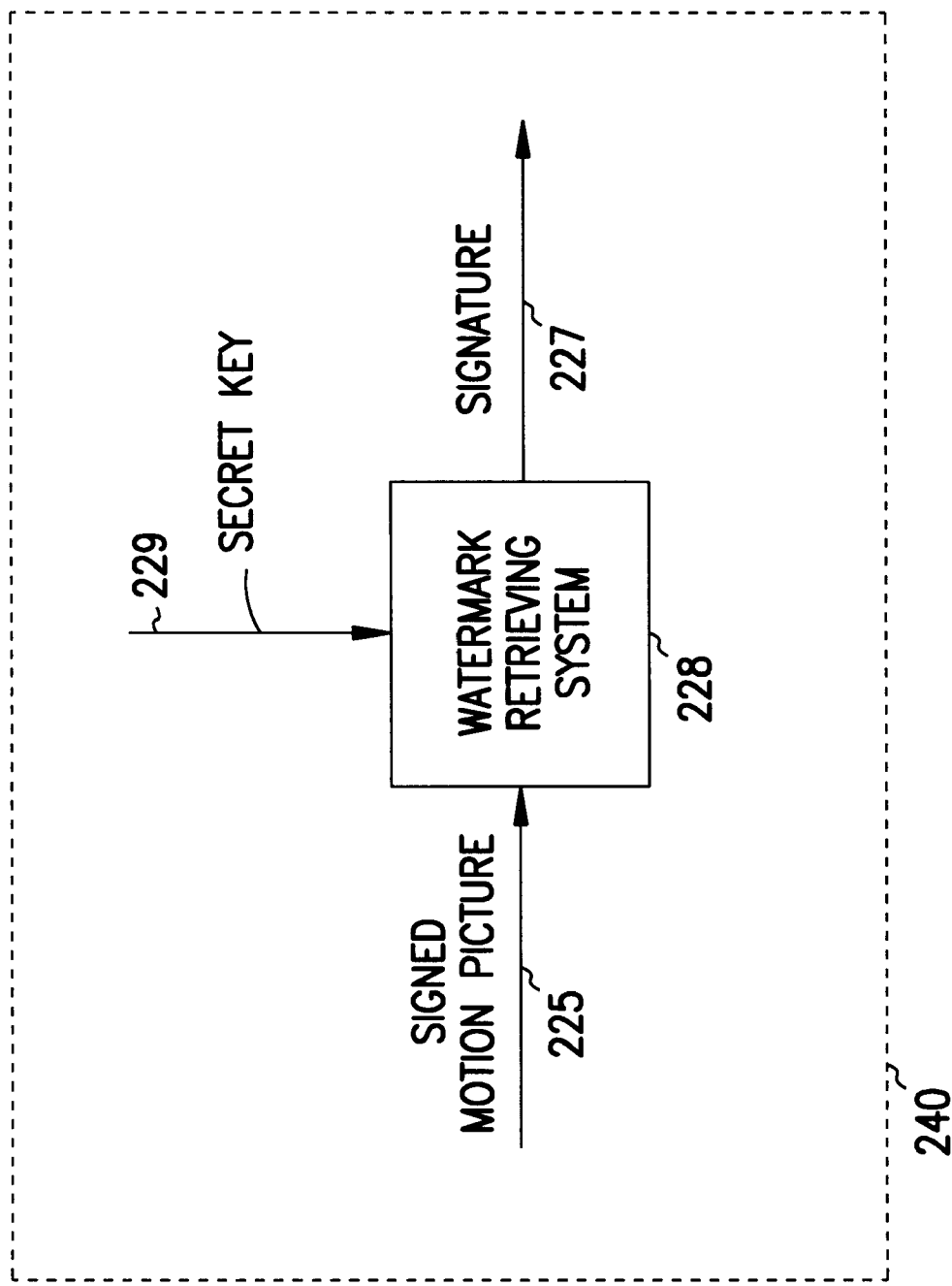
FIG. 2.3

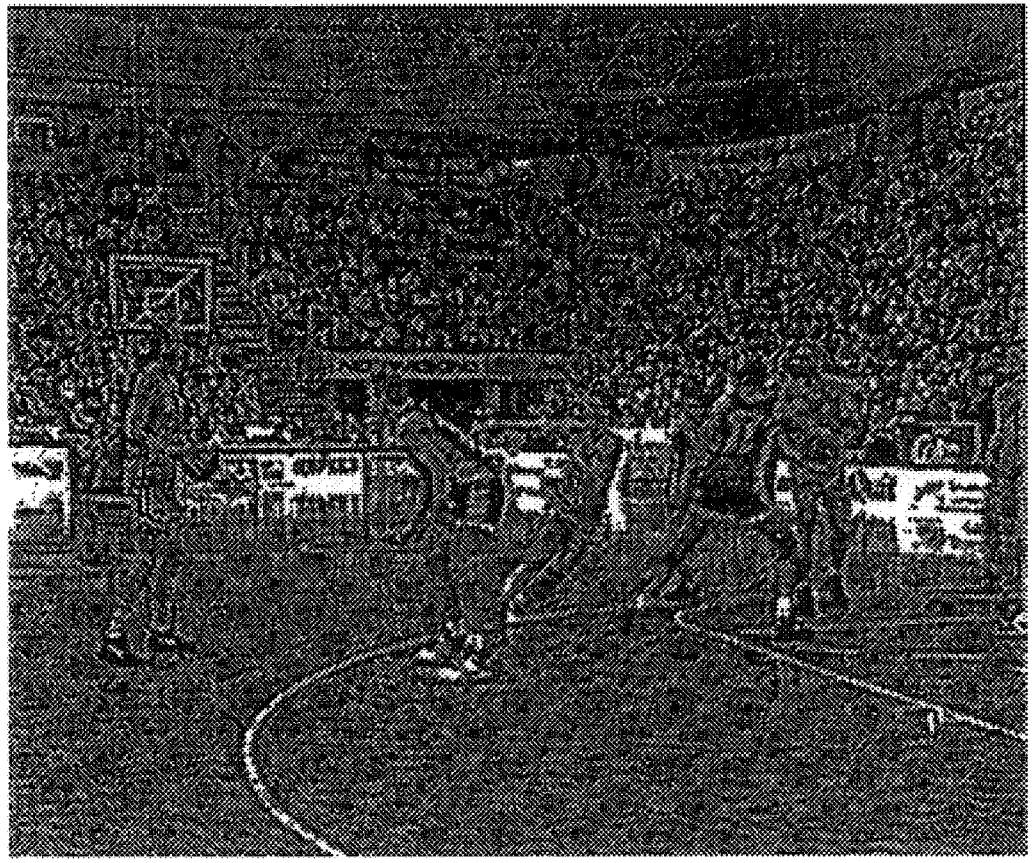
FIG. 2.4A

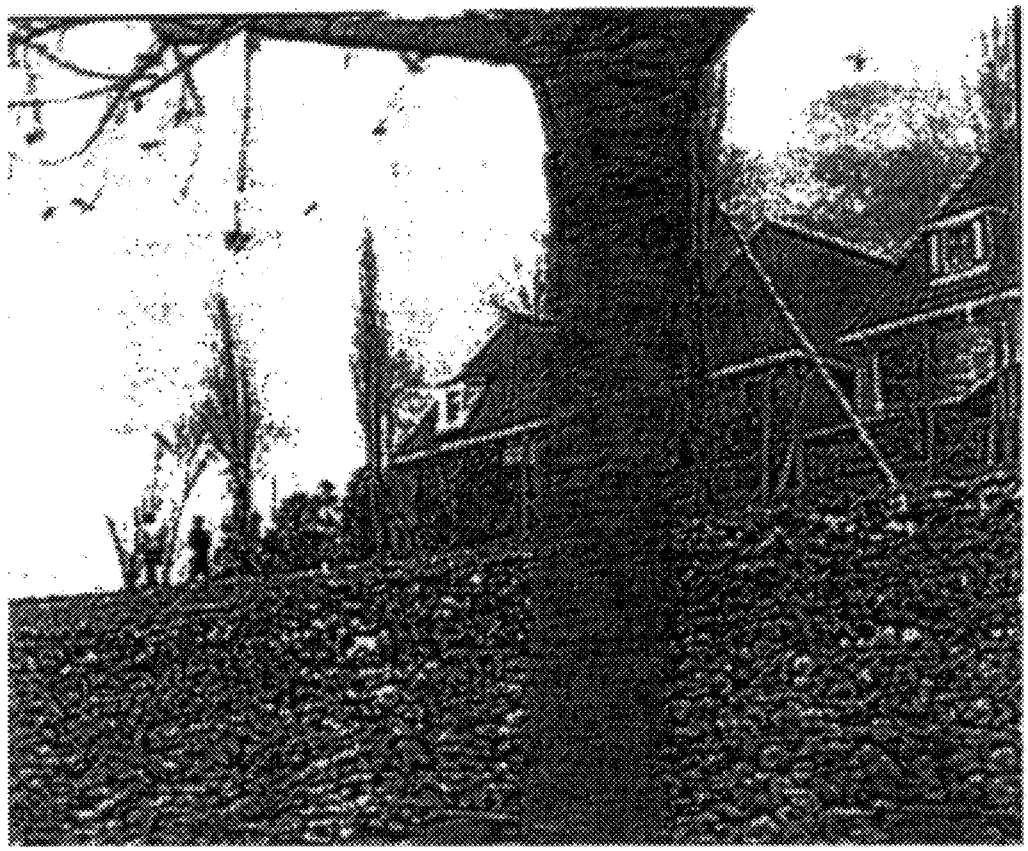
FIG. 2.4B

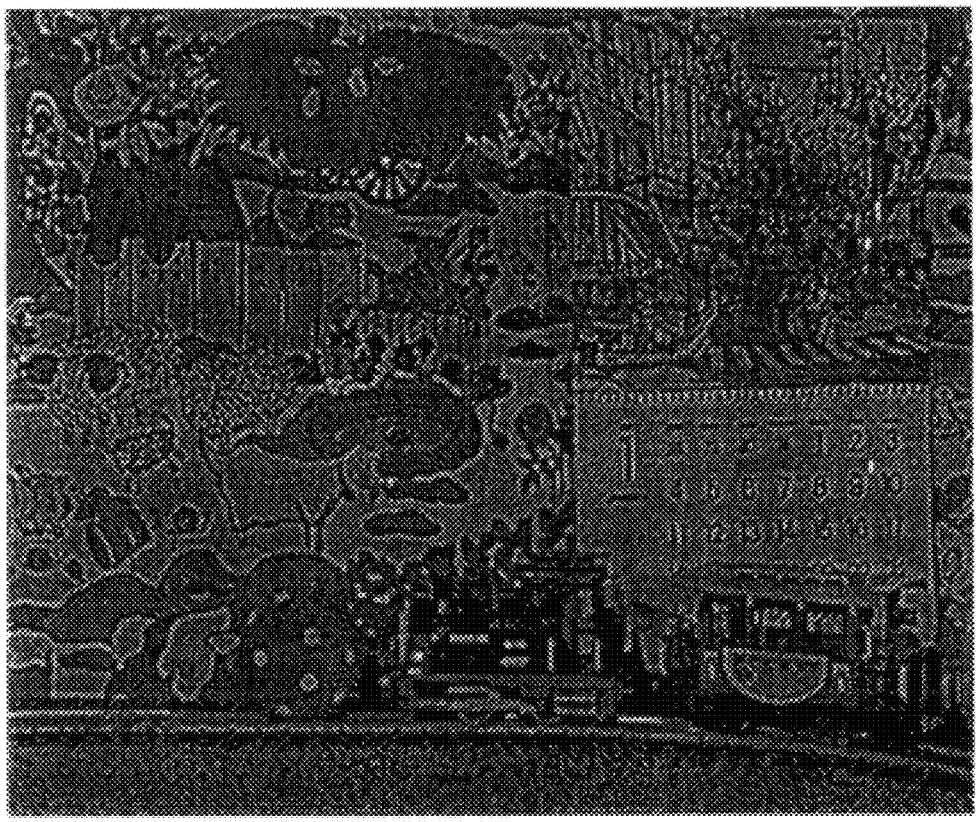
FIG. 2.4C

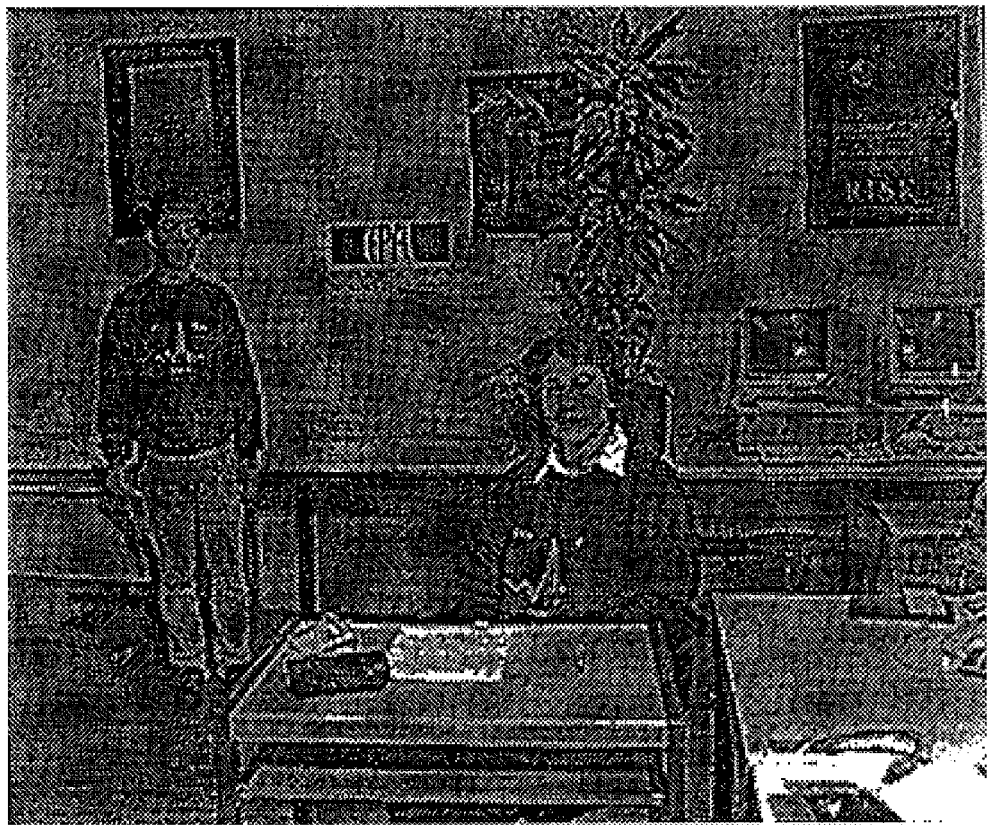
FIG. 2.4D

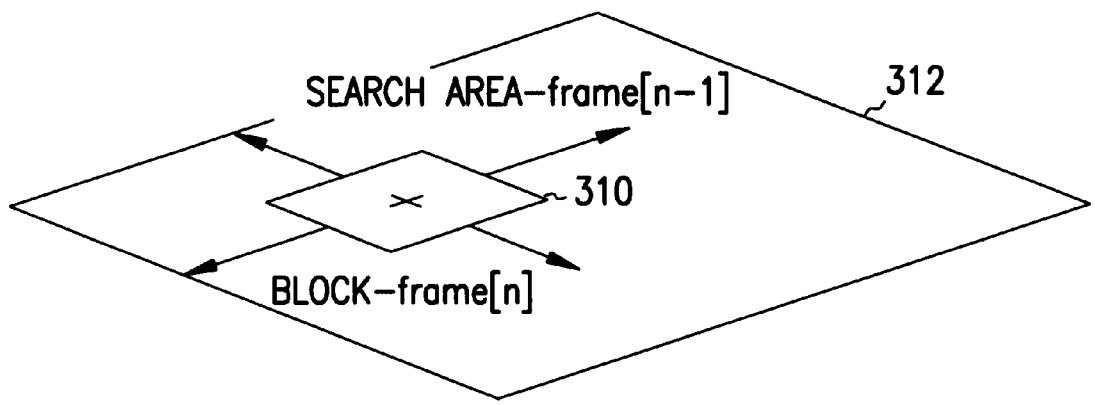
FIG. 3.1A

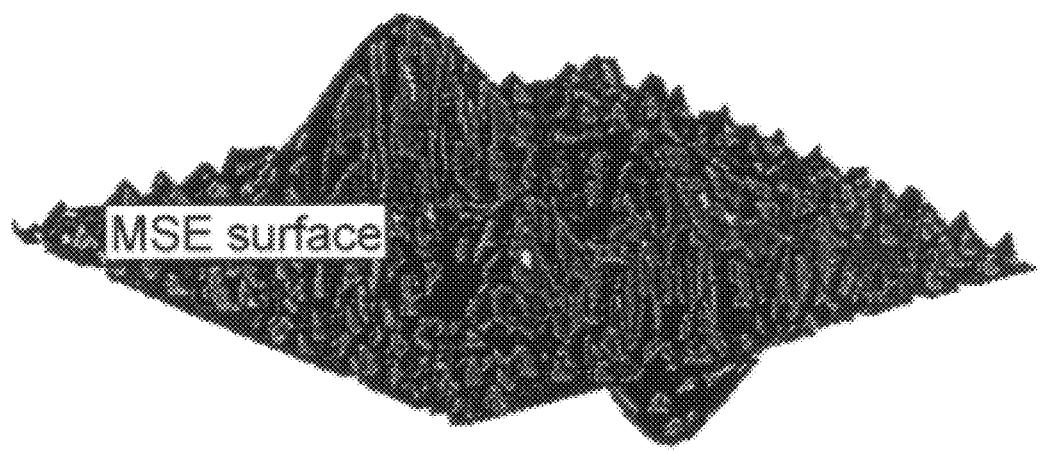
FIG. 3.1B

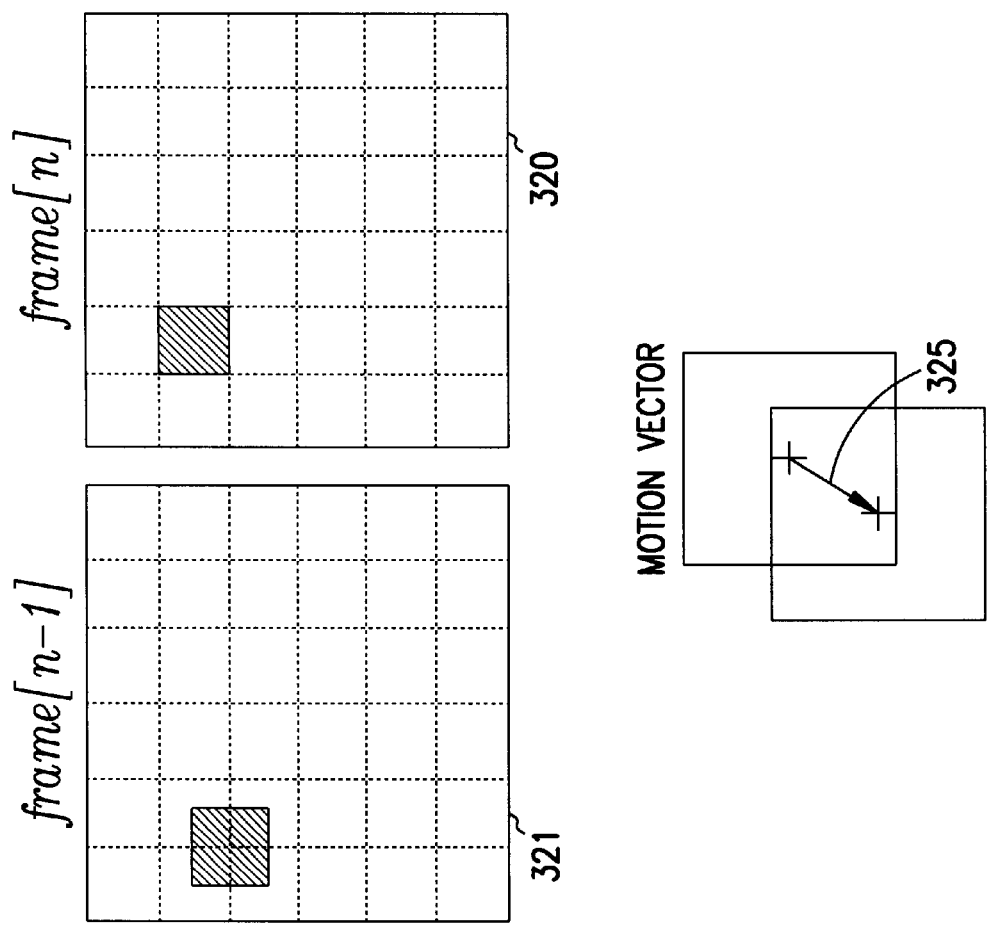
FIG. 3.2

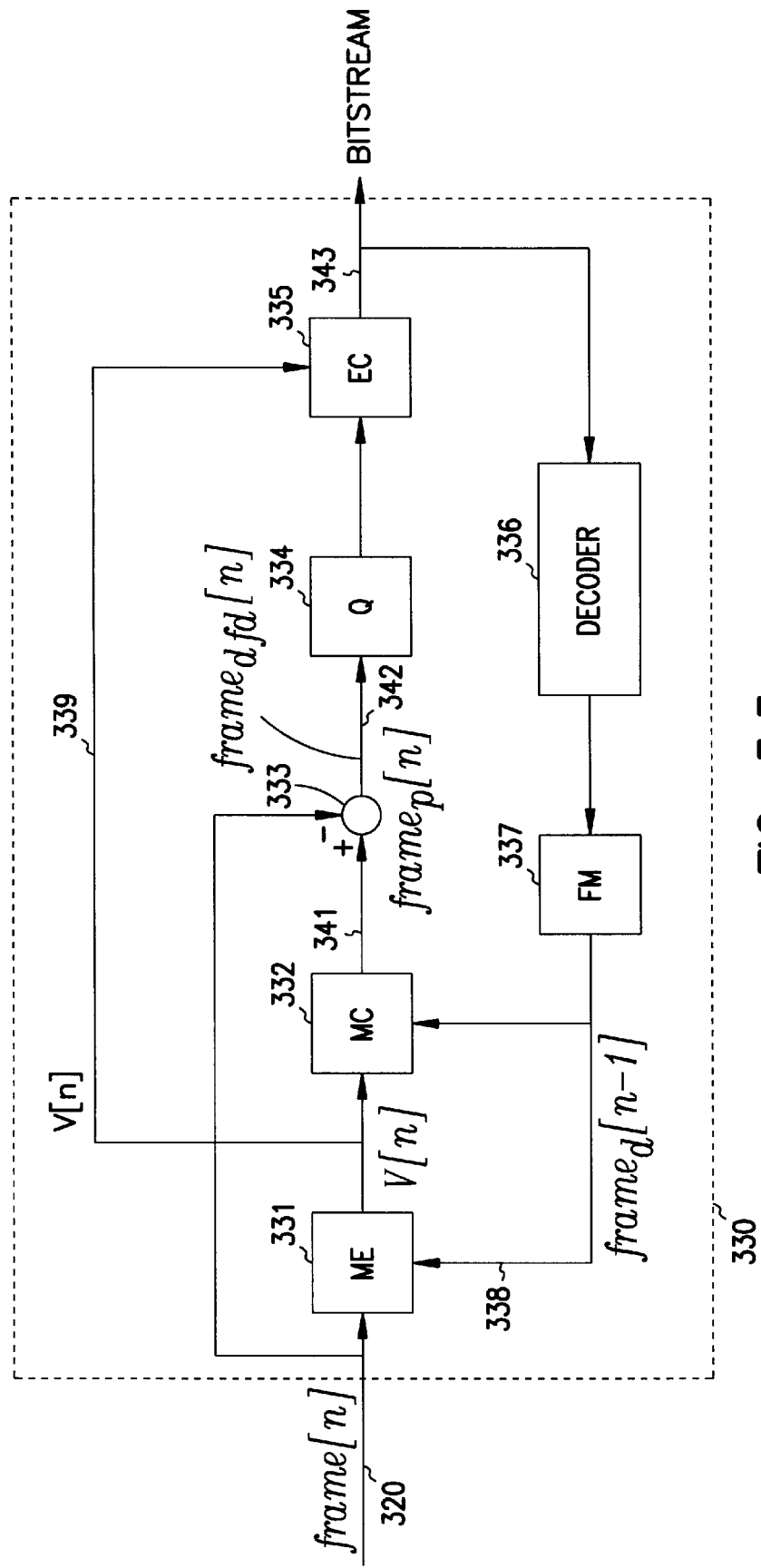
FIG. 3.3

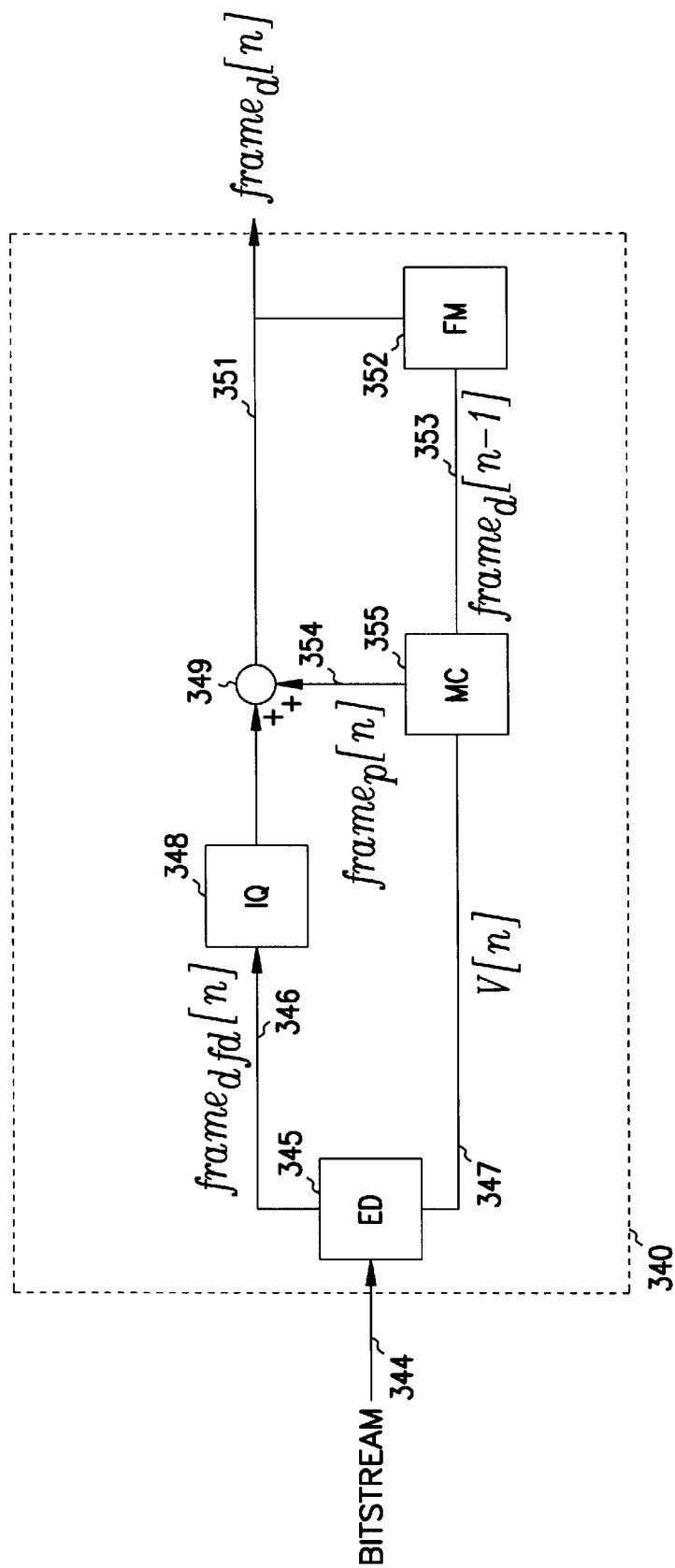
FIG. 3.4

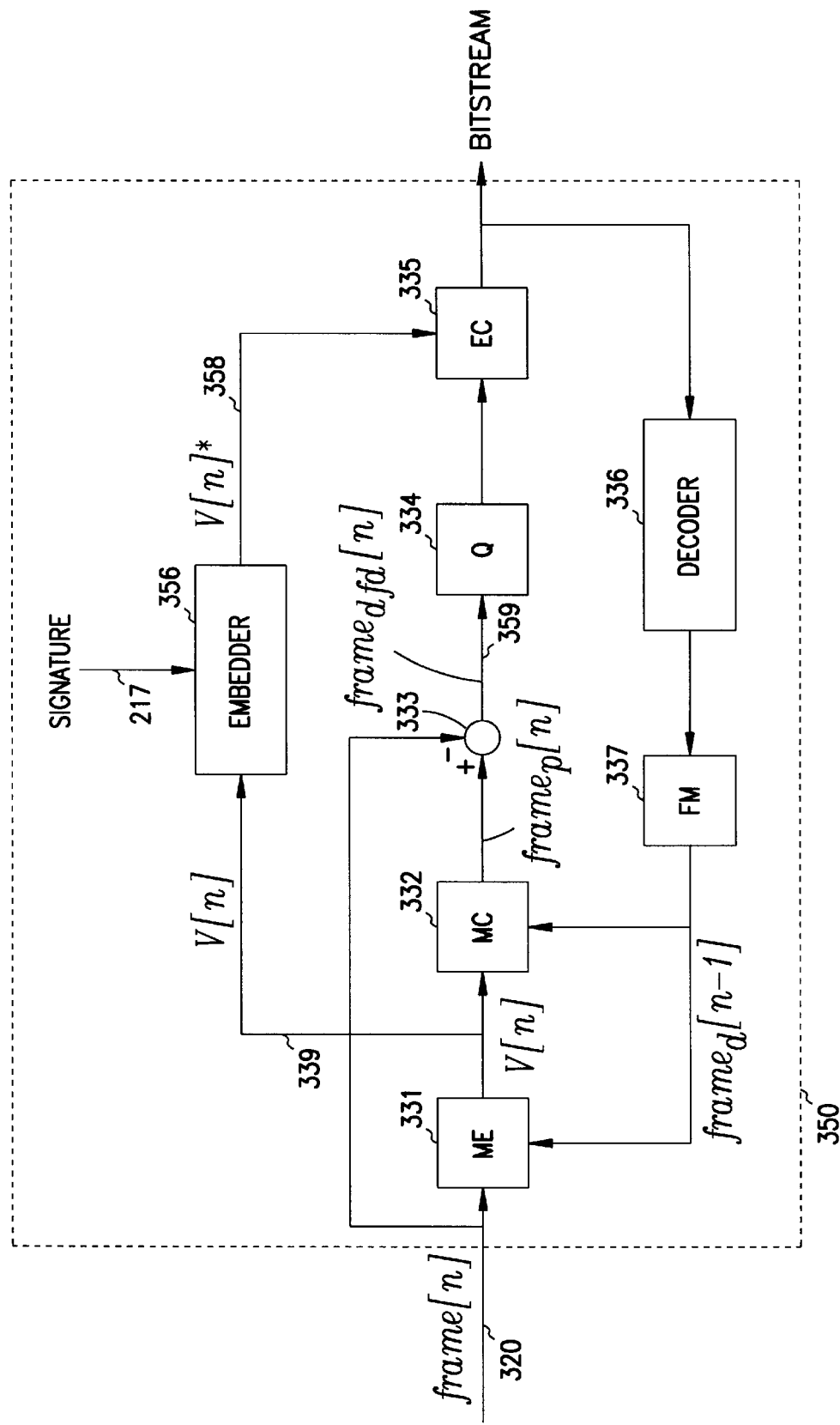
FIG. 3.5

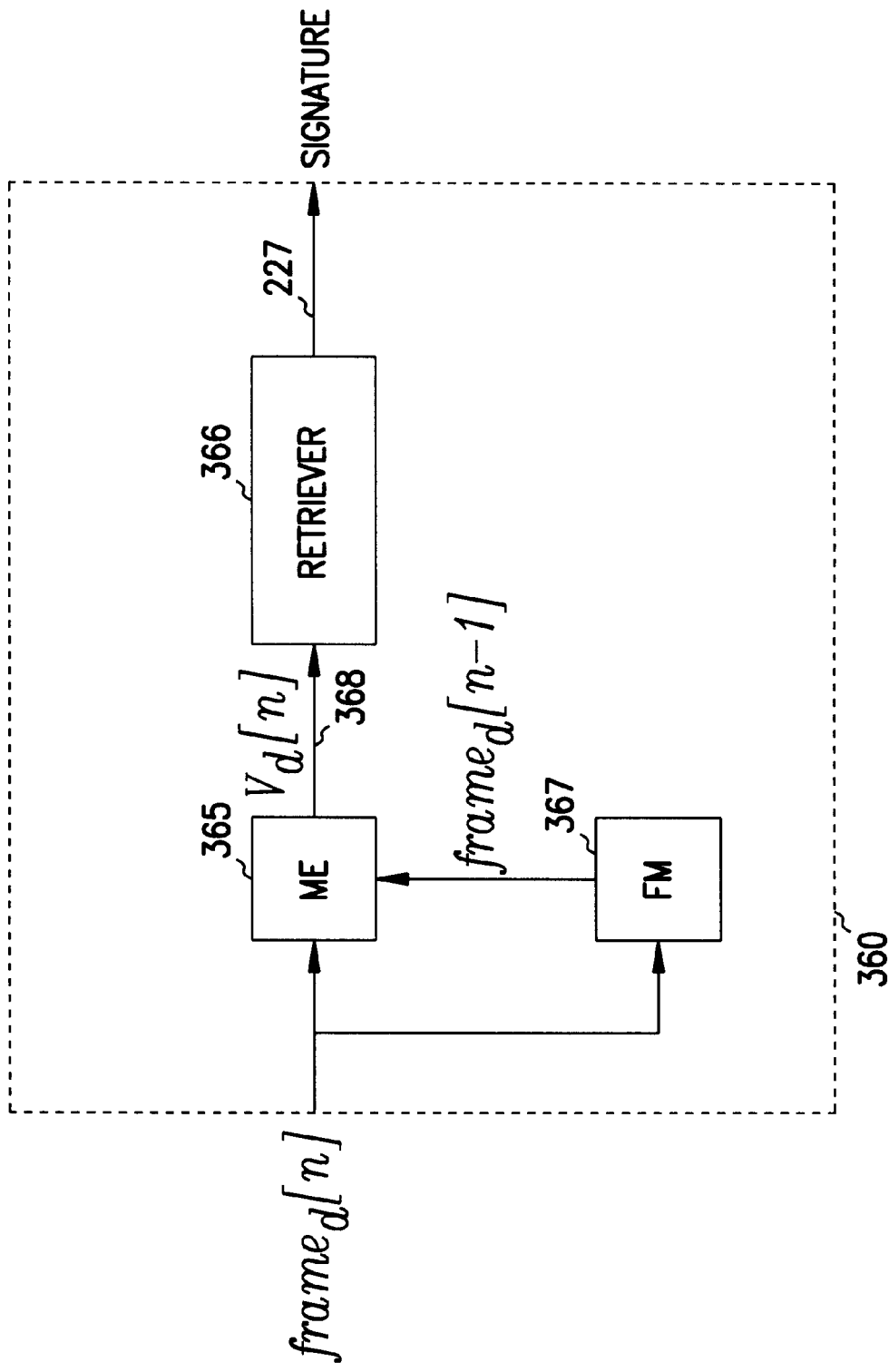
FIG. 3.6

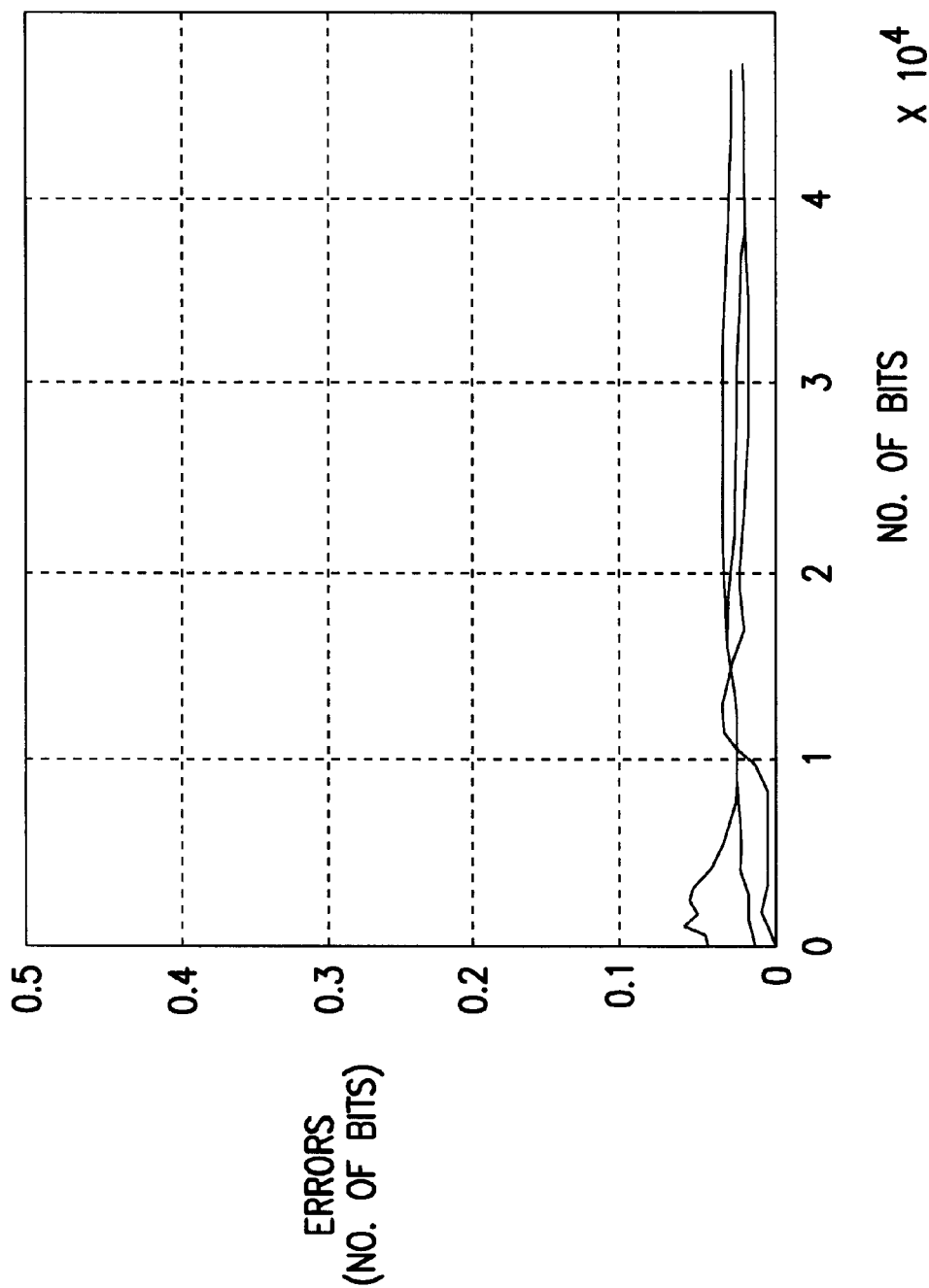
FIG. 3.7

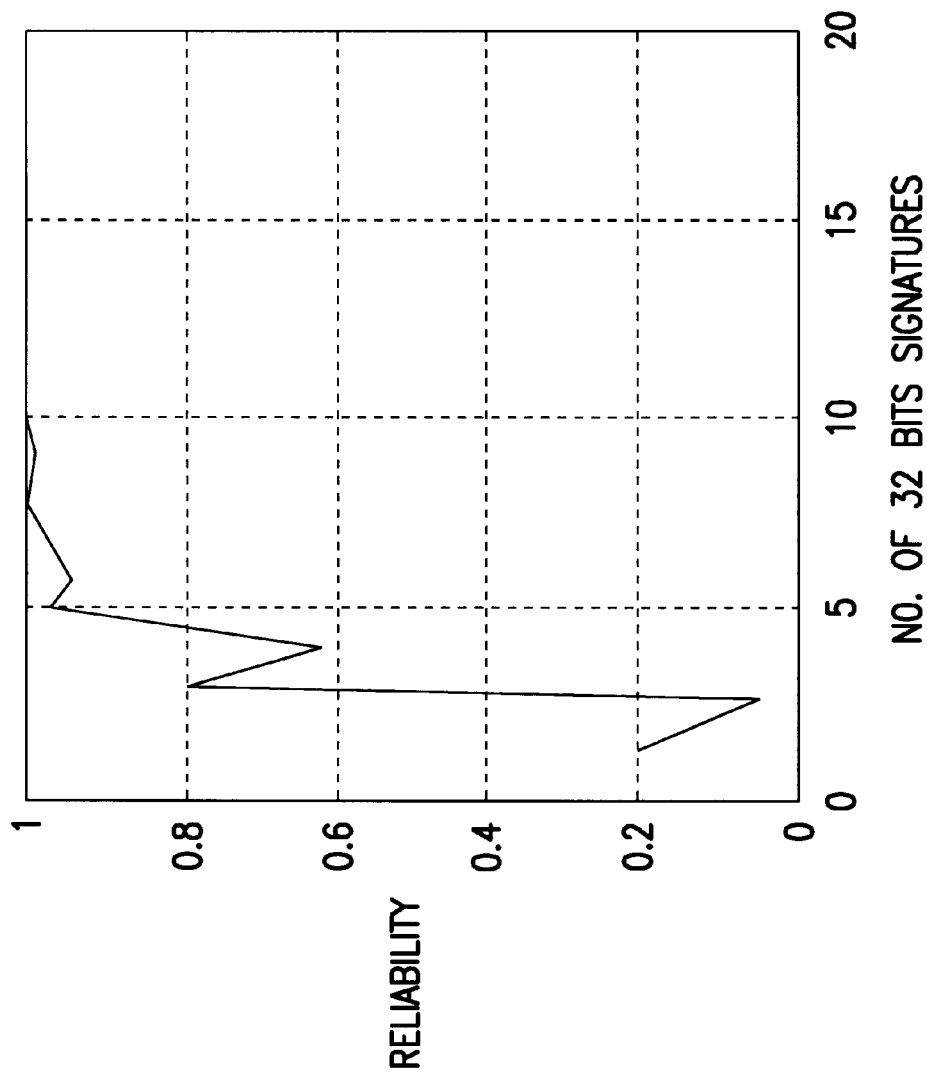
FIG. 3.8

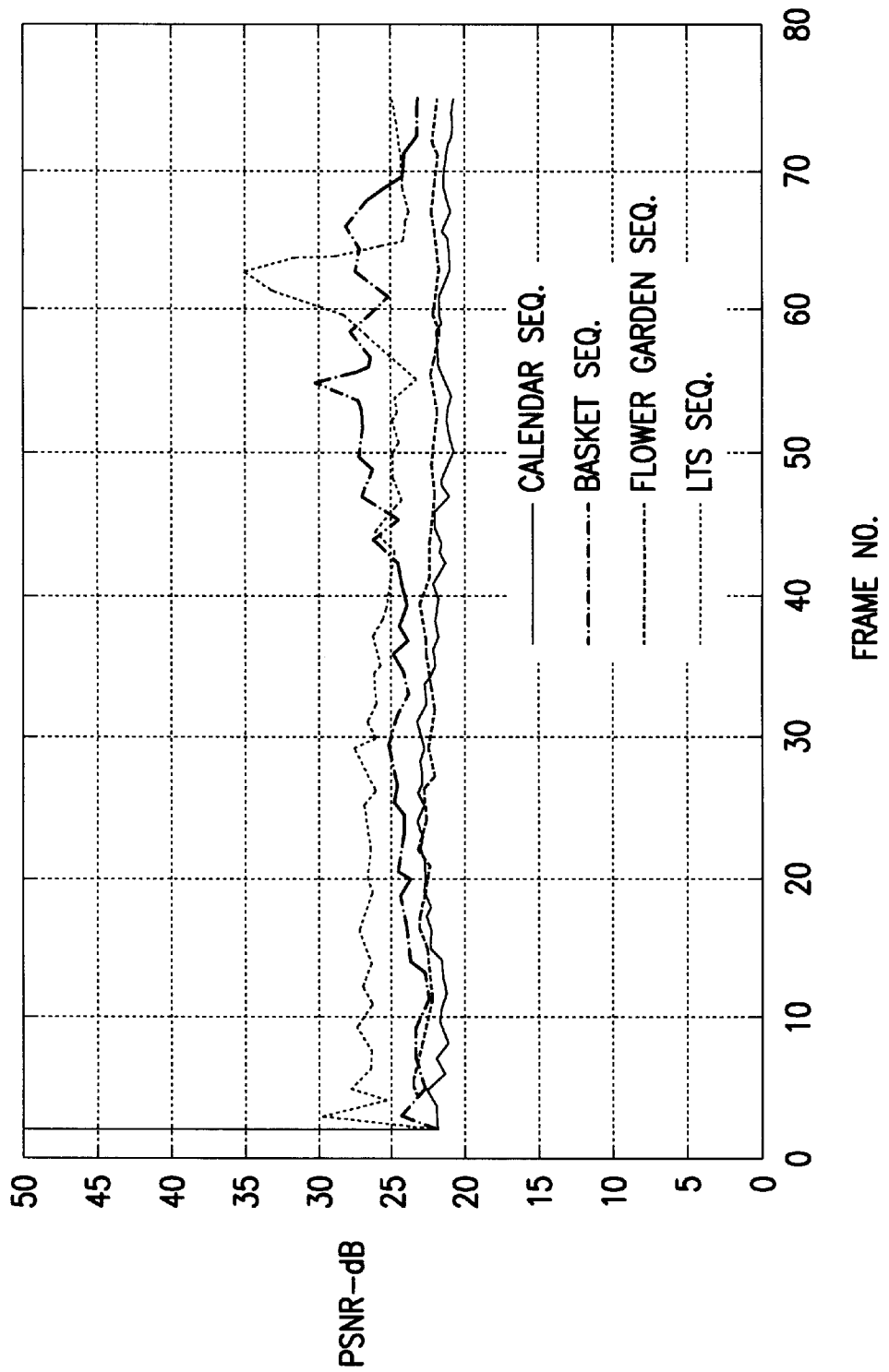
FIG. 3.9

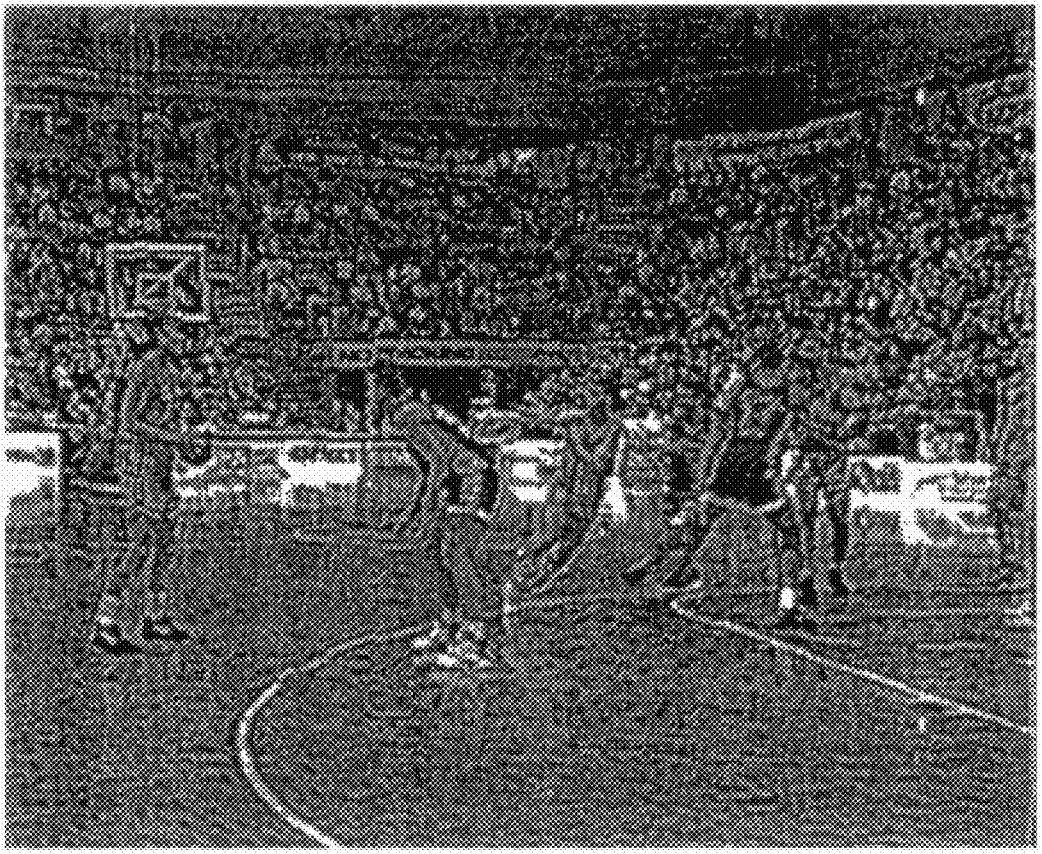
FIG. 3.10A

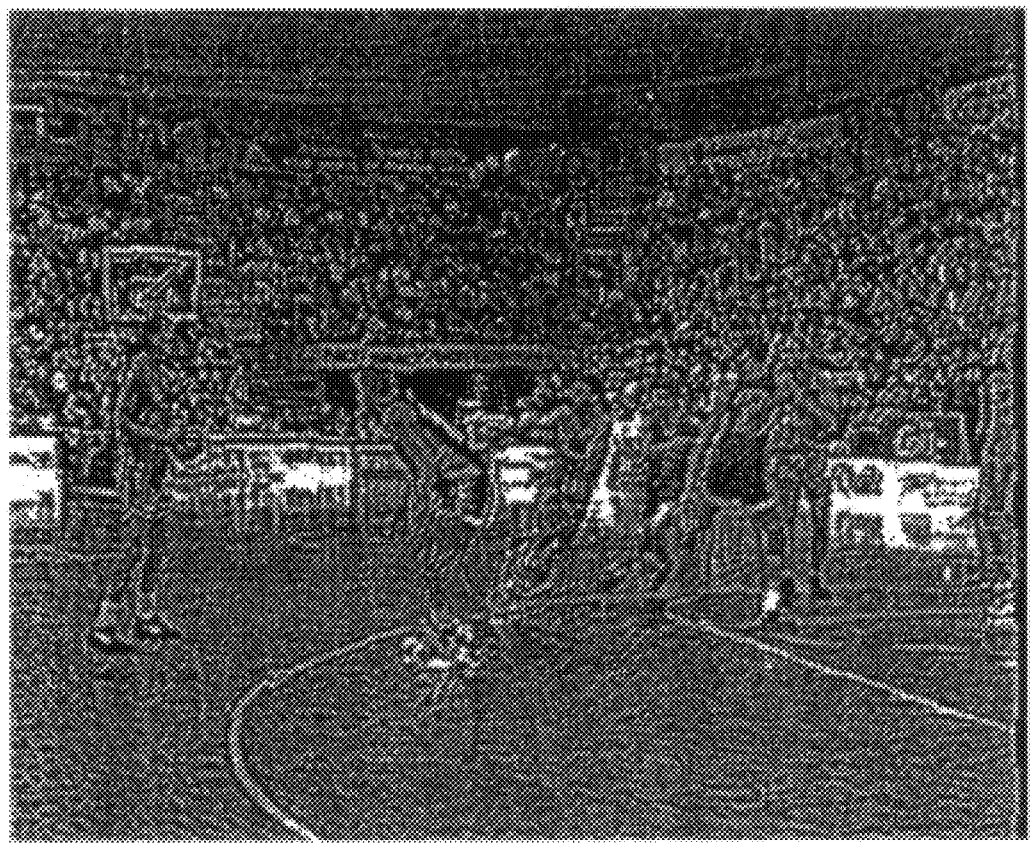
FIG. 3.10B

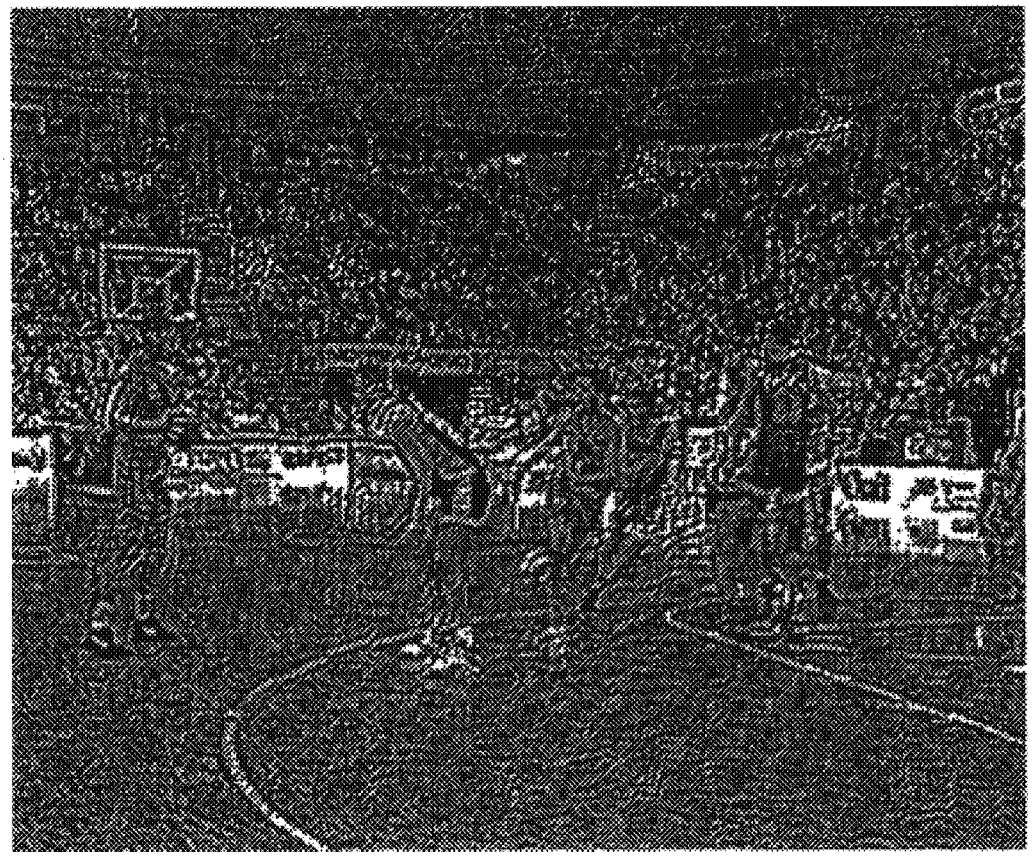
FIG. 3.10C

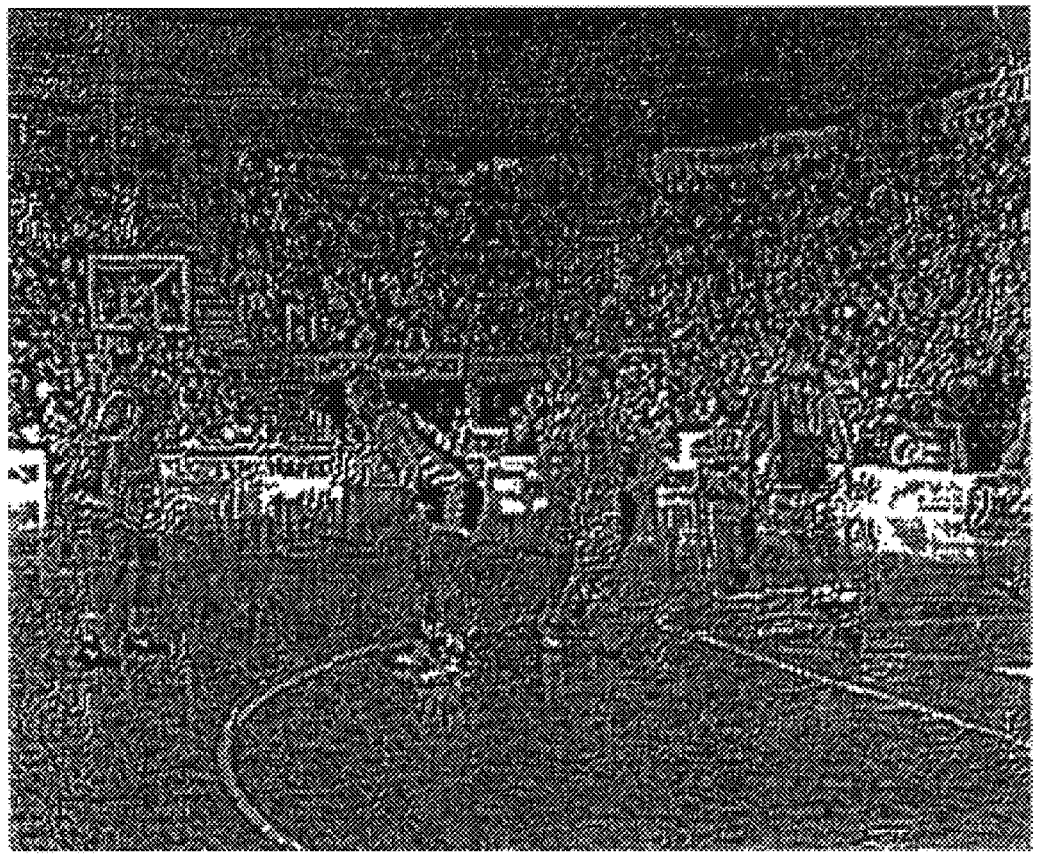
FIG. 3.10D

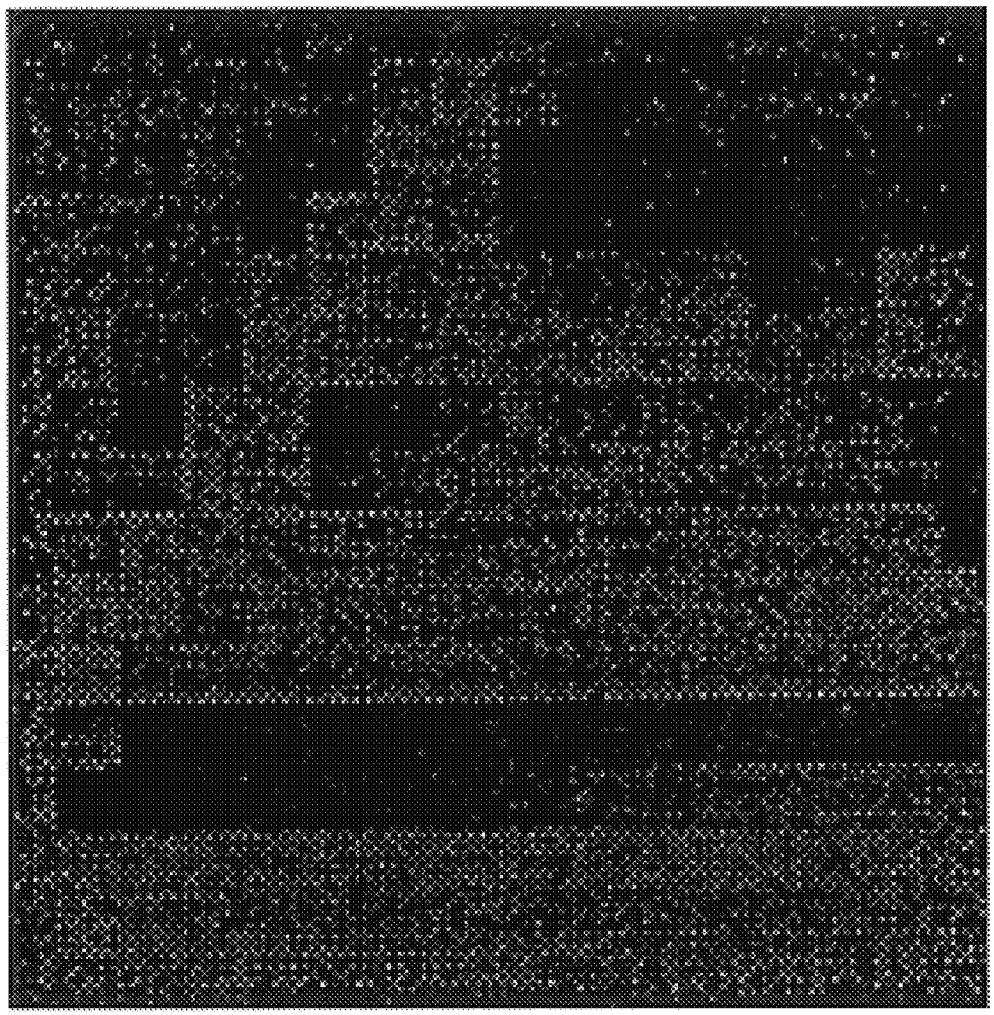
FIG. 4.1A

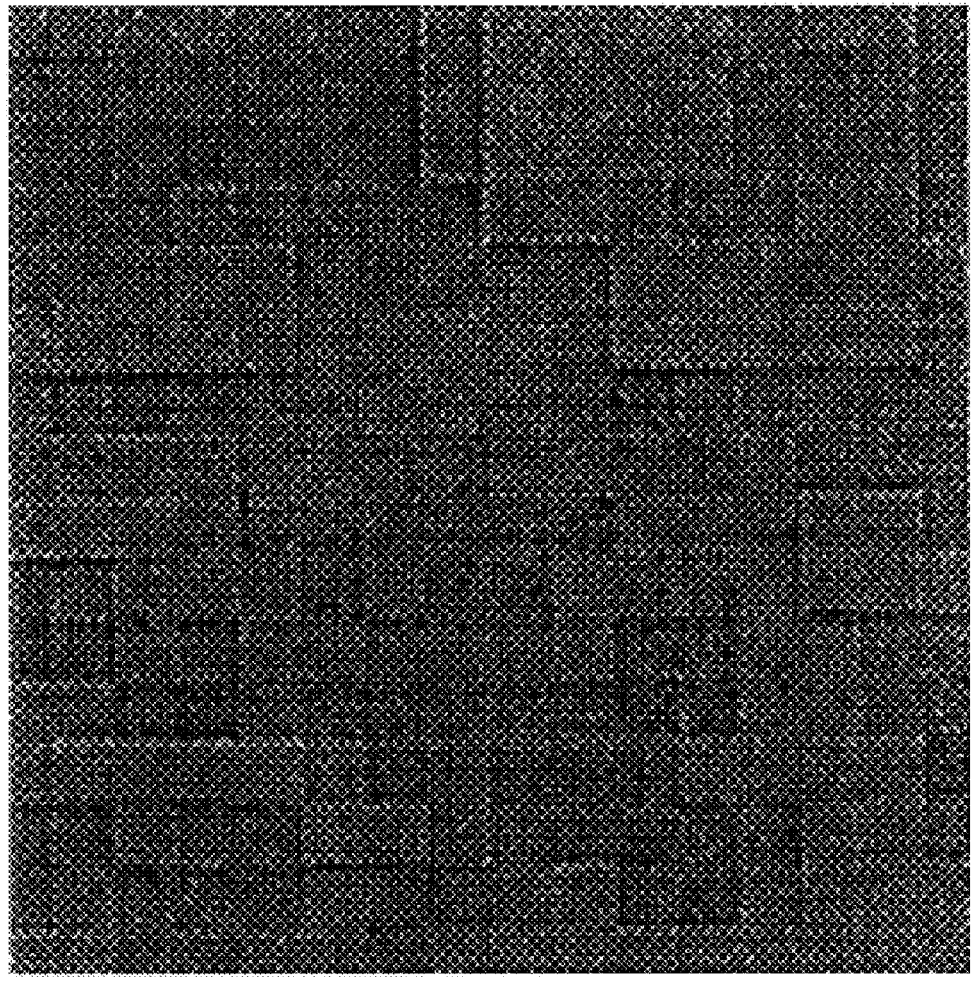
FIG. 4.1B

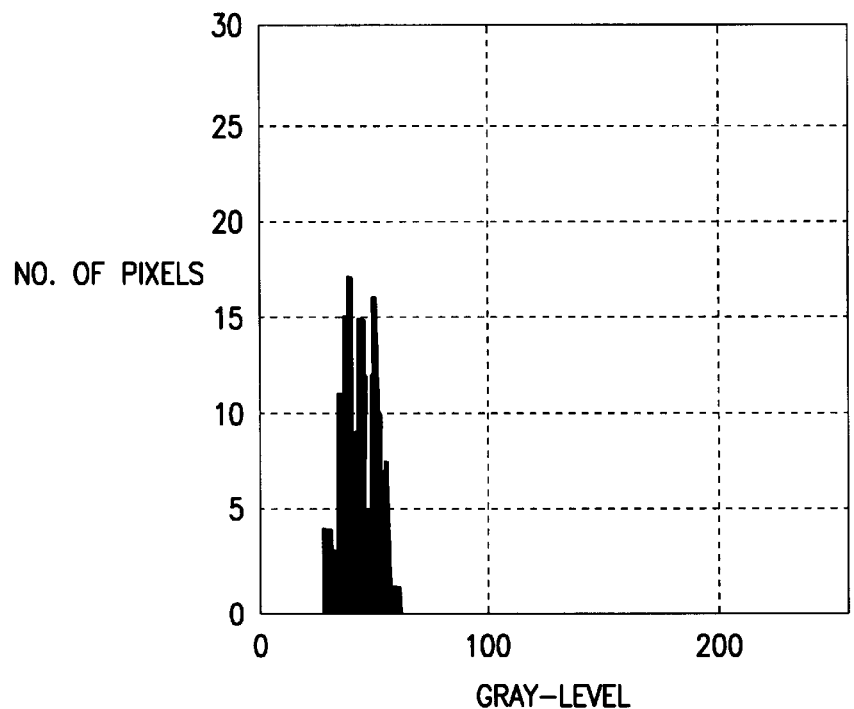
FIG. 4.2A
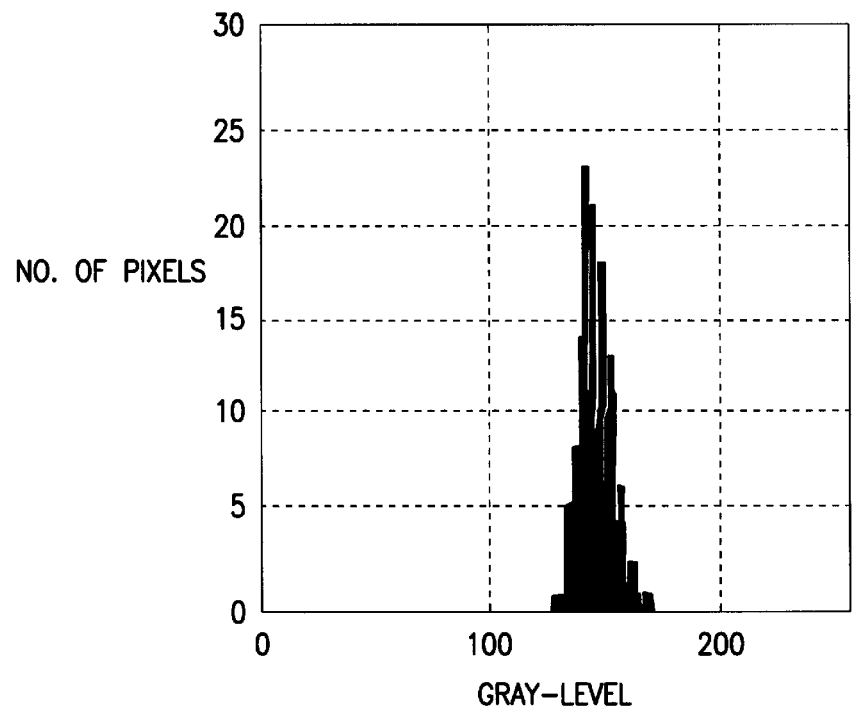
FIG. 4.2B

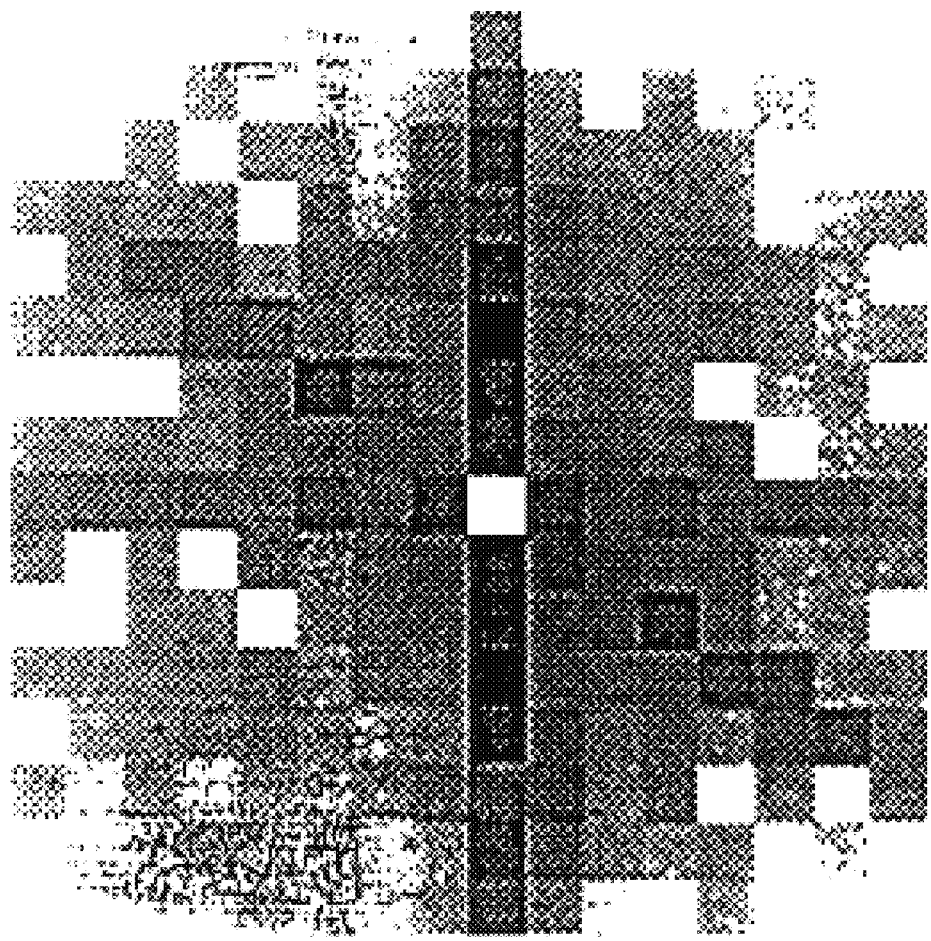
FIG. 4.3A

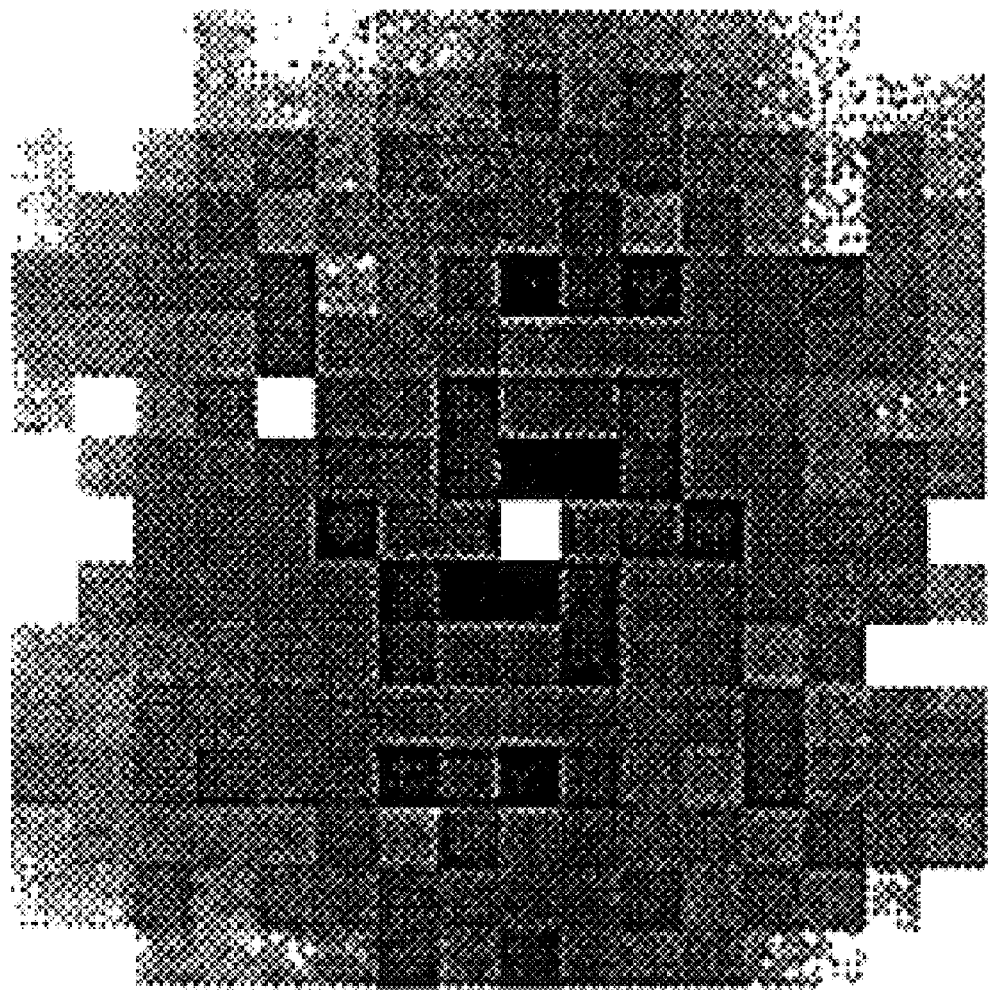
FIG. 4.3B

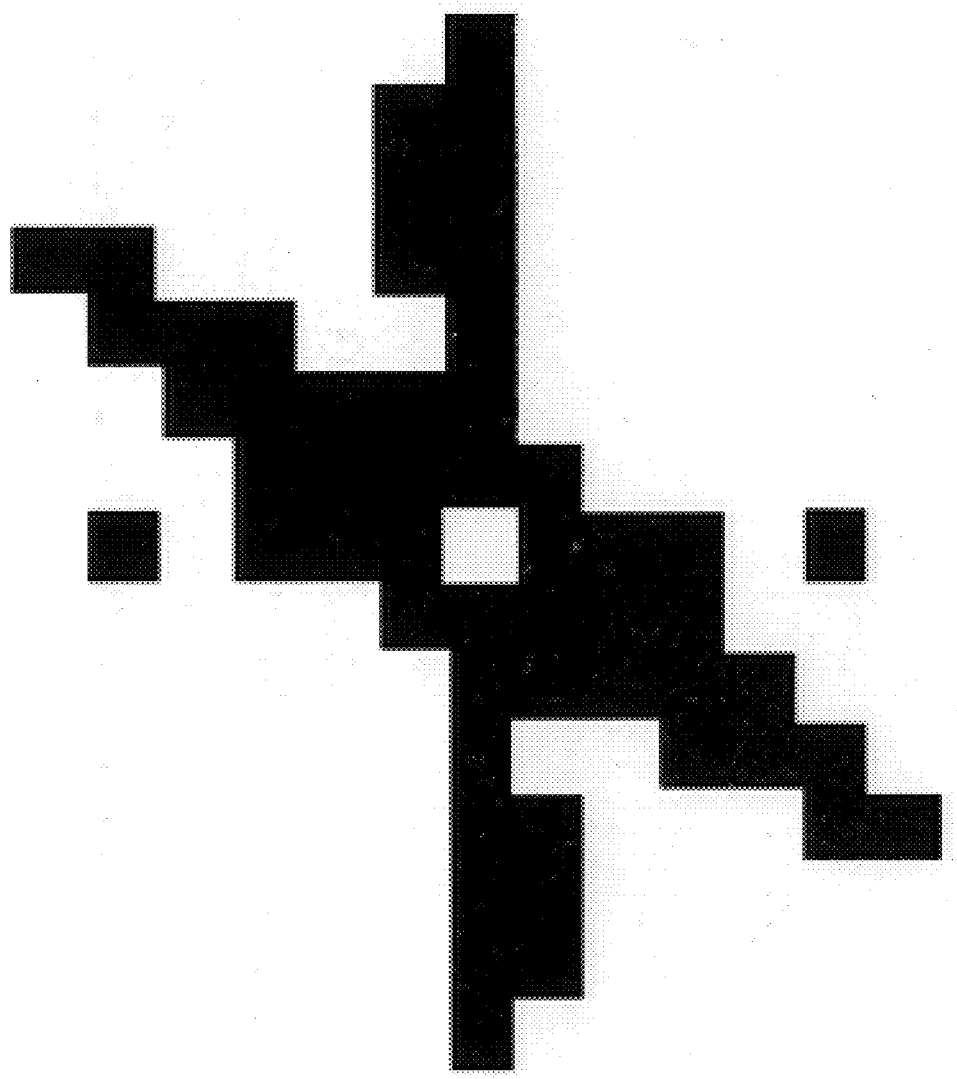
FIG. 4.3C

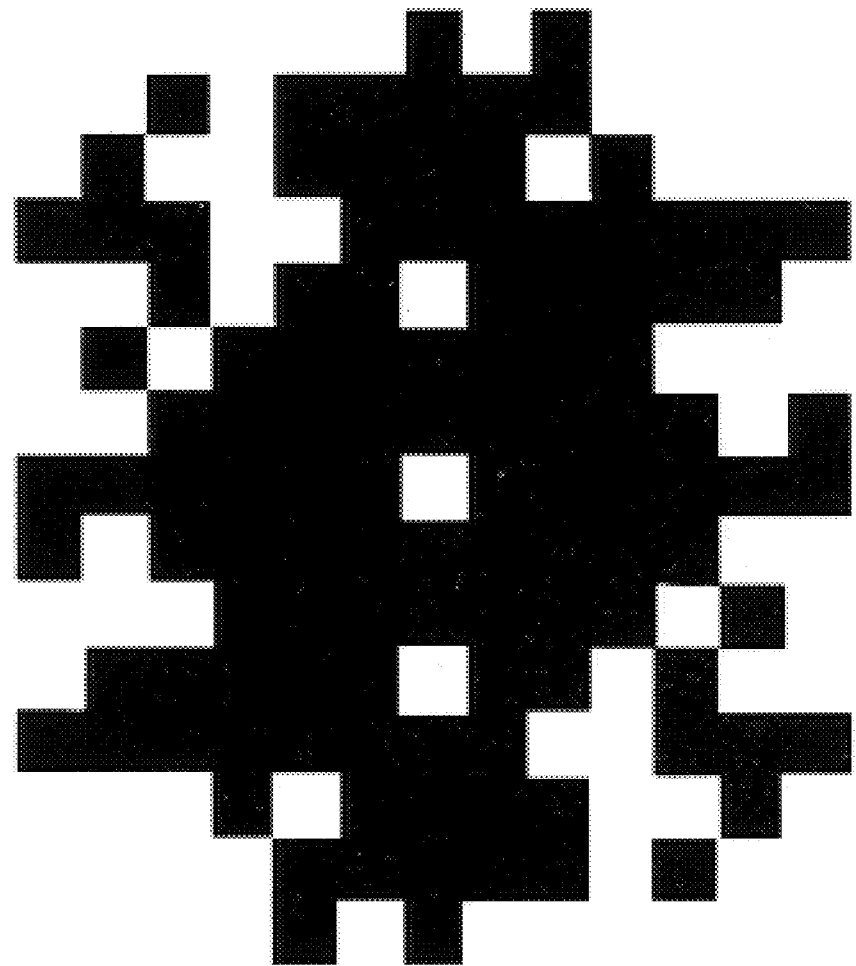
FIG. 4.3D

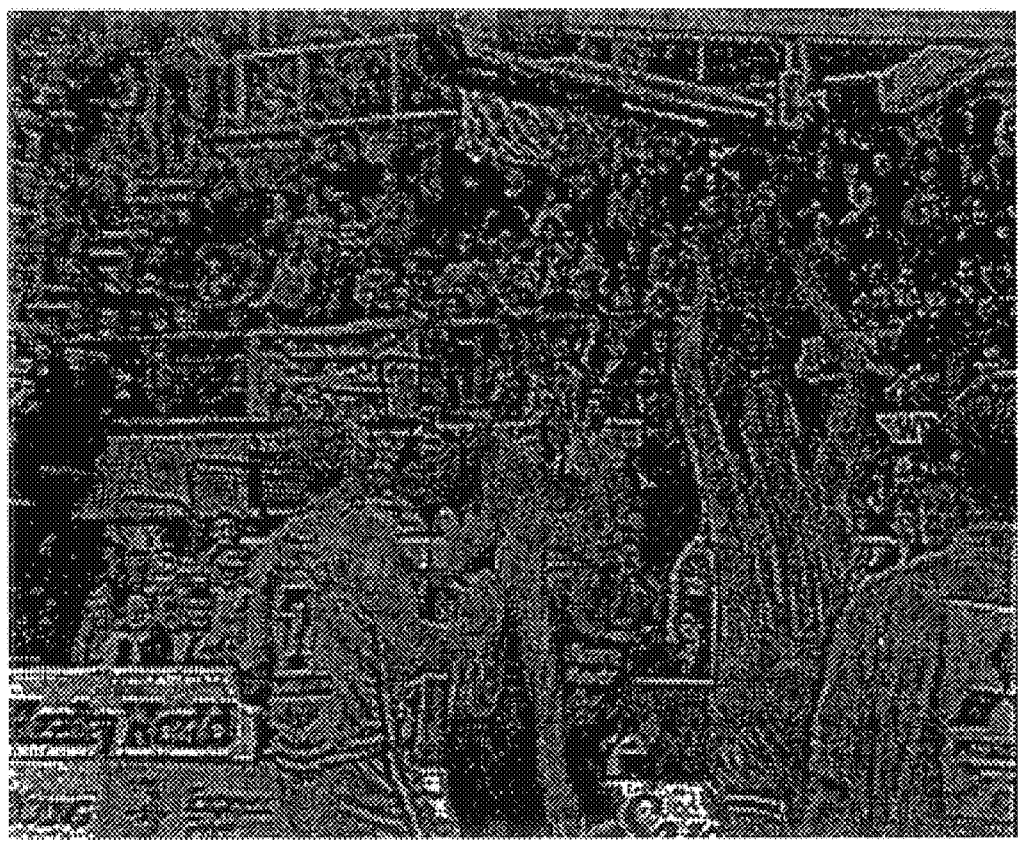
FIG. 4.5A

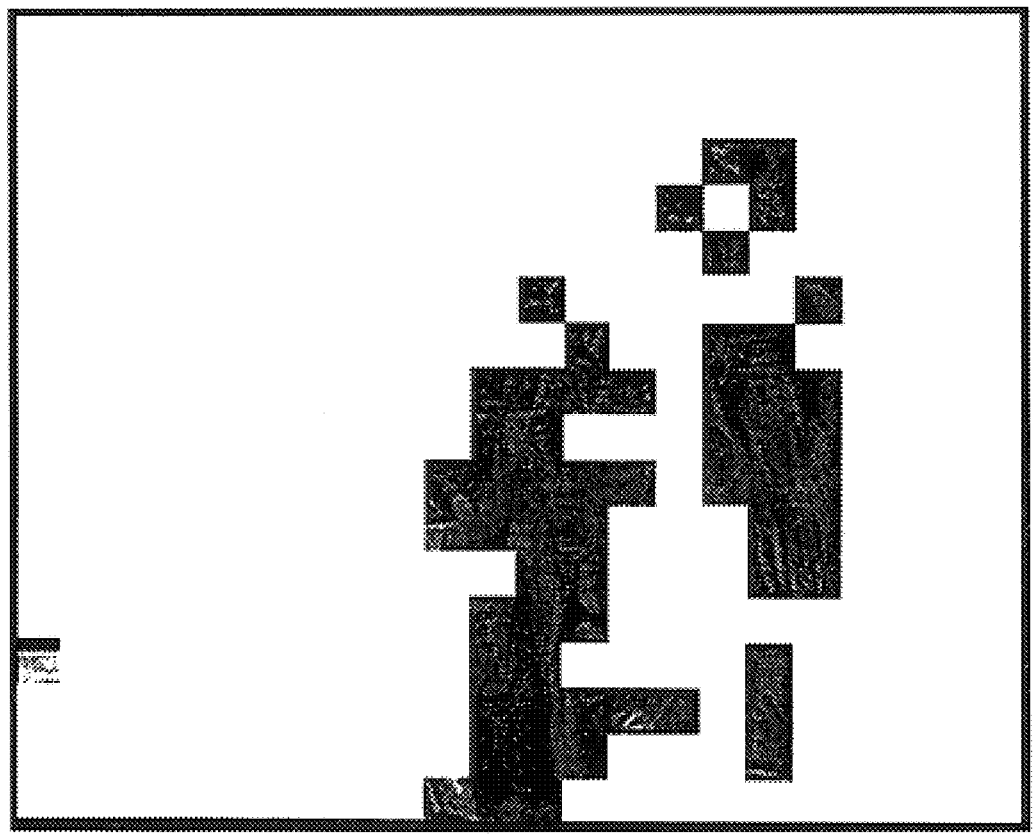
FIG. 4.5B

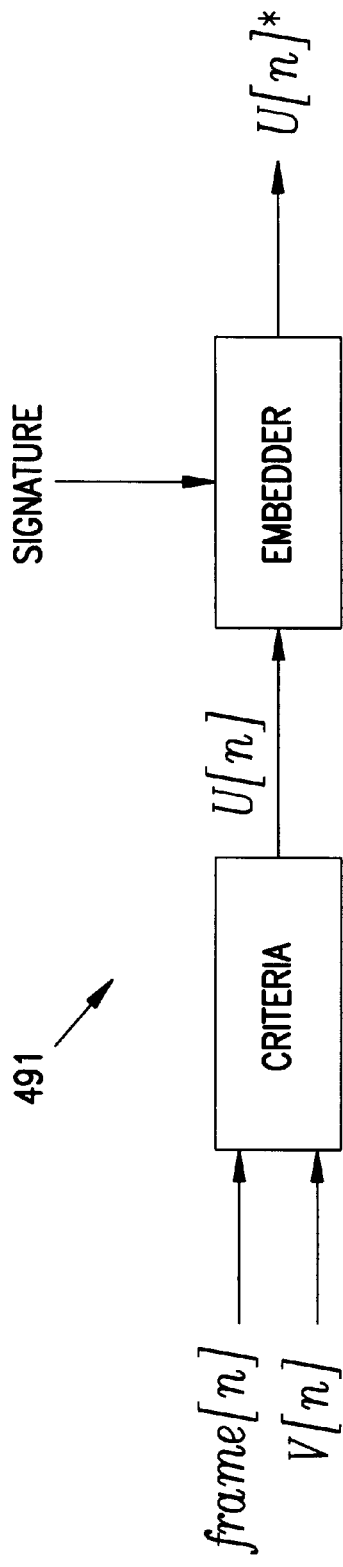
FIG. 4.9A
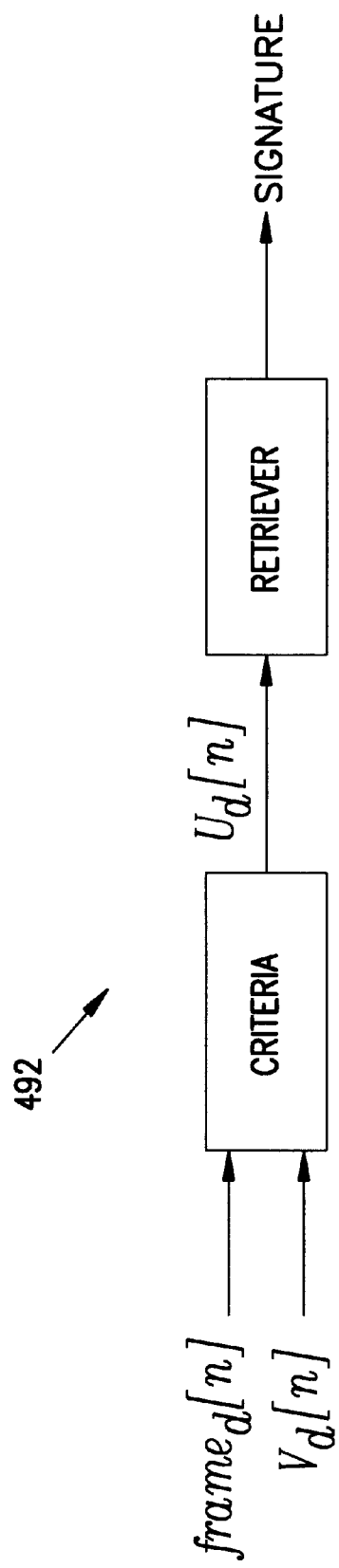
FIG. 4.9B

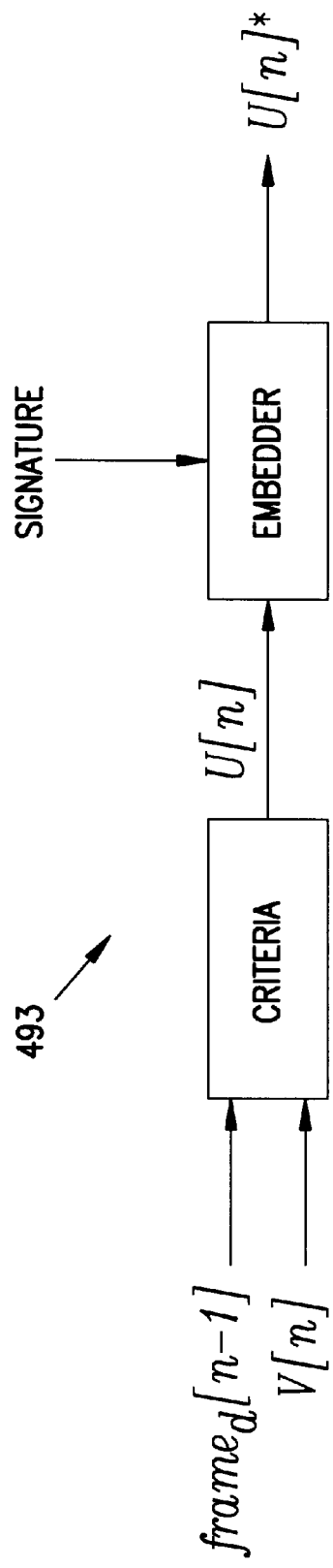
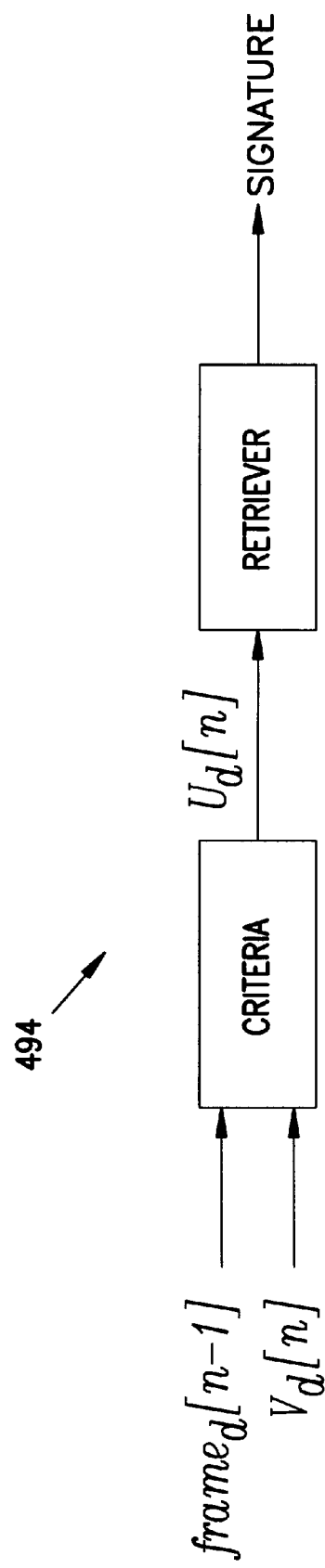
FIG. 4.10A
FIG. 4.10B

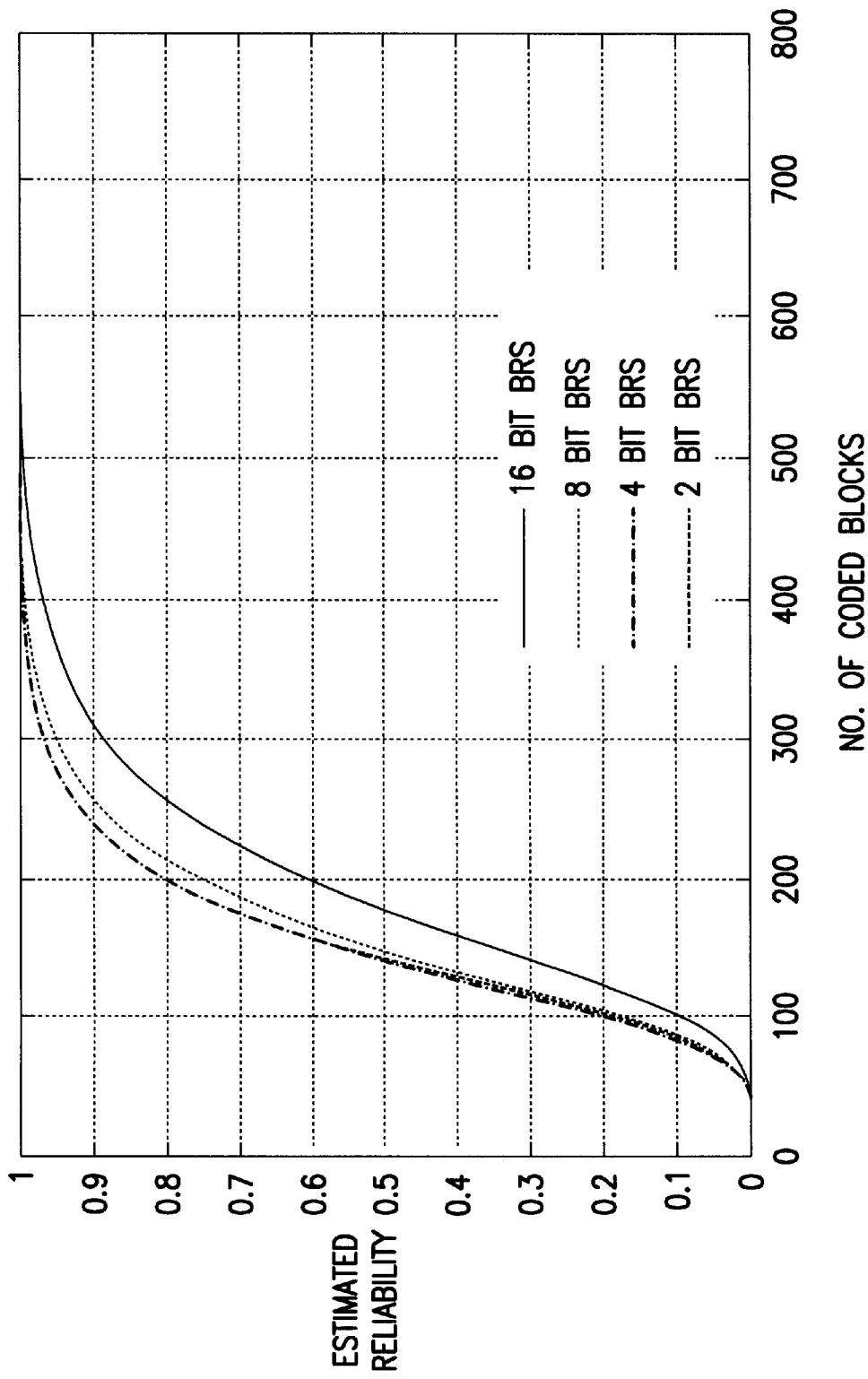
FIG. 5.1

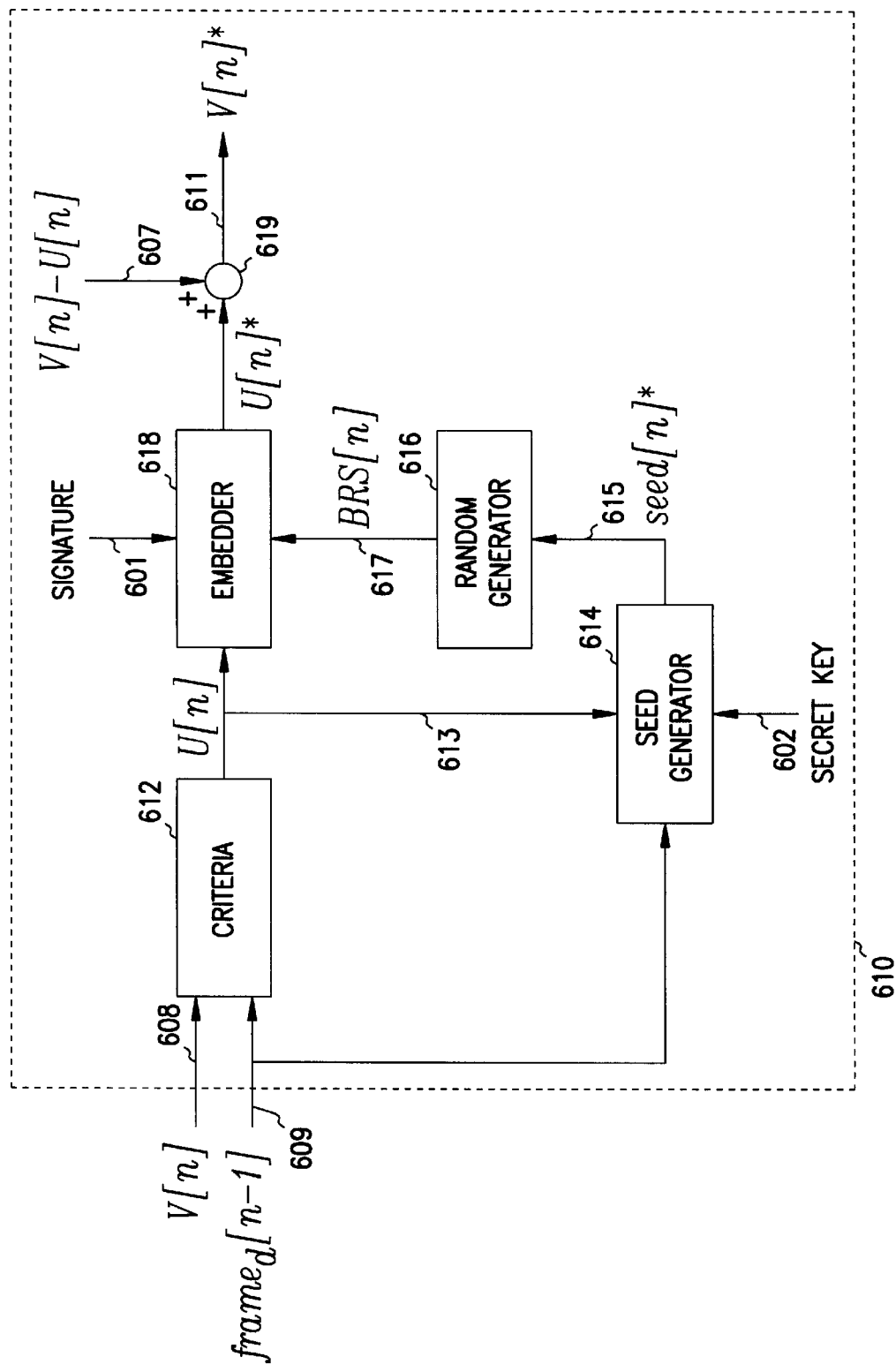
FIG. 6.1

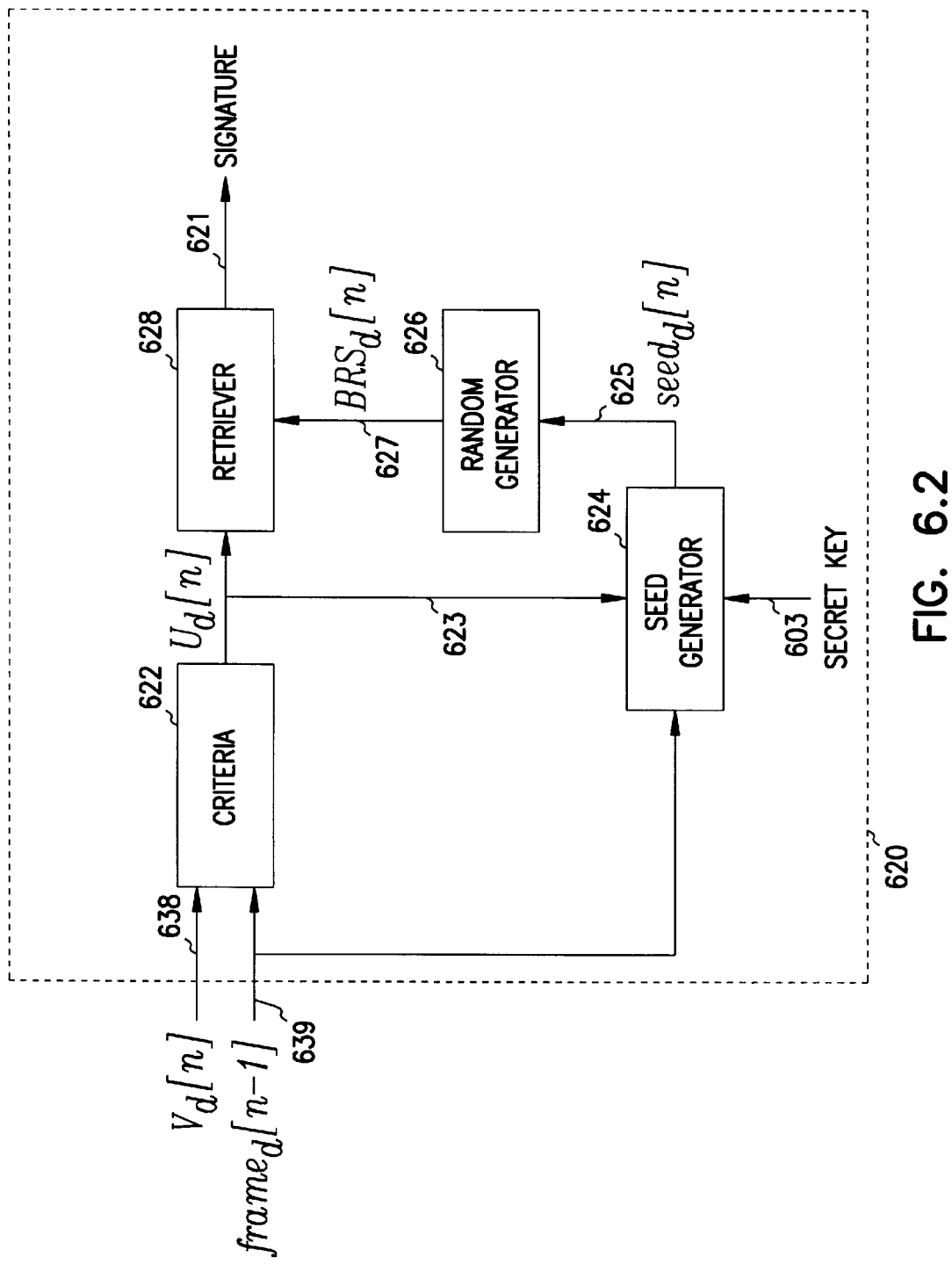
FIG. 6.2

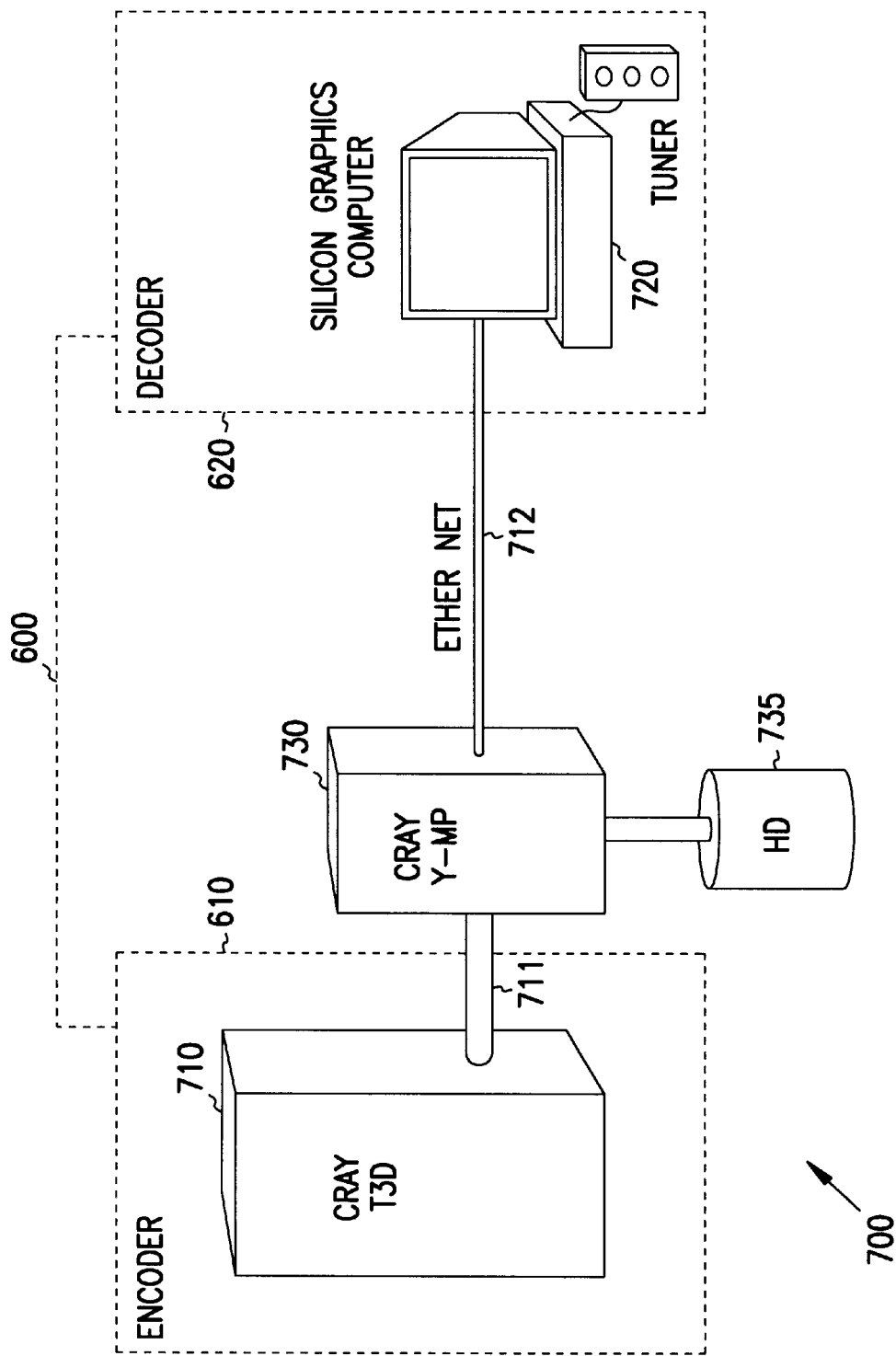
FIG. 7.1

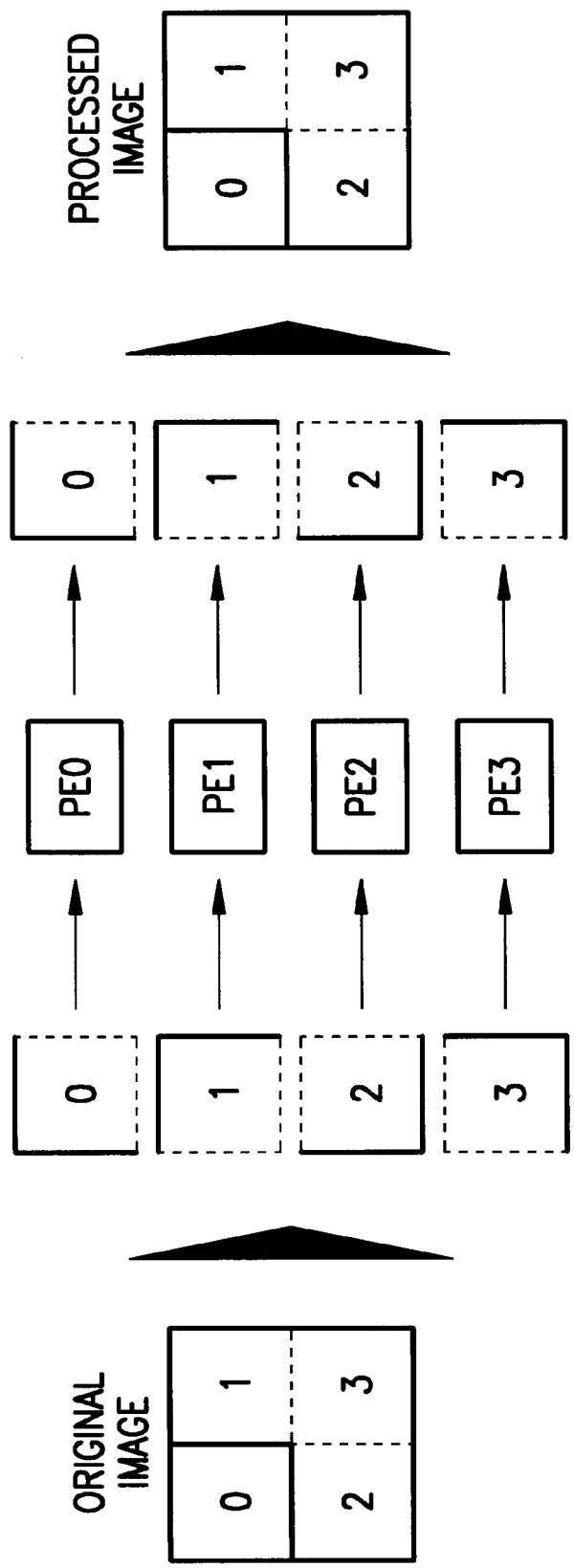
FIG. 7.2

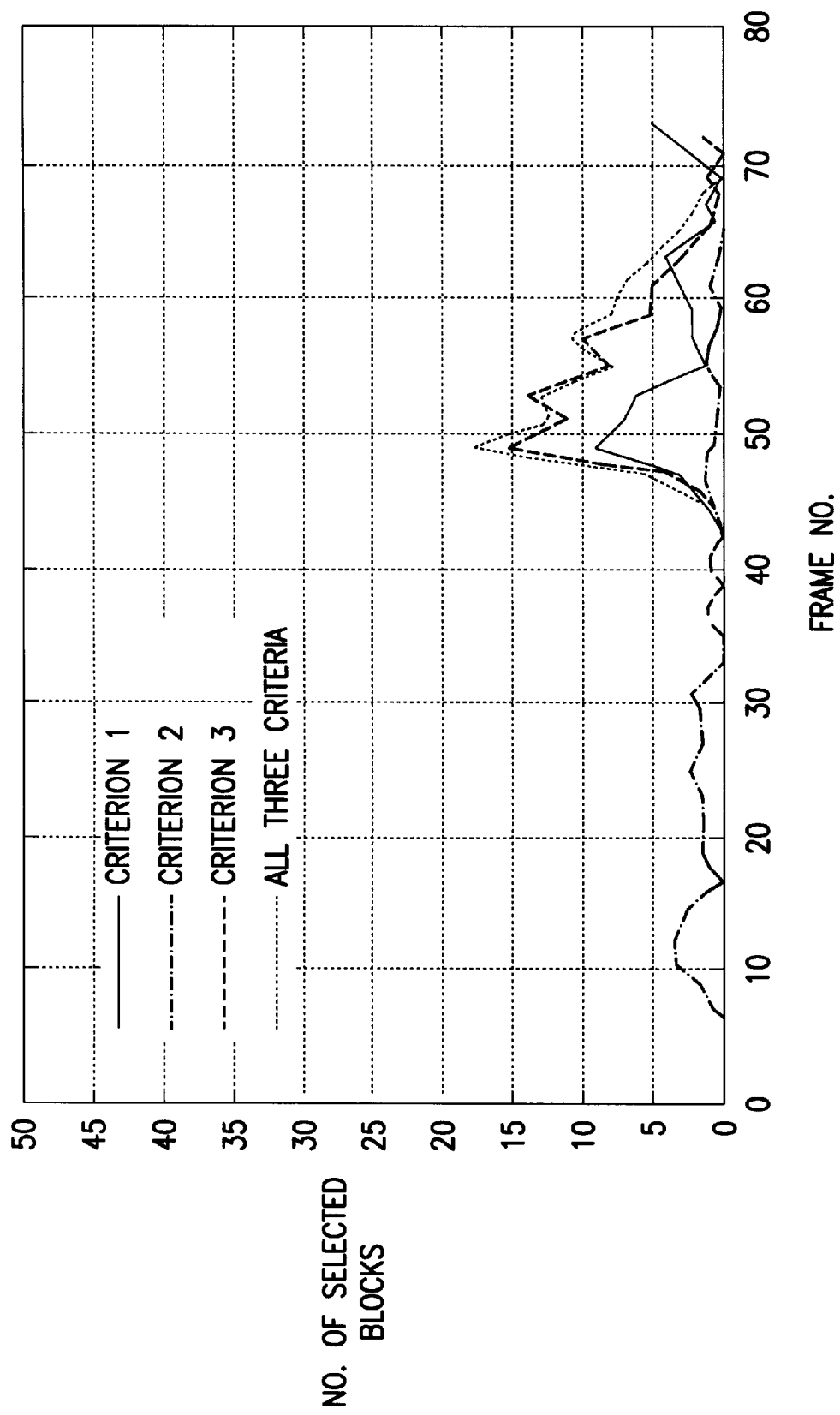
FIG. 8.1

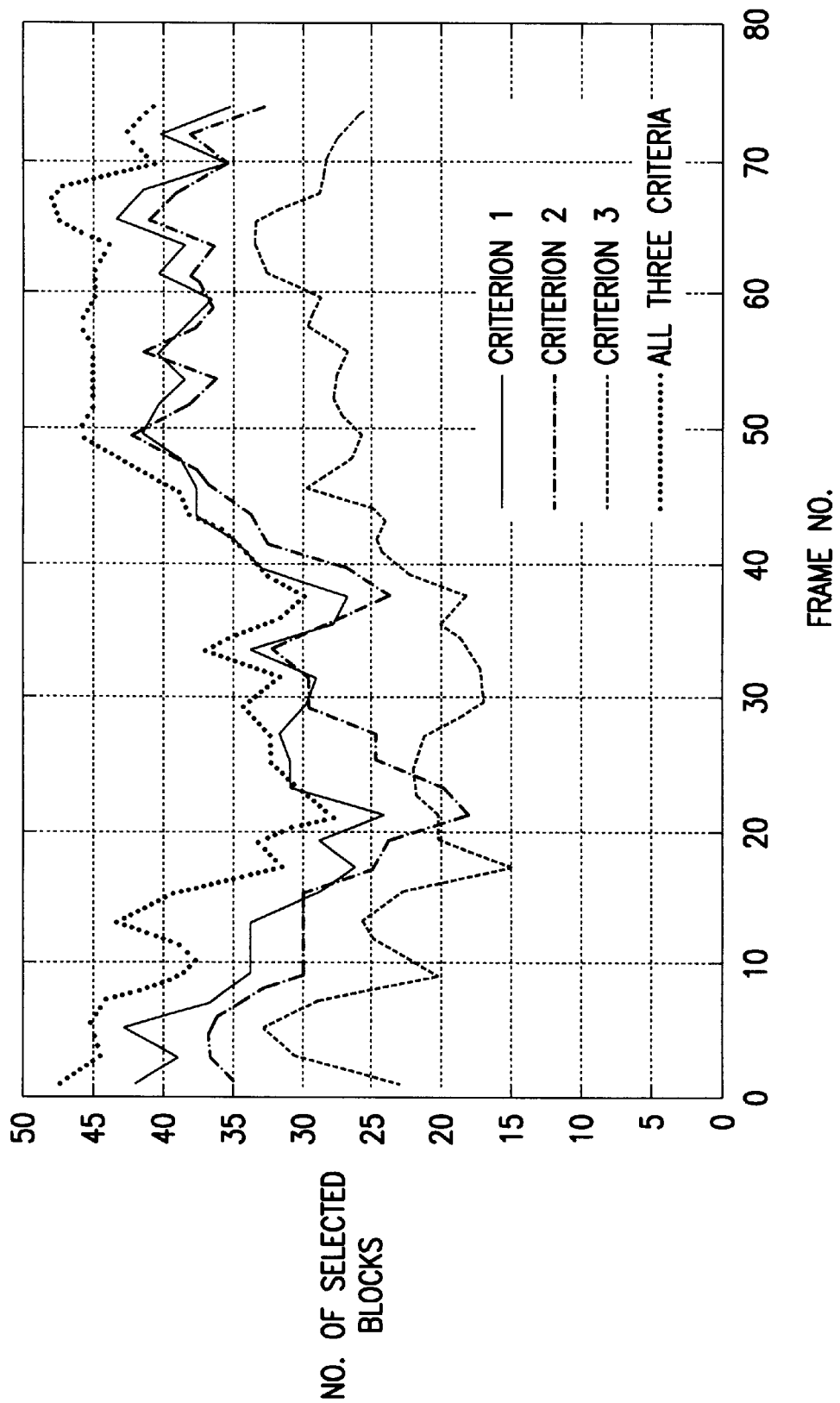
FIG. 8.2

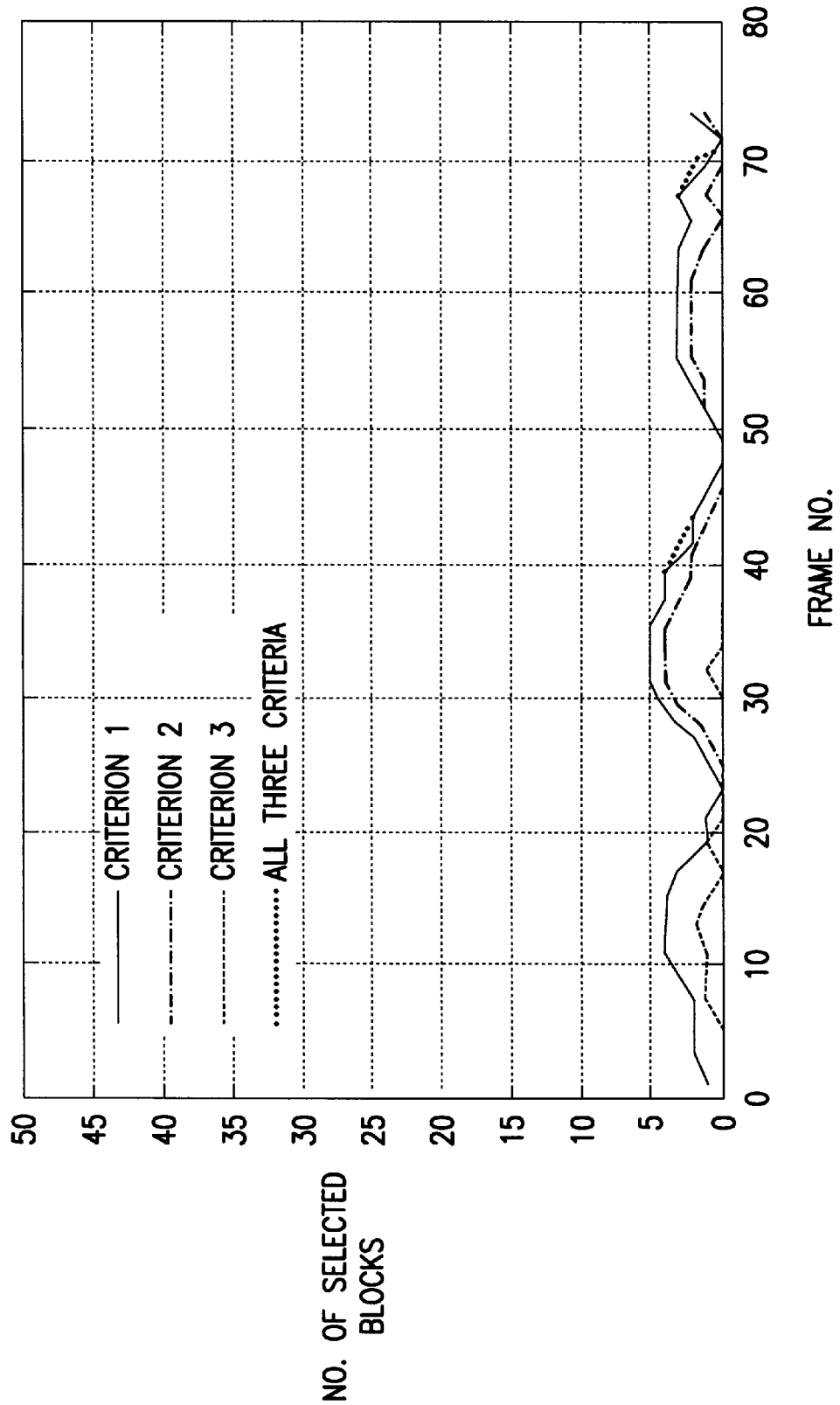
FIG. 8.3

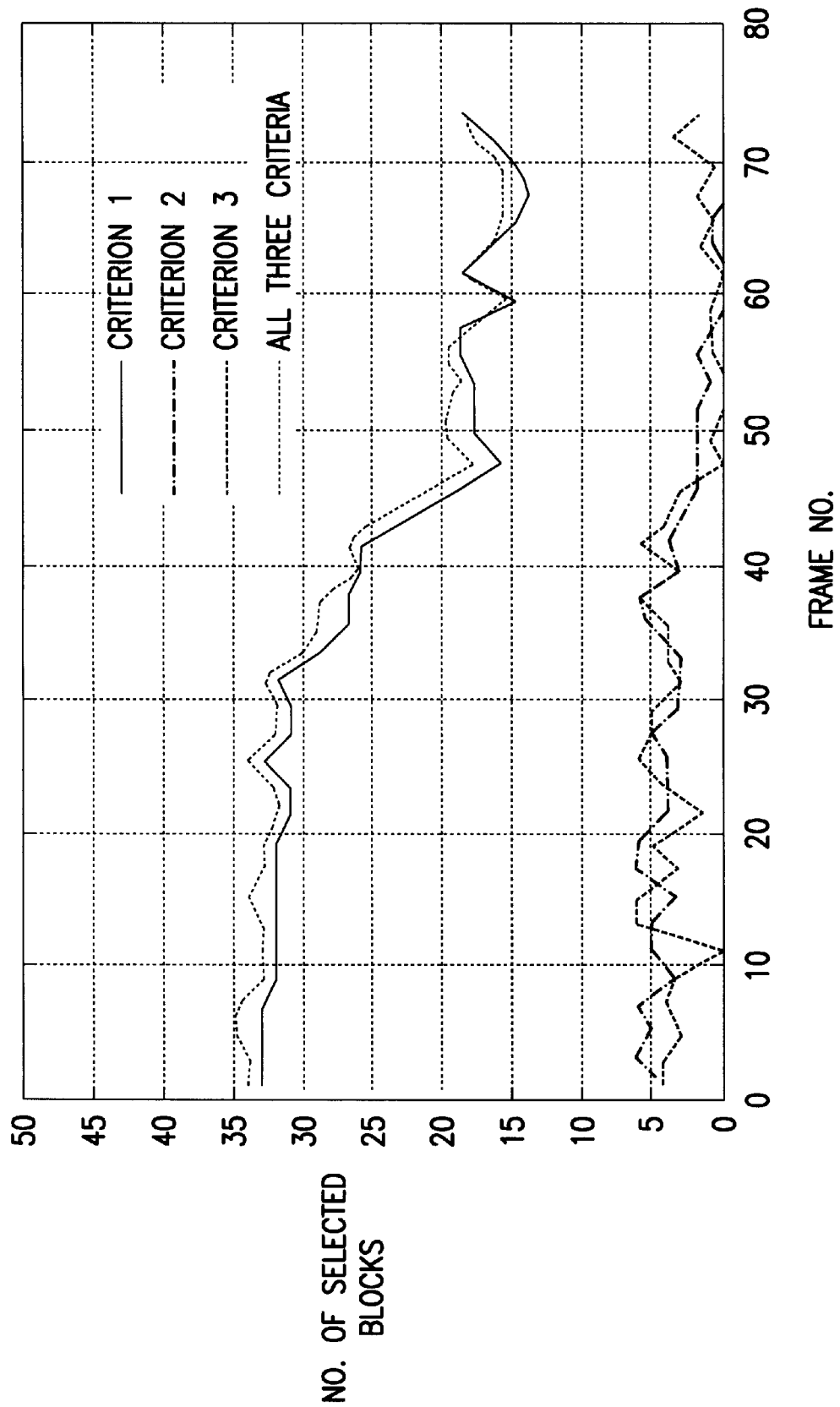
FIG. 8.4

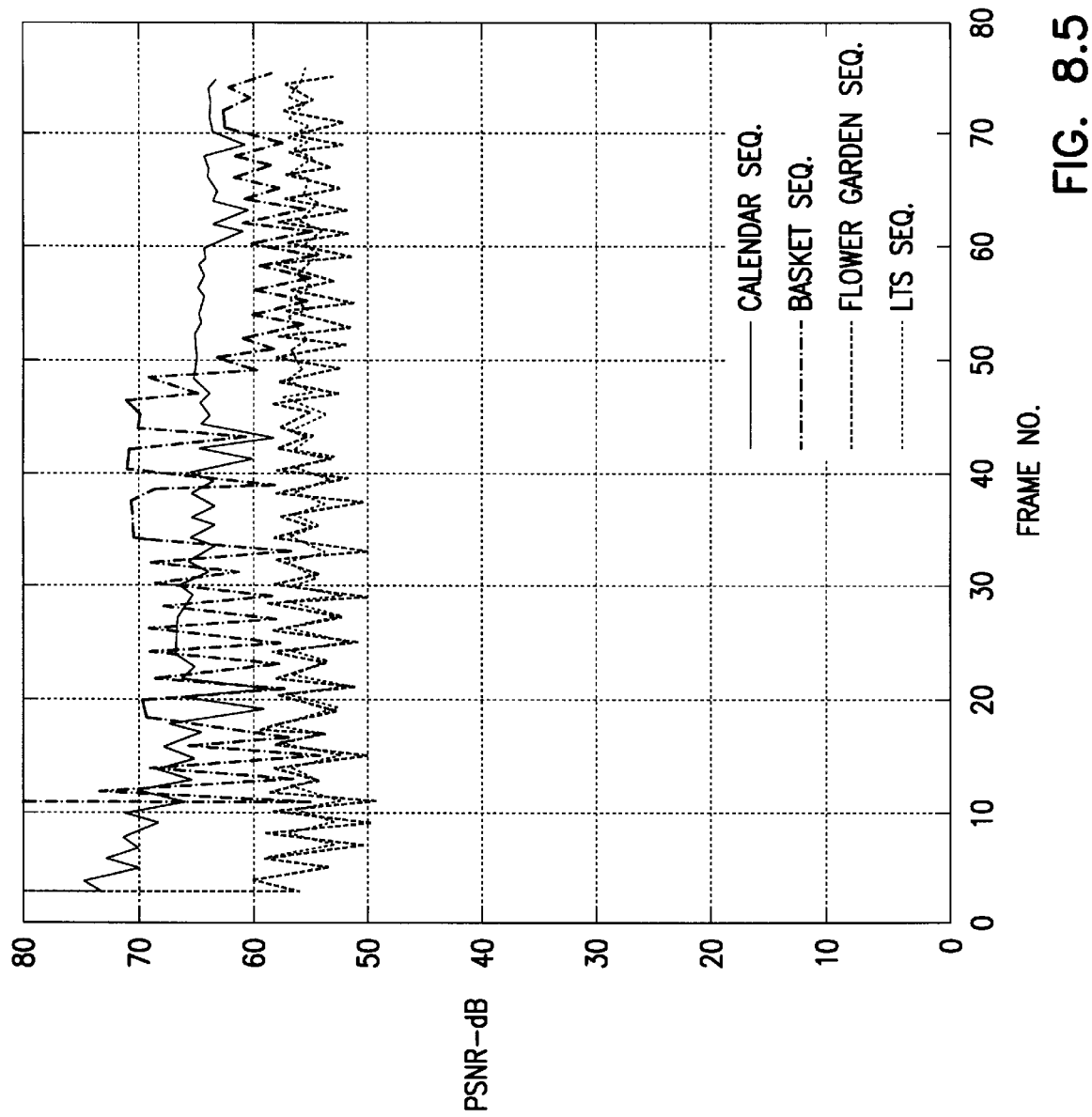
FIG. 8.5

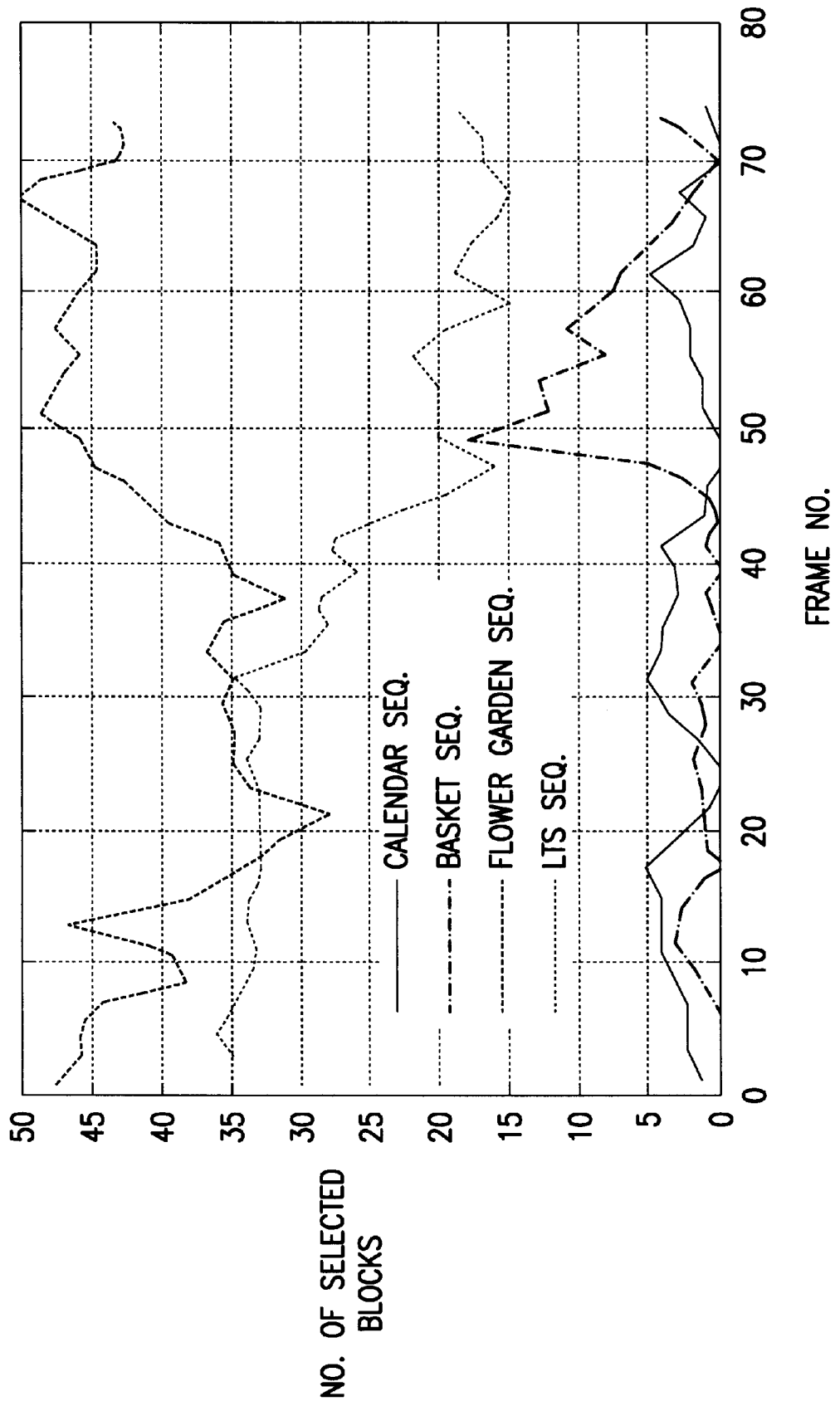
FIG. 8.6

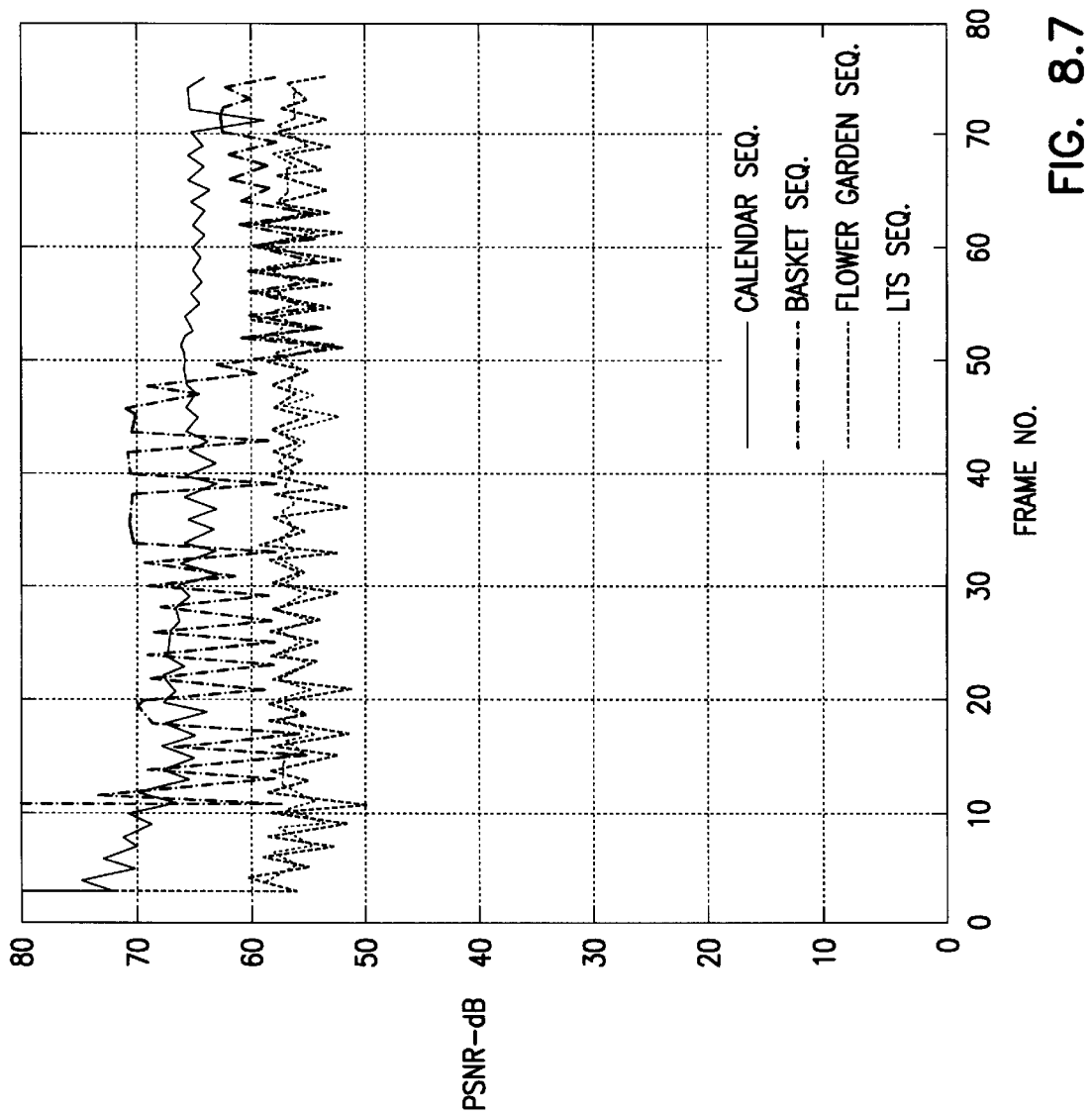
FIG. 8.7

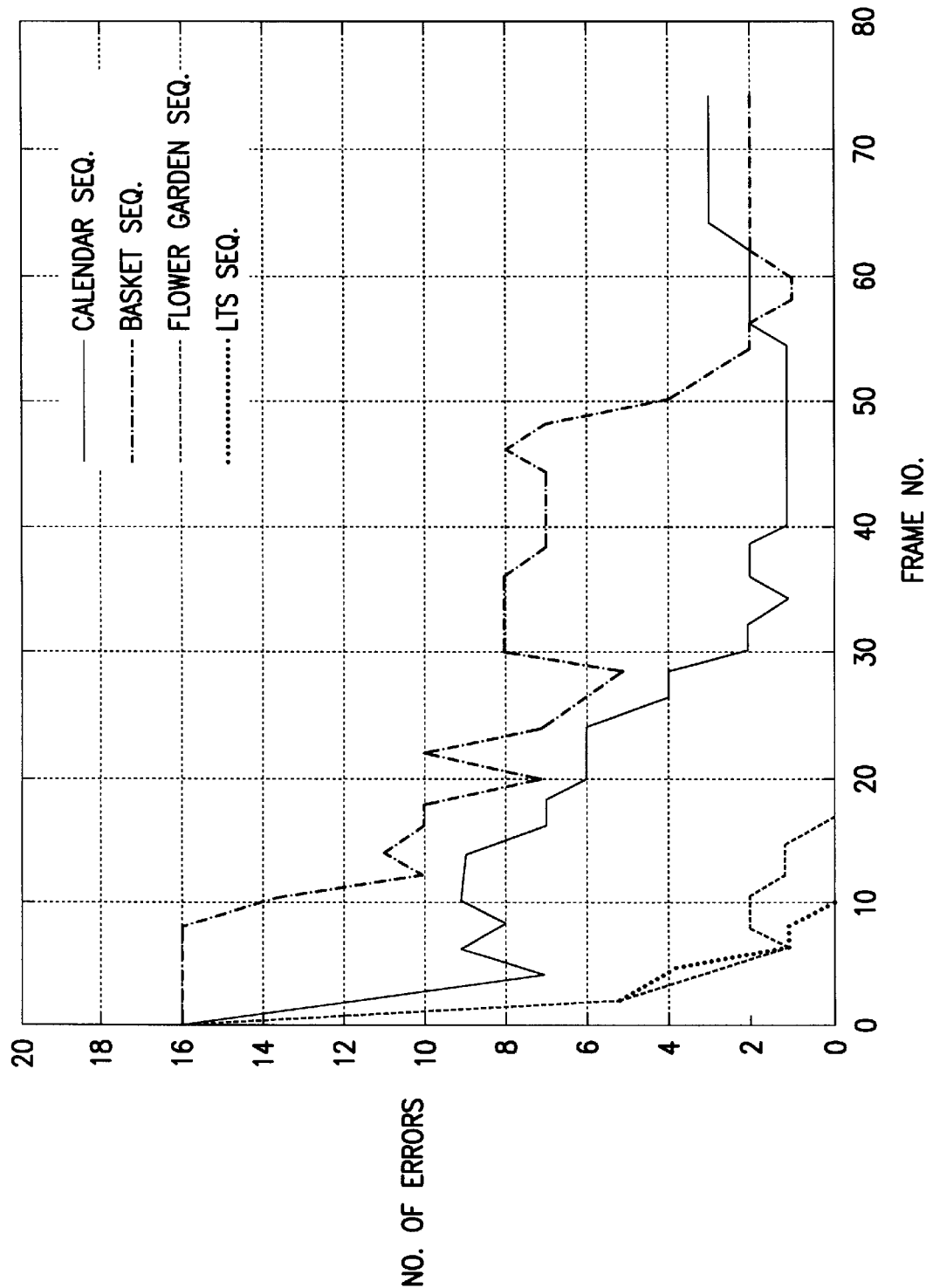
FIG. 9.1

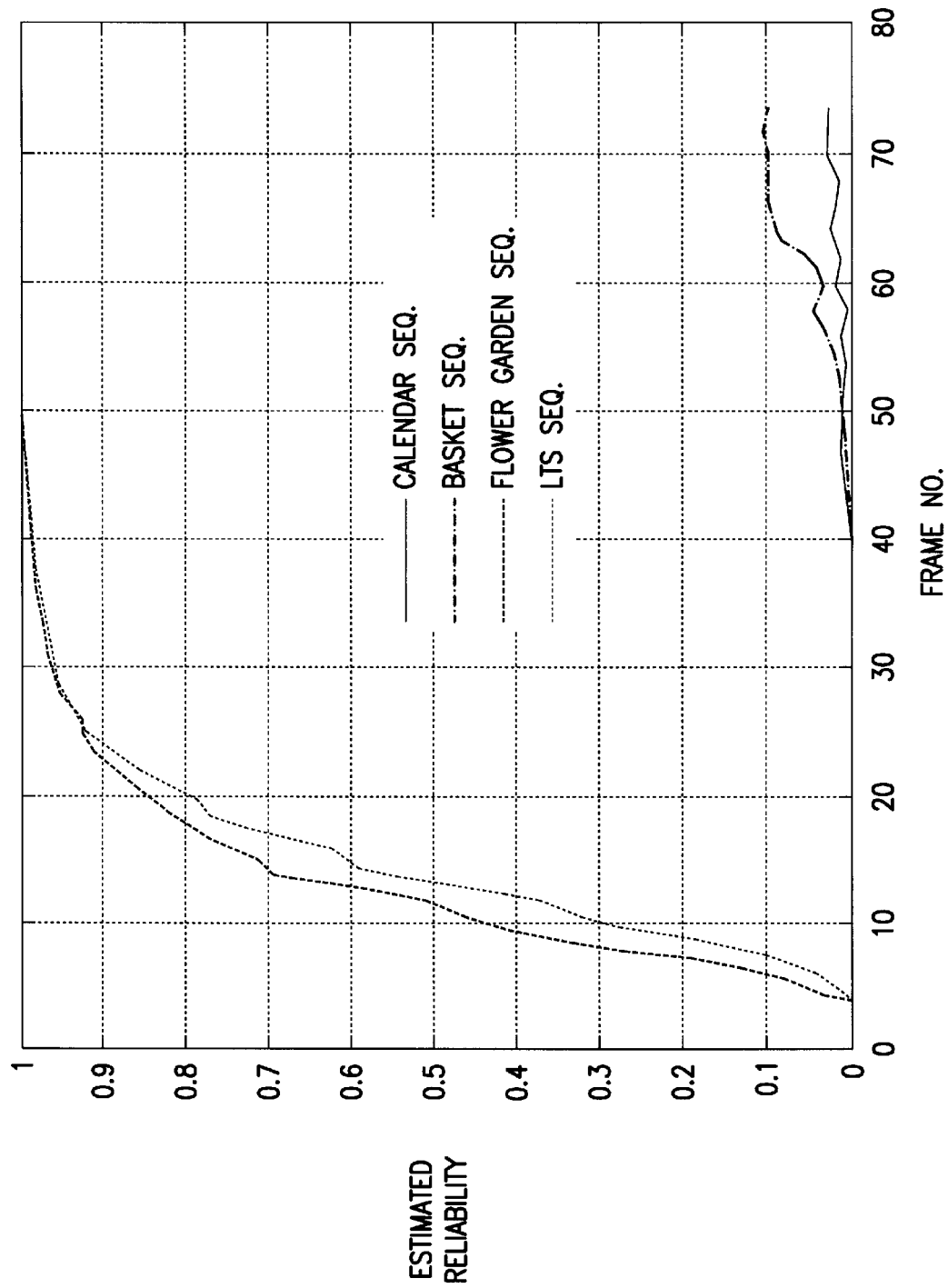
FIG. 9.2

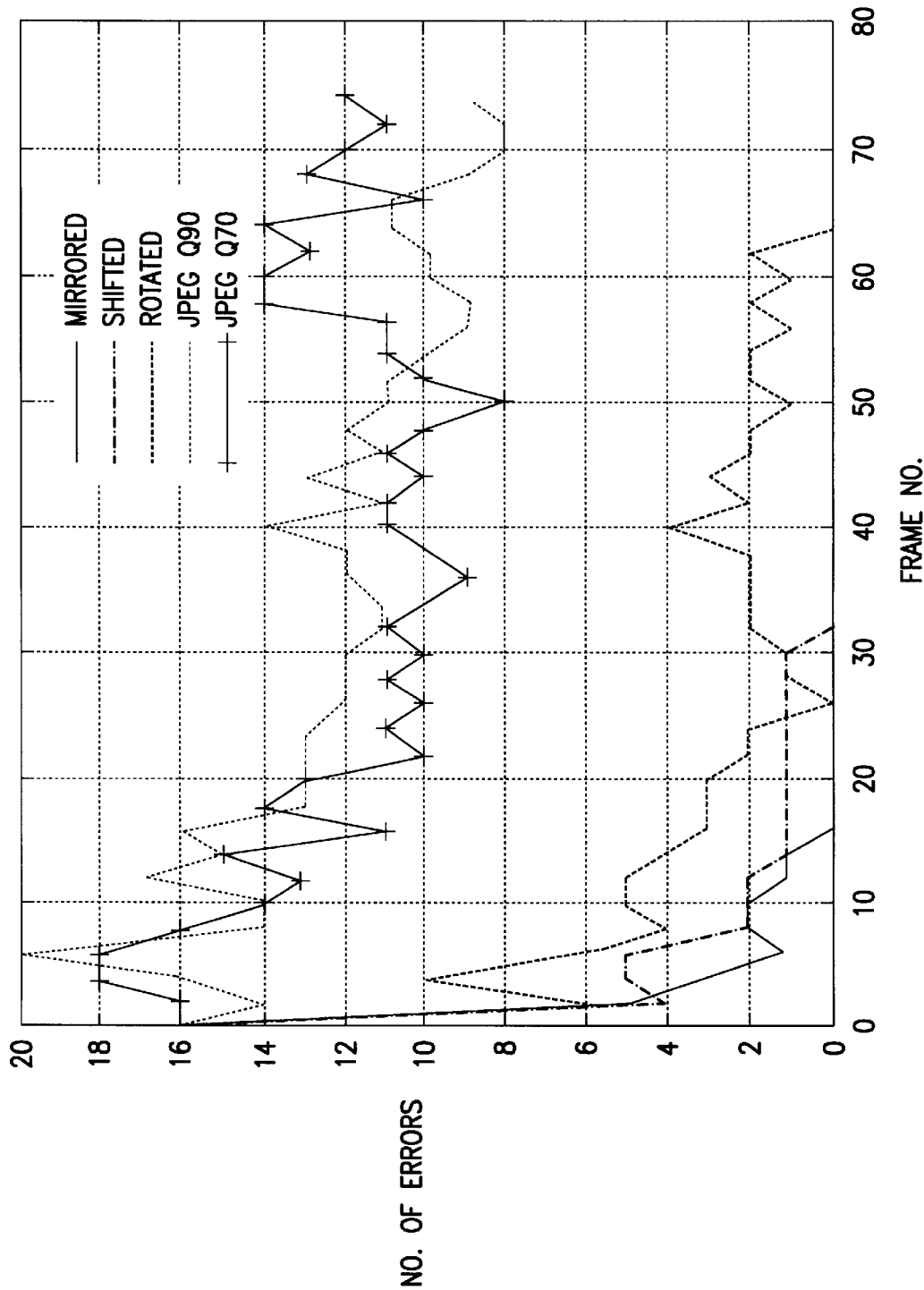
FIG. 9.3

A.1 Main watermark functions

| int parallel_embed(float **ima, int blocksize, uint xs, uint ys, t_motion *newmotion, t_motion motion, int framenumber) |
|---|
| Description |
| Embeds the signature into the motion vectors. |
| Input |
| ima - $frame_d[n - 1]$<br>xs & ys - dimensions of the frame<br>blocksize - dimension of blocks<br>motion - Holds the motion vectors set $V[n]$<br>framenumber - The current frame number |
| Output |
| newmotion - holds the changed set of motion vectors $V[n]^*$ |

FIG. 10A

| void parallel_extract(int nbregions, float **ima, int blocksize, uint xs, uint ys, t_motion motion, float *signature, int *nb_of_frames_coded, int framenumber) |
|---|
| Description |
| Extracts the signature from the motion vector set $V_d[n]$. |
| Input |
| nbregions - the number of blocks in the frame<br>ima - $frame_d[n - 1]$<br>xs & ys - dimensions of the frame<br>blocksize - dimension of blocks<br>motion - Holds the motion vectors set $V_d[n]$<br>framenumber - The current frame number<br>nb_of_frames_coded - the number of decoded frames until now |
| Output |
| signature - holds the retrieved signature |

FIG. 10B

A.2 Criteria

1100

| void parallel_std(float **ima, int **seg, uint xs, uint ys, int nbregions, int blocksize) |
|---|
| Description |
| Calculates the standard deviation for all blocks in the image *ima*. The calculation is done in parallel using the segmentation specified in *seg*. The resulting standard deviations are returned in the global array *buf_watermark*. |
| Input |
| ima - *frame[n - 1]*<br>seg - A matrix defining for each pixel, which PE it belongs to.<br>xs & ys - dimensions of frame<br>nbregions - Number of blocks in frame<br>blocksize - block size |
| Output |
| buf_watermark - global array where the standard deviations are returned in |

FIG. 11A

| int motion_speed(t motion *motion, int blocknb) |
|---|
| Description |
| Calculates the size of the motion vector for the block specified by *blocknb* and returns the value. |
| Input |
| motion - array with the motion vectors *V[n]*.<br>blocknb - The block which the size of the motion vector is calculated for. |
| Output |
| The return value is the size of the motion vector |

FIG. 11B

| |
|---|
| **int fft_shape(float \*\*ima, uint xs, uint ys, int blocksize, int blocknb)** |
| Description |
| Calculates the 2D fourier transform of the block specified in *blocknb*, thresholds the resulting amplitude plot to a black and white image and returns the number of non-zero values. |
| Input |
| ima - $frame_d[n - 1]$<br>xs & ys - dimensions of frame<br>blocksize - block size<br>blocknb - The block for which the fft is calculated |
| Output |
| The return value is the number of non-zero values in the thresholded fft image. |

FIG. 11C

| |
|---|
| **float max_dist_median(float \*\*ima, uint xs, uint ys, int blocksize, int blocknb)** |
| Description |
| Calculates the maximum distance to the median graylevel value in the block specified by *blocknb* and returns the value. |
| Input |
| ima - $frame_d[n - 1]$<br>xs & ys - dimensions of frame<br>blocksize - block size<br>blocknb - The block for which the maximum distance to the median is found. |
| Output |
| The return value is the distance to the median gray-level. |

FIG. 11D

A.3 Functions used in the calculation of the reliability

| void binomial_dist(float *distribution, float p) |
|---|
| Description |
| Calculates the binomial distribution with the parameters (n, p), where n is given as the first element of the array *distribution*, and returns the result in the array *distribution*. |
| Input |
| distribution - array where the first element specifies the number of elements for which the binomial distribution is calculated.<br>p - The probability for success |
| Output |
| distribution - The calculated binomial distribution is returned in this array. |

FIG. 12A

| float faculty(int n) |
|---|
| Description |
| Returns the n faculty. |
| Input |
| n |
| Output |
| The return value is the faculty of n |

FIG. 12B

| float accumulated_prob(float *distribution) |
|---|
| Description |
| The first element of *distribution* holds the number of elements in the distribution, n. The probabilities starting from n/2 (n/2 is not included) and up is then accumulated and the result is returned. |
| Input |
| distribution - See description |
| Output |
| Return value is the accumulated probability |

FIG. 12C

| void conv(float *dist1, float *dist2, float *result) |
|---|
| Description |
| Convolves the two binomial distributions in *dist1* and *dist2*, and returns the result in *result*. The number of values in the distributions are specified in the first element of each array. |
| Input |
| dist1 - Array with binomial distribution<br>dist2 - Array with binomial distribution |
| Output |
| result - The convolution of dist1 and dist2 |

FIG. 12D

A.4  I/O-functions

1300

| **void write_blocks(float \*\*ima, int \*selected_blocks, uint xs, uint ys, int blocksize, int framenumber, char \*signed_output_filename)** |
|---|
| Description |
| Writes the blocks specified in *selected_blocks* form the image *ima* to disc. The number of blocks are specified in the first element of *selected_blocks*. The framenumber is written as extension for the file. |
| Input |
| ima - The frame selected_blocks - Array that holds the numbers of the blocks to be written to the image.<br>xs & ys - Dimensions of image<br>blocksize - Block size<br>framenumber - frame number<br>signed_output_filename - Specifies the filename |
| Output |
| A file with the image of the selected blocks. |

FIG. 13A

| **void write_image(float \*\*ima, int framenumber, uint xs, uint ys, char \* filename)** |
|---|
| Description |
| Writes the image in *ima* to the disc. The file will have the framenumber as extension. |
| Input |
| ima - The image<br>xs & ys - Image dimensions<br>framenumber - Frame number<br>filename - Specifies the name of the file to create. |
| Output |
| A file with the image ima. |

FIG. 13B

A.5 Various functions

| **void fft(int n, double *xRe, double *xIm, double *yRe, double *yIm)** |
| --- |
| Description |
| Calculates the n-point one dimensional discrete fourier transformation of the data in *xRe* (Real part of the data) and *xIm* (Imaginary part of data). The result is returned in the arrays *yRe* and *yIm*. |
| Input |
| n - The number of data elements in each array.<br>xRe - Array with the real part of the input data<br>xIm - Array with the imaginary part of the input data |
| Output |
| yRe - Array with the real part of the output<br>yIm - Array with the imaginary part of the output |

FIG. 14A

| **void parallel_rand_bin_sequence(int seed, int *word, int number_of_bits)** |
| --- |
| Description |
| Returns a binary pseudo random sequence of length *number_of_bits* in *word*. *seed* is used for initializing the generator. |
| Input |
| seed - The initialization seed for the random generator<br>number_of_bits - Specifies how many bits should be in the random sequence |
| Output |
| word - The random sequence is returned in the array word |

FIG. 14B

| void parallel_code(float *target, float *source, int status) |
|---|
| Description |
| Depending on which bit value is specified in *status*, the *source* is made either odd or even (if necessary) and the result is returned in *target*. |
| Input |
| source - Hold the x or y coordinate of the motion vector to be coded.<br>status - Holds the bit to be coded. |
| Output |
| target - The coded x or y coordinate |

FIG. 14C

A.6 Tree structure showing the relationships between functions

EMBEDDING A DIGITAL SIGNATURE IN A VIDEO SEQUENCE

FIELD OF THE INVENTION

The present invention concerns marking moving pictures with watermark information, and more particularly embedding a digital code into compressed video sequences.

BACKGROUND OF THE INVENTION

In the very near future, a new type of video and television will enter the family living room. What happened to the music industry with the introduction of the Digital Compact Disc is now happening to the video and television industry. New technology has made it possible to compress and broadcast digital images at a speed fast enough to produce a motion picture. Some of the advantages of digital TV include a better image quality and new possibilities to interactively manipulate the images from a chair in the living room. But as always, this new technology presents new problems. As with other digital data, e.g., software, CD-ROMS and music CD's, a digital video sequence can be copied into an exact duplicate of the original, making it impossible to distinguish the copy from the original. Sale of illegally copied video films already are a major problem for the film industry, but until now the inferior quality of the illegal copies made it easy to unveil the fact that they actually are copies, making it difficult for a person to buy an illegal copy unintentionally. With the digital video anybody can be fooled, unless some authentication system is introduced. Another problem can arise in the broadcasting of TV news. A TV channel is not allowed to use what another TV channel has broadcast without a permission. Until now there have been no major problems with TV channels stealing from each other, due to the loss of quality a retransmission implies. Further, TV stations are normally superimposing a small channel logo on the images they broadcast making authentication of the source easy. If the images are digital there will be no loss of quality and it will be very easy to remove the channel logo, and even superimpose another logo instead. Consequently, a better means to provide the authentication is needed.

With the growth of digital networks, a need has appeared for a mechanism capable of protecting the ownership of video or image authors. A classical means to protect image or video material is known as "Digital Signature", where the video/image-data material is slightly modified ("signed") in order to embed a number or image or other information, which can later be retrieved. This embedded number can then be used either to identify the author or the organization who created the material. Two main "signing" techniques are classically used. The simplest one consists of modulating the luminance of random chosen pixels and is particularly suited for gray-scale images as can be found in an article by R. G. van Schyndel, et al. ("Digital watermark," *Proceedings of the* 1994 *1st IEEE International Conference on Image Processing,* Vol. 2, pp. 86–90, 1994). More complex techniques can also be found where the image is cut in blocks, with a modulation amplitude and block size which are themselves modulated by local energy. Work by K. Matsui et al., ("Video-Steganography: How to secretly embed a signature in a picture," *The Journal of the interactive Multimedia Association Intellectual Property Project,* Vol. 1, No. 1, pp. 187–206, January 1994) proposes a block-based method where the dithering rule is modified. In an article by W. Bender et al. ("Techniques for Data Hiding," *Proceedings of the SPIE,* 2420:40, February 1995), the difference between pixel luminance value is used. Whereas W. Bender et al. propose to duplicate textured regions and then use autocorrelation computation, one often used technique is also the modification DCT coefficients generated by either JPEG (see S. Burgett et al. "A Novel Method for Copyright Labelling Digitized Image Data," *IEEE Transactions on Communications,* September 1994), or MPEG-2 coders. These two techniques are well adapted for color images and animated color images, respectively.

SUMMARY OF THE INVENTION

This invention provides a system and method to protect video materials by modifying motion information with a digital signature, and is therefore very well suited for hiding signature information into video sequences. The signature information can be hidden, not only to make it visually imperceptible, but also to make it difficult to remove, and thus resistant to hackers. By embedding information into motion vectors in one such embodiment, a portability to the MPEG-2 standard or other block-based compression scheme is obtained.

A method and system for embedding and retrieving information in a video signal are described. The method includes the steps of selecting a first subset and a second subset of the video signal, determining a relationship between the first subset and the second subset of the video signal, changing the relationship between the first subset and the second subset of the video signal, wherein the step of changing includes encoding the information to produce a changed video signal having a changed relationship, and detecting the changed relationship from the changed video signal.

In one embodiment, the step of selecting includes selecting image element subsets using one or more visual perception criteria.

In one embodiment, the first subset belongs to one frame and the second subset belongs to a different frame of the video signal. In one such embodiment, the first and second subsets each represent rectangular blocks in the frames of the video signal. In another such embodiment, the step of selecting includes selecting visually similar subsets. In one embodiment, the relationship is a motion between selected subsets. In one such embodiment, the step of changing the relationship includes using a key to encrypt a location of the information. In another such embodiment, the step of selecting the subsets includes using a key in order to encrypt a location of the information. In yet another such embodiment, the steps of selecting the subsets and/or changing the relationship include using a key to encrypt the encoding of the information into the changed relationship. In another such embodiment, the step of encoding includes generating a binary pseudo-random sequence (B.R.S.) using a seed derived from a mean gray level value of a block and a distance from a center of the block to a center of a frame.

In another embodiment of the present invention, a system and method for embedding a retrievable watermark into a video signal are provided, wherein the video signal provides a series of video frames including a first frame and a subsequent second frame. The method includes the steps of detecting a change between the first frame and the second frame; producing change information based on the change, and encoding the watermark into the change information.

In one such embodiment, the step of encoding adds, subtracts, ANDs, XORs or ORs a value to a motion vector based on the watermark. In another such embodiment, the step of encoding includes using a key to encrypt the encoding the watermark into the change information. Another such embodiment further includes the step of obtaining a set of motion vectors $V(n)=\{v_1, v_2, \ldots v_n\}$, where $v_i=(x_i, y_i)$, i=1, 2, ..., m, and m is the number of blocks in each frame, on basis of frame(n−1) by a minimum mean-square-error fit of each block in frame(n), and wherein the step of encoding uses the set of motion vectors. Yet another such embodiment further includes the step of selecting the subset of blocks based on criteria that are met by blocks in frame$_d$(n−1), wherein the step of encoding uses the subset of blocks. Still another such embodiment further includes the step of selecting the subset of blocks based on criteria that include a threshold value $C_{hist}$: max $(|x_m-x_i|)<C_{hist}$, i=1, 2, ..., M where $x_m$ is the median value, M is the number of pixels in the block and $C_{hist}$ (histogram criterion) is the maximum-allowed distance to the median value, wherein the difference in pixel intensity from the median intensity for surrounding pixels is smaller than the threshold value $C_{hist}$, and wherein the step of encoding uses the subset of blocks. Another such embodiment further includes the step of selecting the subset of blocks based on criteria that include a threshold value $C_\sigma$, wherein a block is selected if $\sigma<C_\sigma$ where $C_\sigma$ (standard deviation criterion) is a threshold value determining the visible limit, and wherein a standard deviation $\sigma$ is calculated for the block b(k) using a definition $$\sigma = \sum_{i=1}^{M} \frac{(x_i - \bar{x})^2}{M-1}$$

where $$\bar{x} = \sum_{i=1}^{M} \frac{x_i}{M},$$

x is the gray-level value, and M is the number of pixels in the image, and wherein the step of encoding uses the subset of blocks.

Yet another such embodiment further includes the step of selecting the subset of blocks based on criteria that include a threshold value $C_\sigma$, and a block is selected if, a standard deviation ($\sigma_{xy}$ of the pixel gray-level values inside a block plus a band around the block) is less or equal to a given threshold value $C_\sigma$: $\sigma_{xy} \leq C_\sigma$ where $C_\sigma$ (standard deviation criterion) is a threshold value determining the visible limit, and wherein a standard deviation $\sigma$ is calculated for the block b(k) using a definition $$\sigma = \sum_{i=1}^{M} \frac{(x_i - \bar{x})^2}{M-1}$$

where $$\bar{x} = \sum_{i=1}^{M} \frac{x_i}{M},$$

x is the gray-level value, and M is the number of pixels in the image, and wherein the step of encoding uses the subset of blocks. Yet another such embodiment further includes the step of selecting the subset of blocks based on criteria that include a threshold value $C_{size}$, wherein a magnitude of a motion vector v is larger than or equal to a given threshold value $C_{size}$: $|\vec{v}| \geq C_{size}$ where $\vec{v}$ is the motion vector and $C_{size}$ (motion-vector size criterion) is the minimum size of the motion vector, and wherein the step of encoding uses the subset of blocks. Still yet another such embodiment further includes the step of selecting the subset of blocks based on criteria that include:

a first hybrid criterion including a first criterion for standard deviation combined with a criterion for maximum distance to the median;

a second hybrid criterion including a second criterion for standard deviation combined with a criterion for a shape of the frequency plot; and a third hybrid criterion including a third criterion for standard deviation combined with a criterion for size of the motion vectors, and wherein the step of encoding uses the subset of blocks.

The invention thus provides:

Portability: The solution is compatible with the MPEG-2 or other compression standard and with any block-based coding system.

Low Perceived Visibility: The solution takes benefit from time to dilute its intrinsic distortion into the whole motion picture sequence.

Scalable reliability: The reliability of retrieving the embedded information increases as the duration of the video sequence increases.

Robustness: Additionally, the imbedded information is resistant to compression techniques used for broadcasting digital video.

The invention makes use of a block-based coding scheme to extract motion vectors, and a signature is embedded into these motion vectors. The motion picture is then reconstructed using these new motion vectors to produce a "signed" video sequence. This solution can be applied as an "added layer" to the output of any block-based motion-estimation coding scheme, and is thus totally portable. By modifying motion information and particular block-selection criteria, the visibility of the modification is also minimized. Moreover, the novel retrieving technique offers a scalable reliability and can get back information of any extracted sequence of the signed video material. Additionally, the method is designed to be intrinsically robust to the compression techniques used for broadcasting.

The watermarking technique described is able to hide a digital signature, for example, a 32-bit number, into a motion picture. This technique can be used with motion vectors extracted by any block-based motion estimation coder and has a low computational cost. A scalability of the retrieval reliability has been shown, such that the longer the video sequence, the greater the reliability of the retrieved signature. Additionally, the visual alteration of video sequence is very low and is unnoticeable when watched only once. Around 800 or more motion vectors should be coded to have a good reliability of the retrieved signature. The quality of the signed sequences was found to be very high. At no point is the peak-signal-to-noise-ratio (PSNR) lower than 50 dB in the final sequences. The PSNR values are relative to the compressed but unsigned sequences. Visual-based tests have confirmed that the quality of the sequences are high. The robustness of the signature relative to attacks by mirroring, pixel rolling, rotation, and JPEG compression has also been tested. For the first three attacks, the system succeeded in retrieving the signature. As for the MPEG compression, the signature was partly retrieved. As only 3 seconds of test sequences were tested, it is likely that the signature would be retrieved if sequences of longer duration are used.

Another embodiment of the present invention provides a storage medium having a computer program stored thereon for causing a suitably programmed system to embed information in a video signal by performing the following steps when such program is executed on the system: selecting a first subset and a second subset of the video signal, determining a relationship between the first subset and the second subset of the video signal, and changing the relationship between the first subset and the second subset of the video signal, wherein the step of changing includes encoding the information into the video signal to produce a changed video signal having a changed relationship. One such embodiment further includes detecting the changed relationship from the changed video signal. In another embodiment, the step of selecting includes selecting image element subsets using one or more visual perception criteria. In another embodiment, the first subset belongs to one frame and the second subset belongs to a different frame of the video signal. In another embodiment, the first and second subsets each represent rectangular blocks in the frames of the video signal, wherein the step of selecting includes selecting visually similar subsets. In yet another embodiment, the first and second subsets each represent rectangular blocks in the frames of the video signal, and wherein the relationship is a motion between selected subsets. In still another embodiment, the step of selecting the subsets includes using a key in order to encrypt a location of the information.

Another embodiment of the present invention provides a data structure for holding video information, the video information having embedded digital information such that the digital information can later be retrieved, the digital information including a plurality of bits, the data structure including a plurality of video frames, each frame being subdivided into a plurality of blocks, and a plurality of motion vectors, each one of said motion vectors associated with one block of a selected subset of the plurality of blocks, each motion vector representative of a displacement between a block in one frame and a corresponding block in a later frame, wherein the plurality of motion vectors has been modified based on a value of one or more bits of said digital information.

BRIEF DESCRIPTION OF THE DRAWINGS

FIG. 2.1 shows a typical watermarking system according to the present invention, including an encoder, a distribution medium and a decoder.

FIG. 2.2 shows a block diagram of an encoder using a secret key to resist the problem of an attack to remove a signature.

FIG. 2.3 shows a block diagram of a decoder using a secret key corresponding to the encoder of FIG. 2.2.

FIGS. 2.4A, 2.4B, 2.4C, and 2.4D show one frame from each of four sequences used in a test: a Basketball sequence, a Flower Garden sequence, a Calendar sequence and an LTS sequence.

FIGS. 3.1A and 3.1B illustrate a best match search where the Mean Square Error (MSE) is calculated for each possible position of the block in frame(n−1) 321 within the given area 312.

FIG. 3.2 illustrates a compression scheme, block-based motion estimation, used by the present invention.

FIG. 3.3 is a schematic of encoder 330.

FIG. 3.4 is a schematic of decoder 340.

FIG. 3.5 is a schematic of encoder 350 with the signature embedding procedure included.

FIG. 3.6 is a schematic of retriever 360, wherein motion estimation between successive frames is once again performed to retrieve the signature.

FIG. 3.7 is a graph showing the number of errors divided by the number of coded bits versus the number of coded bits, for each of the four test sequences.

FIG. 3.8 is a graph of the reliability as a function of the number of times the signature has been coded, with the assumed error rate $q_e=0.05$.

FIG. 3.9 is a graph of the PSNR for the four different sequences.

FIGS. 3.10A, 3.10B, 3.10C, and 3.10D show four frames from the Basketball sequence after the random embedding.

FIGS. 4.1A and 4.1B show blocks from two regions of a frame.

FIGS. 4.2A and 4.2B show gray-level histograms, for the blocks shown in FIGS. 4.1A and 4.1B, respectively.

FIGS. 4.3A and 4.3B show 2DFT plots, for the blocks shown in FIGS. 4.1A and 4.1B, respectively.

FIGS. 4.3C and 4.3D show 2DFT plots quantized at a threshold level, for the blocks shown in FIGS. 4.1A and 4.1B, respectively.

FIG. 4.5A shows a frame from the Basketball test sequence where the blurring of the fast moving parts is very obvious.

FIG. 4.5B show the blocks selected by one set of block-selection criteria that the size of the motion vector is to be larger than 5 pixels for a block to be selected.

FIG. 4.9A shows a block diagram of an encoder 491 which selects blocks to encode based on criteria that are met by blocks in frame(n). FIG. 4.9B shows a block diagram of a corresponding decoder 492 for encoder 491 which selects blocks to decode based on applying the criteria to frame$_d$(n).

FIG. 4.10A shows a block diagram of an encoder 493 which selects blocks to encode based on criteria that are met by blocks in frame$_d$(n−1).

FIG. 4.10B shows a block diagram of a corresponding decoder 494 for encoder 493 which selects blocks to decode based on applying the criteria to frame$_d$(n−1).

FIG. 5.1 shows the reliability of a 32-bit signature using different lengths of B.R.S.'s.

FIG. 6.1 shows a block diagram of encoder 610.

FIG. 6.2 shows a block diagram of decoder 620.

FIG. 7.1 shows a block diagram of hardware system 700 used to implement one embodiment of encoder-decoder system 600.

FIG. 7.2 illustrates the image being divided into a number of partitions, in which each partition is processed separately on different PE's and then subsequently put together again to form the entire processed image.

FIG. 8.1 shows the number of blocks selected in the Basketball sequence using the three different criteria individually and all together, as the sequence is processed using the threshold values specified for each of the sequences in Table 8.1.

FIG. 8.2 shows the number of blocks selected in the Flower-garden sequence using criteria such as in FIG. 8.1.

FIG. 8.3 shows the number of blocks selected in the Calendar sequence using criteria such as in FIG. 8.1.

FIG. 8.4 shows the number of blocks selected in the LTS sequence using criteria such as in FIG. 8.1.

FIG. 8.5 shows the PSNR values after the first tuning versus the frame number for each of the four sequences.

FIG. 8.6 shows the number of blocks selected in each sequence when all the threshold values in the previous tuning phase are combined into the most conservative values for each of the four sequences. Every second frame is again eliminated from the plots.

FIG. 8.7 shows the final PSNR values for each of the sequences compared to the unchanged compressed and decompressed sequences.

FIG. 9.1 shows the number of errors versus the number of processed frames for each of the four sequences.

FIG. 9.2 shows the estimated retrieving reliability versus the number of frames coded (that is, indirectly the number of blocks coded, see FIG. 8.6).

FIG. 9.3 shows the number of errors in the retrieved signature versus the number of processed frames after independently applying each of the five attacks.

FIG. 10 shows the main watermark functions 1000.

FIG. 11 shows the criteria functions 1100.

FIG. 12 shows the reliability-calculation functions 1200.

FIG. 13 shows the I/O functions 1300.

FIG. 14 shows various miscellaneous functions 1400.

DETAILED DESCRIPTION OF PREFERRED EMBODIMENTS

Figure 1B:
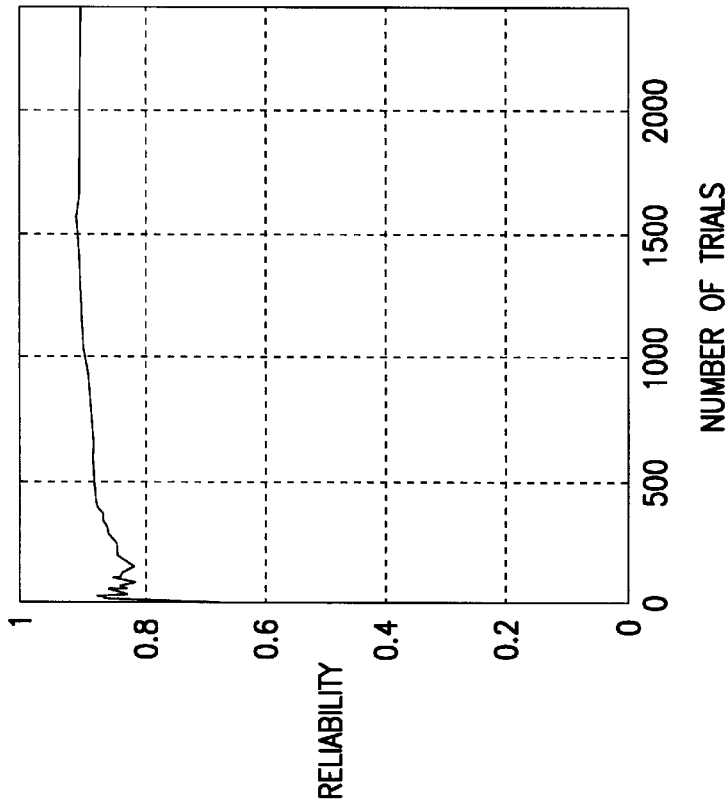
FIGS. 1A and 1B together form FIG. 1, and show the relative number of correctly retrieved bits as a function of the number of coded bits; and the reliability for retrieving the correct signature plotted as a function of the redundancy.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

For frame(n), a set of motion vectors $V(n)=\{v_1, v_2, \ldots v_n\}$, where $v_i=(x_i, y_i)$, $i=1, 2, \ldots, m$, and m is the number of blocks in each frame, are obtained on basis of frame(n−1) by a minimum mean-square-error fit of each block in frame(n). The embedding technique is to select a subset $U(n)\epsilon V(n)$, and, if necessary, modify either the x or y-coordinate of the motion vectors according to a predefined bitset $S(i)$, $I=1, 2, \ldots, L$, where L is the number of bits in the signature. How large a subset of motion vectors to be selected from $V(n)$ depends on the number of blocks suitable for coding in a nonvisible sense. If the number of vectors in $U(n)$ is smaller than L, the signature is coded over several frames. The coordinates are either incremented or decremented by an integer value, corresponding to a displacement of the block by one pixel. The embedding rule can be expressed as the following:

If $S(j)=0$ and u is odd, then make u even, otherwise do nothing; or (Rule 1)

if $S(j)=1$ and u is even, then make u odd, otherwise do nothing.

Equivalently, Rule 1 could be stated: "If $S(j)=0$, then make u even, else make u odd"? The operation of making u even/odd can be performed by AND/OR operations or by ADD/SUBTRACT operations.

The altered sets of motion vectors for frame(n) is denoted $U(n)^*$ and $V(n)^*$ respectively for the entire set of vectors and the subset. To maintain the signature in the motion picture, the displayed frame difference (DFD) is calculated on the basis of the unchanged set of motion vectors $V(n)$. The process of embedding the signature S is successively and repeatedly performed throughout the entire video sequence to obtain a high coding redundancy.

Retrieving the signature

To retrieve the signature, the decoded motion picture is sent through a similar encoder, and motion estimations between successive frames are once again performed. Now, the important question is, whether or not it is possible to obtain the set of motion vectors $V(n)^*$ again. To answer this, let us suppose first that the DFD is removed from the encoder. This way the $frame_d(n)$ (suffix 'd' for decoded) is predicted completely from $frame_d(n-1)$, and the Mean Square Error (MSE)-surface calculated in the motion estimation will have an absolute minimum, where the error is zero. So all blocks in $frame_d(n)$ will find a perfect match somewhere in $frame_d(n-1)$, and the set of motion vectors $V(n)^*$ can be found. From $V(n)^*$ the subset $U(n)^*$ can be extracted and the above-described embedding rule used in reverse order. This is only true as long as the DFD is not included in the scheme. By bringing the DFD back into the coding scheme, only assumptions about the estimated motion vectors can be made. If the energy level of the DFD for a given block is low, the block is almost fully predicted from $frame_d(n-1)$, and the error surface is not affected much by the addition of the DFD. It is therefore likely that the minimum of the error surface will be found at the same position in space, giving the same motion vector. The more energy the DFD contains, the more the error surface will change and the less likely it is for the minimum to be left unchanged.

Selection Criteria

To select the subset $U(n)$ of motion vectors suitable for coding, it is necessary to investigate each single block in a frame, and on the basis of some criteria, decide whether the belonging motion vector for the block should be added to the subset. The criteria should be defined so that a change of the motion vector will be imperceptible to the ordinary human viewer (thus, "invisible") in the resulting frame. To make the selection of the blocks independent of the change introduced by the coding, the blocks are selected on the decoded $frame_d(n-1)$. Three individual criteria have been selected for this purpose.

a) The standard deviation ($\sigma_{xy}$ of the pixel gray-level values inside a block plus a band around the block) should be less or equal to a given threshold value $C_\sigma$: $\sigma_{xy} \leq C_\sigma$.

b) The magnitude of the motion vector v should be larger than a given threshold value $C_{size}$: $|\vec{v}| \geq C_{size}$ where $\vec{v}$ is the motion vector and $C_{size}$ (motion-vector size criterion) is the minimum size of the motion vector.

c) The difference in pixel intensity from the median intensity for surrounding pixels should be smaller than the threshold value $C_{hist}$: max $(|x_m-x_i|)<C_{hist}$, $i=1, 2, \ldots, M$ where $x_m$ is the median value, M is the number of pixels in the block and $C_{hist}$ (histogram criterion) is the maximum-allowed distance to the median value.

If a block and a band around the block have the same uniform texture, it is unlikely that a displacement of one pixel will be visible (i.e., perceptibly visible). The uniformity of the texture can be expressed by the standard deviation. If $\sigma^2_{xy}$ is small, a displacement will be less visible. Most important for this criteria is the value of the threshold $C_0$. The value of $C_0$ is based on practical tests determining a suitable threshold so that the changes of the motion vectors will be invisible.

Figure 1A:
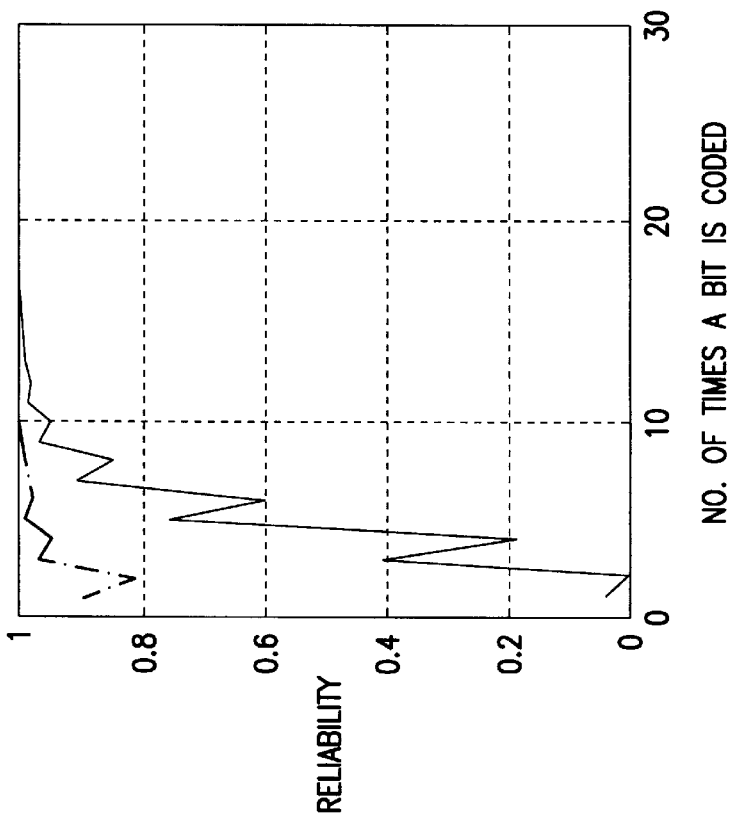

In FIG. 1 (comprised of FIG. 1A and FIG. 1B), the left graph (FIG. 1A) shows the relative number of correctly retrieved bits as a function of the number of coded bits. Since the graph converges towards a value of 0.9, this is assumed to be the probability of correctly retrieving one bit. In the right graph (FIG. 1B) using this probability, the reliability for retrieving the correct signature, is plotted as a function of the redundancy. The upper curve in FIG. 1A shows the reliability for a signature of only one bit, and the lower curve shows the same for a signature of 32 bits.

The second criteria relates to the way a motion picture is watched. Normally, if fast motion is present in a motion picture, the eyes of the spectator are not focusing on the moving objects. This is because fast motion normally is blurred a lot, making it difficult or unpleasant to focus on the moving objects. Also, the human visual system is less sensitive to details of moving objects. A change of fast-moving objects or areas will therefore most likely be unnoticed.

Test Results

FIG. 1A shows the average probability of correctly recognizing a bit as a function of the number of trials. Since the curve converges towards 0.9 as the number of trials increases, this is assumed to be the probability that a given bit is correctly recognized. In FIG. 1B, this probability has been used to compute the reliability of a signature versus the number of times the same bit has been coded. As the graph of FIG. 1B shows, the reliability increases as the same bit repeatedly is coded.

A signature S if length L=32, was embedded in a motion picture using the criteria for standard deviation. The value of $C_O$ was selected so that 32 bits were always coded n each frame. When visually comparing a frame without the signature to the same frame with the signature embedded, even side-by-side, it is not readily apparent to an observer which frame has the signature, and when displaying the video sequence (100 frames) on a monitor, one has to watch the sequence several times to detect artifacts caused by the signature.

This invention introduces the idea of adding an imperceptible or barely visible signature or a watermark to the images. As used in this description, a "signature" or "watermark" can include any information capable of digital representation, such as a digital code useful in identifying the source of the image information, or any other digital information that a user may want to encode onto a video signal. The method subtly codes some extra information into the images, making it possible extract the embedded information. This can be used, for example, to identify the source of the material. This embedding operation should be done without degrading the images in any subjectively visible way. That is, if an observer is not able to tell the difference, there has been no loss of quality, from the observer's point of view.

Below, some considerations regarding the development of a watermarking system for motion pictures are explained, and the objective of this invention is described: To integrate a watermark system into a block-based compression scheme by modifying motion information. The implementation environment and how to evaluate results are also described. The basic principle of a compression scheme using block-based motion estimation as well as the principle of embedding information into motion vectors are then described. Various criteria for determining whether the motion vector of a block should be coded or not are described. A probabilities coding technique using a pseudo-random generator is described. This method makes it possible to virtually code more information than is possible using physically coded schemes, thereby solving problems that arise if fewer than 16 blocks can be coded in a frame. The implementation and integration of the watermark system into an existing compression scheme running on a CRAY T3D massively parallel supercomputer 710 (for Encoder 610) and a Silicon Graphics workstation 720 (for Decoder 620) are then described. The online tuning of parameters and the artifacts introduced in the signed frames are also described. The resistance of the signature against different attacks made on the images is also examined.

The idea of watermarking images is not new, and a number of different methods have already been developed. One simple method consists of modulating the luminance of random chosen pixels, and is particularly suited for grayscale images. The same principle can be used to modulate entire blocks of pixels, where the block size, and the orientation or the pixel luminance value of each block are modulated to embed the information. Other research has proposed a block-based method where the dithering rule is modified. Another very used technique is to modify the DCT coefficient generated by a JPEG coder. All of these methods are applied spatially (single images), and, it is believed no temporal methods exist yet. In a temporal method, the information is embedded over multiple frames, so to extract the signature, several successive frames are required.

The watermark or signature can be an image itself superimposed on the image to be marked, or a bit stream representing a number. One embodiment uses a registration system, similar to the ISBN system of written publications, as a way of standardizing a signature. Throughout the rest of this description, 'the signature' refers to the specific binary string or number that is embedded in the motion picture, whereas 'the watermark' and 'watermarking' are used in a more general sense to include any signature, image, or bit stream used as a watermark.

Integrating watermarking into a broadcast system

For a watermarking system to be useful, it has to be able to work together with the future planned broadcast systems for video and TV, which for some cases are no longer so futuristic. A typical system includes an encoder, a distribution medium and a decoder. One such system is shown in FIG. 2.1.

At the distributor 210, the motion picture 212 is sent to an encoder 214 where the frames are compressed. From there, the compressed data stream 211 is transmitted by transmitter 216, satellite 220, and receiver 236 to the decoder 234 via a satellite link. The decoder 234, e.g., placed in the family living room, decompresses the data stream and the resulting motion picture 232 can be displayed on the family TV 238. The distribution media could also include a digital network or digital videotapes/CD's (compact disks), but regardless of the media, some kind of compression technique would generally be applied to the images before distribution. The ideal place to introduce a watermark procedure into the broadcast system is before the distribution of the images.

The MPEG-2 Standard

At the present time, the world-wide standard for quality compression of digital video is MPEG-2 (MPEG=Motion Picture Expert Group), although it is almost exclusively used for professional and scientific purpose so far. MPEG-2 is a generic method for compressed representation of video sequences using a common coding syntax defined by the International Organization for Standardization (ISO) and the International Electrotechnical Commission (IEC), in collaboration with the International Telecommunications Union (ITU). Originally, the primary application target was the all-digital transmission of broadcast TV quality video at coded bit-rates between 4 and 9 Mbit/second. However, the MPEG-2 syntax has been found to be efficient for other applications such as those at higher bit rates and sample rates (e.g., HDTV). As most compression schemes today, MPEG-2 is basically a block-based compression scheme using inter-frame motion estimation. The main principle of block-based motion estimation is described below.

Resistance to attacks

An important feature of the watermark is the resistance to any kind of attack exposed to the motion picture, intended or not. Hackers would deliberately want to remove or change the watermark and intensively search for methods to do so. But also common image-processing techniques applied to the motion picture for one reason or another are a threat to the watermark. Examples of these are enhancement techniques, and paradoxically, compression techniques, e.g., the MPEG-2 compression, used in the broadcasting of digital motion pictures.

But regardless of the purpose, the watermark would be worthless if one of the following situations occurred after an attack has been exposed:

a) The reliability of the retrieved signature can be questioned;

b) The signature has been changed; or c) The signature is unrecoverable.

Embedding and retrieving the signature

One way of making the watermark resistant to compression is to integrate the watermark procedure into the compression scheme, e.g., into a MPEG-2 coder. This way, one could always ensure that the watermark is present after the compression and decompression. Further, the watermark procedure could possibly take advantage of the processing and decomposition of the images performed during the compression process.

Just as important as the embedding is the retrieval of the signature. As mentioned earlier, the watermark is worthless if one is not able to retrieve the signature from the signed images. The retrieving of the signature could be based either on the marked motion picture alone, or on both the marked and original motion picture. Clearly, it is preferable that an authentication of a motion picture can be made without the original motion picture.

Using a secret key

To make the system more robust against attacks, a secret key is optionally integrated into the embedding and retrieving process. The secret key (e.g., a number) is given as input to the embedding process where it helps encrypting the signature into the images. To retrieve the signature, the secret key has to be given to the retrieving process in order to decrypt the signature.

Using a secret key provides several advantages. It prevents unauthorized persons from directly retrieving the signature from a motion picture, and then with the signature in the hand, claiming the ownership of the motion picture. Another reason for using a secret key is the robustness towards attacks. A hacker would find it much easier to modify the signature if he was able to directly retrieve the signature. An attack could be automated with a change-retrieve loop made on the video sequence, which could be repeatedly performed until the signature no longer is retrievable.

A block diagram of one desired solution is shown in FIG. 2C and FIG. 2D. Inputs to the embedding system 214 are a motion picture signal 213, a signature 217 and a secret key 219. The compressed and signed motion picture 215 is output. Input to the retrieving system 228 are the signed and decompressed motion picture 215 and the secret key 219. The retrieved signature 227 is output from retrieving system 228. In one embodiment, the signature to embed is a 32-bit number. This corresponds to almost 4.3 billion different numbers, which in the inventor's opinion, provides sufficient space for a worldwide standardized registration number.

Implementation

At the Signal Processing Laboratory (Laboratoire de Traitement des Signeaux, or "LTS") of the Swiss Federal Institute of Technology in Lausanne, a coding scheme has been developed and implemented to run in near real-time on a CRAY T3D massively parallel supercomputer 710. The coding scheme is block based and is used for the implementation of the watermark system. The main principles of the LTS coding scheme are similar to that of the MPEG-2 coding scheme, and a portability to the MPEG-2 encoder is therefore provided. Below, the principles of the compression scheme are described. A near real-time implementation is highly desirable when working with motion pictures because of the huge amount of data to be processed for just a few seconds of movie. Furthermore, since it is possible to make a near real-time solution on a software platform, real-time implementations in hardware are straightforward.

Four test sequences

Due to memory limitations in the hardware, the LTS coding scheme (used for one embodiment of the present invention) was only able to work with test sequences of CIF (Common Intermediate Format) with dimensions of 352× 288 pixels (corresponding to a quarter of the PAL standard, which is normally used for television and video in Europe). CIF uses a YUV color representation, and the data of each of the three components are stored as raw bytes. Further, to simplify the implementation, only gray-scale images (Y—the luminance part of the image) are used in the test sequences.

To test the watermark system, four different test sequences were used for tests. FIGS. 2.4A, 2.4B, 2.4C, and 2.4D show the first frame of each sequence, respectively. The four sequences are respectively the Basketball sequence, the Flower garden sequence, the Calendar sequence and the LTS sequence. FIG. 2.4A shows a frame from the Basketball sequence. The Basketball sequence has a lot of fast-motion players and panning across the play field. FIG. 2.4B shows a frame from the Flower Garden sequence. A rightward translation of the camera is made, so motion is leftward with multiple speeds. Particularly, the tree in the foreground is moving fast towards the left. FIG. 2.4C shows a frame from the Calendar sequence. The calendar is moving up and down. The toy train is moving towards the left pushing the ball, and a slow panning is following the train. FIG. 2.4D shows a frame from the LTS sequence. The man to the left is moving towards the woman. The camera follows the man as he moves. The length of each of the test sequences is limited to 75 frames (about 3 seconds of real-time video).

Evaluation of results

Since the embedding of a watermark involves a change of the images, watermarking objectively creates a degradation of the image. But if the changes are not perceptively visible to the human eye, then the subjective quality of the images are preserved. This is a very important factor in finding the "best", in a subjective way, method for watermarking. To be able to evaluate and compare the performance of a watermarking technique, the following two measures have been made:

Visually based quality measure

Peak-signal-to-noise-ratio (PSNR)

Visually based quality measure

Subjective visual inspection of the motion picture is probably the most valuable method of evaluating the results, but is also very difficult to standardize. However, a procedure has been defined to classify the degradation of the images. A motion picture is shown to a person a maximum of ten times in a row. If there are visible artifacts, the person will more likely discover the artifacts after 10 demonstrations than after one. And the larger the error, in a visible sense, the sooner it is likely for the person to notice it. Based on these considerations, the quality measure Q is defined as:

Q=Number of times a sequence is watched without noticing artifacts.                                       (Equation 2.1)

Peak-signal-to-noise-ratio (PSNR)

The Peak-signal-to-noise-ratio (PSNR) is an objective measure of the degradation of the images. It is defined as:

$$PSNR = 10\log_{10}\frac{255^2}{\frac{1}{N}\sum_{i=1}^{N}(x_i - \hat{x}_i)^2}$$ (Equation 2.2)

where $x_i (i=1, 2, \ldots, N)$ are the samples of the original image (gray-scale values) and $\hat{x}_i$ are the corresponding respective samples of the signed image.

A necessary condition for the quality of the motion picture to be good is that the PSNR>40 dB for each individual frame. The PSNR is only a measure of the degradation, but the PSNR alone is not sufficient to decide whether the quality of a motion picture is good.

The LTS Coding Scheme

As already mentioned, the LTS compression scheme of the present invention uses block-based motion estimation. Motion estimation is based on the fact that, normally, only small changes are introduced between two successive frames in a motion picture.

FIG. 3.2 illustrates this principle. The frame(n) 320 is divided into a number of blocks. Each block is assumed to present somewhere in frame(n-1) 321. So, to generate frame(n) 320, a set of motion vectors which describes the translation of each block from frame(n-1) 321 to frame(n) 320 is sufficient. To find the best match to a block 310, a full search is made within a given area 312 (see FIG. 3.1), where the Mean Square Error (MSE) is calculated for each possible position of the block in frame(n-1) 321 within the given area 312. This produces an MSE error surface 314, where the minimum of the surface signifies the best match. So for frame(n), a set of motion vectors $V(n)=\{v_1, v_2, \ldots, v_m\}$, where $v_i=(x_i, y_i)$, $i=1, 2, \ldots, m$, and m is the number of blocks in each frame, are obtained on basis of frame(n-1). From the set V(n) and frame(n-1), the frame$_p$(n) (suffix 'p' for predicted) is predicted and the Displayed Frame Difference (frame$_{dfd}$(n)) calculated as frame$_{dfd}$(n)=frame(n)=frame$_p$(n).                                       (Equation 3.1)

Clearly, frame(n) can now be reconstructed using frame(n-1), V(n) and frame$_{dfd}$(n).

Principles of operation of the encoder 330

FIG. 3.3 illustrates in simplified fashion, the functionality of the encoder 330. The frame(n) 320 is sent to the motion estimator (ME) 331 together with frame$_d$(n-1) 338 (suffix 'd' for decoded) where the set of motion vectors V(n) 339 are found (frame$_d$(n-1) 338 is used instead of frame(n-1) 321 because, as it will become clear later, the frame(n-1) 321 is not available at the decoder side). From the ME 331, the motion vectors V(n) 339 are sent to the Motion Compensator (MC) 332, where frame$_p$(n) 341 is predicted from V(n) 339 and frame$_d$(n-1) 338. The frame$_{dfd}$(n) 342 is calculated and sent to the Quantiziser (Q) 334, where the coefficients in frame$_{dfd}$(n) 342 are quantized. Together with the motion vectors V(n) 339, the quantized frame$_{dfd}$(n) is then sent to an entropy coder (EC) 335, where a compression of the data is made using a Lempel-Ziv coding. The output from the entropy coder 335 is a bit-stream 343 containing the compressed motion picture. A copy of the bit-stream is sent to an internal decoder 336, which performs a decoding and creates frame$_d$(n). This frame$_d$(n) is then passed on to the Frame Memory (FM) 337, so that it can be stored and used for coding frame(n+1). The first frame of a sequence is always stored directly in the frame memory 337 to initialize the encoder 330, and also sent directly to the decoder 340. Because of some technical details, the minimum quantization of frame$_{dfd}$(n) is a factor two, and, as a result of this, the compression is lossy.

Principles of operation of decoder 340

FIG. 3.4 illustrates the functionality of the decoder 340. The bit-stream 344 arrives to the Entropy Decoder (ED) 345, and is split up into the motion vector set V(n) 347 and the frame$_{dfd}$(n) 346. The motion vectors V(n) 347 are sent to the motion compensator (MC) by inverse quantizer (IQ) 348 where frame$_p$(n) 354 is generated. The frame$_{dfd}$(n) 346 is at the same time inversely quantized by inverse quantizer (IQ) 348. The decoded frame$_d$(n) 351 is then generated from the addition of frame$_p$(n) 354 and the inverse quantized frame$_{dfd}$(n). As with the encoder, a copy of frame$_d$(n) 351 is sent to a frame memory 352, for use in decoding frame$_d$(n+1).

To simplify the use of the LTS scheme, the block size is fixed to 16-by-16 pixels and the quantization of frame$_{dfd}$(n) is set to the minimum possible, namely a factor two.

Embedding information in the motion vectors

As discussed above, one objective of the embedding system is that it should be compatible with any block-based compression system using motion estimation. Based on this objective, information about a watermark could be coded either into the motion vectors V(n) or into the displayed frame difference frame$_{dfd}$(n), since these are general for all such block-based systems. Small differences in how the displayed frame difference is calculated are not uncommon, so the motion vectors are a more ideal place to hide information, with respect to generality.

Embedding the signature

To embed information into the motion vectors, a subset $U(n) \in V(n)$ is selected, and if necessary either the x or y-coordinate of the motion vectors are modified according to a predefined signature bit-set S(i), I=1, 2, . . . , L, where L is the number of bits in the signature. The size of the subset to be selected from V(n), depends on the number of blocks suitable in a non-visible sense for coding. If the number of vectors in U(n) is smaller than L, then the coding of one single signature must be spread out over multiple frames. The x and y-coordinates are either incremented or decremented by an integer value, corresponding to a displacement of the block by one pixel. This can be expressed by the following embedding rule:

To code the bit S(j), $1 \leq j \leq L$ in coordinate u, where u can be either the x- or y-coordinate, apply the following:

If S(j)=0 and u is odd, make u even.

If S(j)=1 and u is even, make u odd.   (Equation 3.2)

So for one block, two bits are coded. The change of a vector will cause a slightly different region to be selected from the previous frame. The altered set of motion vectors for frame(n) is denoted V(n)* and U*(n) respectively for the entire set of motion vectors and the subset. To maintain the signature in the motion picture, the displayed frame difference frame$_{dfd}$(n) is calculated on the basis of the unchanged set of motion vectors V(n). If the set V(n)* was used for this calculation, the change of the motion vectors would be canceled by the displayed frame difference. The process of embedding the signature S is successively performed throughout the entire video sequence to obtain a high redundancy. FIG. 3.5 shows the encoder 350 with the signature embedding procedure included.

Retrieving the signature

To retrieve the signature 227, the decoded motion picture is sent through the retriever 360, see FIG. 3.6, and motion estimation between successive frames is once again performed. Let V$_d$(n) 368 denote the set of motion vectors obtained by this operation. Now, the important question is, whether or not V$_d$(n) 368 is identical to V(n)* 358. To answer this, suppose first that all values in frame$_{dfd}$(n) 359 when embedding the signature are set to zero. This way the frame$_d$(n) is predicted completely from frame$_d$(n−1). So when motion estimation is made on the decoded frames, the MSE-surface calculated during the motion estimation will have an absolute minimum, where the MSE-surface value is zero. So all blocks in frame$_d$(n) will find a perfect match somewhere in frame$_d$(n−1), and the set of motion vectors will be of the same as V(n)*. So the subset U(n)* can also be found and the rule Equation 3.2 used in reverse order to extract the signature again. When frame$_{dfd}$(n) 359 contains non-zero values, only assumptions about the estimated motion vectors can be made. If the energy level of frame$_{dfd}$(n) 359 for a given block is low, the block is almost completely predicted from frame$_d$(n−1) 353 (see FIG. 3.4). This implies that the MSE surface will have a close to zero value at the position corresponding to the changed motion vector. It is therefore very likely that this will be the minimum of the error surface, and the correct motion vector is "refound." The more energy frame$_{dfd}$(n) 359 contains, the more the error surface will change and the less likely it is for the minimum to be left unchanged. This actually implies that a quantization of frame$_{dfd}$(n) 359 is an advantage, since energy is removed from frame$_{dfd}$(n) 359 when it is quantized. So the higher the quantization, the better the chance of recovering the correct motion vectors with the signature.

Test Results

To see whether the theory above actually applies in practice, a subset U(n) of 16 blocks, corresponding to 32 bits per frame, were selected for each frame in the four different test sequences (i.e., of FIGS. 2.4A, 2.4B, 2.4C, and 2.4D). The blocks were selected at random using a pseudo-random generator. In each subset, Equation 3.2 was applied to the blocks according to the signature S={0, 1, 0, . . . , 1, 0, 1}. The signed motion picture was then processed through the retriever 360 and the retrieved signature S' was compared bitwise to the original S. The subset U(n) was selected the same way as in the embedding process. FIG. 3.7 shows, for each of the four test sequences, the number of errors divided by the number of coded bits versus the number of coded bits.

As shown, each of the four graphs converge towards a constant value which varies from 0.005 for the calendar test sequence to 0.027 for the flower-garden test sequence. Since around 50,000 bits have been coded for each sequence, these values should more or less represent the probability for an error to occur in each of the given sequences. To avoid having four different values, the error rate is fixed at $q_e$=0.05   (Equation 3.3)

This value should be high enough to represent an upper limit for the error rate, and is used for all following calculations which include the error rate.

Reliability

With $p_e$=0.05, on average one out of twenty embedded bits will be false (in error). This means that a correct signature cannot be reliably retrieved if the signature is coded only once. But by repeatedly coding the signature, redundancy is added, and a signature can be more reliably extracted. A (correct) signature can be obtained by simply, for each of the 32 bits, selecting the binary value that occurs most frequently. This is illustrated by an example in Table 3.1.

TABLE 3.1

| frame(1)   | 0   | 1   | 0 | ... | 1   | 0 | (0) |
|------------|-----|-----|---|-----|-----|---|-----|
| frame(2)   | (1) | 1   | 0 | ... | 1   | 0 | 1   |
| frame(3)   | 0   | (0) | 0 | ... | 1   | 0 | 1   |
| frame(4)   | 0   | 1   | 0 | ... | (0) | 0 | 1   |
| frame(5)   | 0   | 1   | 0 | ... | 1   | 0 | 1   |
| signature: | 0   | 1   | 0 | ... | 1   | 0 | 1   |

Table 3.1 shows an example of signatures retrieved from 5 frames, and the result obtained by selecting the most frequently binary value. The parentheses signify an error.

The error rate $q_e$ can be used to calculate a measure of the reliability of this method with respect to the number of times the signature has been embedded. Since, e.g., each time the first bit is retrieved, the bit has the probability $p=(1-q_e)$ of being correct, then the number of correct bits over a number of frames will follow a binomial distribution. If X denotes the number of correct bits, then the probability mass function of X with parameters (n, p) is given by:

$$P\{X = i\} = \binom{n}{i} p^i (1-p)^{n-i}, i = 0, 1, \ldots, n \quad \text{(Equation 3.4)}$$

where n denotes the number of times the first bit has been retrieved. Now, the probability of having more than n/2 correct bits is given by:

$$P\{X > n/2\} = \sum_{i=k}^{n} \binom{n}{i} p^i (1-p)^{n-i}, \quad \text{(Equation 3.5)}$$

$$k = \begin{cases} n/2 + 1, & \text{if } n \text{ is even} \\ n/2 + \frac{1}{2}, & \text{if } n \text{ is odd} \end{cases}$$

This applies to each of the 32 bits in the signature, so a measure of the reliability of the entire signature can be given by:

Reliability of signature=$P(X>n/2)^{32}$   (Equation 3.6)

FIG. 3.8 shows the reliability as a function of the number of times the signature has been coded, with the assumed error rate $q_e$=0.05. The explanation of the jags of the curve is to be found in the restrictions on k in Equation 3.5. It should be noted that a necessary condition for retrieving the signature is that $$q_e > 0.5. \quad \text{(Equation 3.7)}$$

Visibility

FIG. 3.10 (comprised of FIGS. 3.10(a)–(d) shows frames 1, 2, 5 and 10, respectively, from the Basketball sequence after the random embedding. In the first frame, the artifacts from the displacements of the coded blocks are visible, especially on edges and lines. In the second frame, some artifacts of a different character are present, and these artifacts get more noticeable in frames 5 and 10. The PSNR for the four different sequences are shown in FIG. 3.9, and confirms that the amount of artifacts are high. The average values for the PSNR lie between 22 dB (for the calendar sequence and 27 dB (for the LTS sequence).

Since the artifacts are very visible, the quality of the sequences are the worst possible, namely Q=0. The reason for the increase of the artifacts during the first few frames is an accumulation of the artifacts in succeeding frames where the same blocks are coded. When the motion vector for a given block is changed in frame(n), an error is introduced. If the vector for the same block in the succeeding frame is left unchanged the frame$_{afd}$(n+1) will equalize the error, and frame(n+1) will have no artifacts caused by the changes in the previous frame. But if the motion vector for the block in frame(n+1) also is changed, then not just the error introduced by this, but also the errors from the previous frame will be present.

The test results described above show that it is actually possible to change the motion vectors in a block-based compression scheme in order to code information in the vectors and later after a decoding of the frames, retrieve most of the coded information again. Thus, if the redundancy is high enough, a 32-bit signature can be coded into a sequence of video frames using this method. An estimate of the reliability can also be calculated. From the images in FIGS. 3.10 (a)–(d), it is also clear that not all blocks are suited for coding. Thus, to have better quality, each block should be evaluated by some criteria whereupon the block is added to U(n) only if the criteria are satisfied. The criteria should be defined so that a change of the motion vector will be invisible in the resulting frame. Various selection criteria are described below. This introduces another problem. If the number of blocks selected for coding in a frame is less than 16, then only a part of the 32-bit signature can be embedded into each frame. Ways to solve this problem without having a complicated synchronization mechanism controlling when a signature starts and stops are described below. Additionally, to avoid an accumulation of artifacts as more and more blocks are coded, only every second frame will be coded.

Selection Criteria

Selection criteria are needed to select the blocks suitable for coding. Four different methods based on individual criteria, are combined into three different hybrid criteria, are described below.

The Standard Deviation

Considering FIG. 2.4A and FIG. 2.4D, one could expect the uniform areas in the two images (the sky and the background wall, respectively) to be well suited for coding, since a displacement of the blocks inside these areas would most probably be invisible. One way of describing the uniformity of an image is to use the standard deviation of the gray-level values inside the area. The sample standard deviation for a gray-level image is defined by $$\sigma = \sum_{i=1}^{M} \frac{(x_i - \bar{x})^2}{M - 1} \quad \text{(Equation 4.1)}$$

where $$\bar{x} = \sum_{i=1}^{M} \frac{x_i}{M},$$

x is the gray-level value, and M is the number of pixels in the image.

Now, a criterion can be defined by the following:

The standard deviation σ is calculated for the block b(k) using Equation 4.1. The block is then selected if σ<C$_\sigma$ where C$_\sigma$ (standard deviation criterion) is a threshold value determining the visible limit. (Equation 4.2)

Appropriate values for C$_\sigma$ for one embodiment are found in Table 8.1.

A few blocks (e.g., about 35 in one example) are selected in the frame from the flower-garden test sequence when C$_\sigma$=2; but only the blocks in the most uniform areas of the frame are selected. In some of the blocks, very thin branches from the tree are visible. Methods to avoid the selection of these blocks without lowering the threshold value are discussed below. Unfortunately, with C$_\sigma$=2, no blocks at all are selected in the Basketball test sequence; but a few blocks (e.g., about 28 in one example) are selected in the Basketball test sequence for C$_\sigma$=8. As it is seen, the texture inside the selected blocks can no longer be described as being uniform. The blocks in the top of the image have some very characteristic lines running through them, whereas the blocks in the bottom of the image have a smoother texture. Although, it appears that the blocks in the top of the image have a higher standard deviation than the ones in the bottom, this is not the case. A lot of the blocks actually have a lower standard deviation. The fact that the lines through the blocks are seen so clearly is related to the structure of the human eye. Because of lateral inhibition between the cells in the eye, the eye is very sensitive to single spots and lines or sharp transitions between areas with different luminance values. This makes most of the blocks in the upper part of the image unsuitable for coding, whereas some of the blocks in the bottom are well suited for coding. Since the standard deviation is not able to differentiate between these blocks, other criteria that can analyze the texture in a block are needed. FIGS. 4.1A and 4.1B show blocks from two regions of a frame. When the gray-level histogram for a block from one region of a frame, for example FIG. 4.2A corresponding to the block of FIG. 4.1A, is compared with the gray-level histogram for a block from a different region, for example FIG. 4.2B corresponding to the block of FIG. 4.1B, except for the fact that the mean gray-levels in the two blocks can different, the histograms often do not reveal much about the texture in the two blocks. The shape of the histograms are more or less the same. This tells us that the difference between the texture of the block is due to the frequency contents.

The Shape of the Frequency Amplitude Plot

One of the most powerful tools for analyzing texture is the 2D-Fourier Transformation (2DFT). Characteristic patterns, e.g., lines, become very obvious in the frequency domain. FIGS. 4.3A and 4.3B, respectively, show the 2DFT amplitude plots of two blocks whose histograms are shown in FIGS. 4.2A and 4.2B respectively. To avoid the DC-component dominating the plots, the DC-component has been set to zero. As expected with an image size of 16×16 pixels, the frequency resolution is correspondingly low. This makes it difficult to picture the distribution of the frequencies. If one views the images with the eyes are half closed, it becomes easier. The plot in FIG. 4.3A is dominated by three lines (one horizontal, one vertical, and one diagonal) running through the middle of the image (zero), where some distinct frequencies have much higher values than the rest. Since high values at distinct frequencies represent characteristic patterns in the spatial domain (which are more likely to be noticed if the block is moved by the encoding process), this block is not suited for coding. In FIG. 4.3B, the energy is more evenly distributed. The highest values are around the center and then the values decrease more or less equally in all directions away from the center. This represents a smoother spatial image, which could be suitable for coding. To extract information on the shape of the amplitude plot, a small adaptive-thresholding algorithm is used.

The maximum value of the amplitude plot is found, and is then used as the basis for the thresholding. All values larger than a given proportion of the maximum value are set to one and the rest are set to zero.

Let F(u, v) represent the Fourier-transformed block. Then, for all values in $|F(u,v)|$, u,v=1, 2 . . . , m (m-by-m pixels), the following rule is applied to create the binary image $I_{bw}$:

If $|F(u,v)| < C_{bw} \cdot \max(|F|)$ then $I_{bw}(u,v) = 0$

If $|F(u,v)| \geq C_{bw} \cdot \max(|F|)$ then $I_{bw}(u,v) = 1$  (Equation 4.3)

where $C_{bw}$ Fourier bandwidth Criterion is the factor that determines the threshold value relative to the maximum value max ($|F|$). Note that the DC-value is set to zero before the thresholding is done.

The thresholded images with $C_{bw}=0.12$ are also shown in FIGS. 4.3C (corresponding to the plot of FIG. 4.3A) and 4.3D (corresponding to the plot of FIG. 4.3B). As it is seen, the difference between the two blocks has become much more visible. The distribution of the energy in the frequency domain can now be determined roughly by the number of pixels that equal one in the binary image $I_{bw}$. That is, $$z = \frac{\sum_{i=1}^{m} \sum_{j=1}^{m} I_{bw}(i, j)}{m^2}$$  (Equation 4.4)

where m again is the block size, defines z as a measure of how well the energy is distributed on a scale from 0 to 1. If z is close to 0, some very distinct frequencies are dominating, and the block is most certainly unsuited for coding. If z is close to 1, the energy is well distributed and the block can be coded provided that the standard deviation of the block is not too high. The final criteria can be expressed as follows:

a) The block b(k) is Fourier transformed, and the DC-value is set to zero.

b) A binary image $I_{bw}$ is then created by thresholding the amplitude plot according to the following threshold value $C_{bw} \cdot \max(|F(u, v)|)$.

c) The shape descriptor z is calculated by $$z = \frac{\sum_{i=1}^{m} \sum_{j=1}^{m} I_{bw}(i, j)}{m^2}$$

where m is the dimension of the image.

d) If $z > C_z$, then b(k) is selected for coding.

$C_z$ (shape descriptor criterion) is a threshold value that determines how well distributed the frequencies should be. Appropriate values for $C_{bw}$ and $C_z$ are determined by experiments.

In one embodiment, the signature encoding is applied to the remaining blocks in the frame after the above criteria have been applied with values $C_{bw}=0.12$ and $C_z=0.7$.

The Speed of the Motion Vector

If, in a sequence, there is some very fast motion, then a change of the blocks in the areas where the fast motion is present will likely be less visible than if no motion is present. Fast motion is normally blurred to a certain degree as a result of a too-long exposure time relative to the speed. FIG. 4.5A shows a frame from the Basketball test sequence where the blurring of the fast moving parts is very obvious. The image is blurred as a result of the motion, and especially the Basketball is very indefinable. In FIG. 4.5B, the blocks selected by the criteria that the size of the motion vector is to be larger than 5 pixels for a block to be selected.

The motion vectors themselves are generally a measure of the motion present in the image, so the size of the motion vectors can be used to detect fast motion. The size of the motion vector is not always an expression of fast motion, though. It can easily occur that the position of the minimum in the MSE surface does not represent an actual motion. This usually happens when the texture in the block and the whole search area in the previous frame are very similar, so that the MSE surface becomes almost flat. A coincidence of noise in the block and the search area can then create an erroneous minimum.

A criterion based on the size of the motion vectors can be expressed as:

A block b(k) is selected if $|\vec{v}| > C_{size}$ where $\vec{v}$ is the motion vector and $C_{size}$ (motion-vector size criterion) is the minimum size of the motion vector. One set of appropriate values for $C_{size}$ is shown in Table 8.1 below. FIG. 4.5B shows the blocks selected from FIG. 4.5A with $C_{size}=5$.

The Shape of the Histogram

As mentioned above, dark spots and very thin lines could be excluded by lowering the standard deviation threshold value, although this would also exclude other blocks that are suitable for coding. For example, two different blocks from a frame can be examined, together with their gray-level histograms. Both blocks could have almost the same low standard deviation (e.g., around 2.3), though the second block has some dark spots in the upper left corner that catch the eye. The histograms of these two blocks explain the phenomena. In the first histogram, all the pixels are gathered around a certain gray level, so the maximum distance to the mean gray level is low (6 gray levels). In the second histogram, the majority of the pixels are gathered even closer around a certain gray level, except for certain pixels ("outliers") being substantially lower than the rest of the values, making the maximum distance to the mean much higher (27 gray levels). These outliers are the ones that are visible. They are not numerous enough to increase the standard deviation, and the $C_{bw}$ and $C_z$ criteria described above do not make it possible to distinguish the two blocks. To those criteria, the differences between the two blocks are small. But considering the two histograms, a criteria could be to restrict the maximum distance to the mean value. This would exclude blocks with outliers. A more conservative criterion is to use the maximum distance to the median value. This criterion can be expressed as follows:

The block b(k) is selected if $\max|x_m - x_i| < C_{hist}$, $i=1, 2, \ldots, M$ where $x_m$ is the median value, M is the number of pixels in the block and $C_{hist}$ (histogram criterion) is the maximum-allowed distance to the median value. An appropriate value for $C_{hist}$ is determined by experiments. In one embodiment blocks are selected in the frame by first applying the standard deviation criterion with $C_o = 2$ and then applying the histogram criterion.

Using the criteria on the previous frame

A necessary condition in order to retrieve the signature is that, based on the criteria, it is possible to select the same blocks during the retrieving process as were selected during the embedding process. Let us assume for frame(n) a criterion is applied to all blocks, and that three blocks fulfill this criterion, see FIGS. 4.9A and 4.9B. FIG. 4.9A shows a block diagram of an encoder 491 which selects blocks to encode based on criteria that are met by blocks in frame(n), and FIG. 4.9B shows a block diagram of a corresponding decoder 492 for encoder 491 which selects blocks to decode based on applying the criteria to frame$_d$(n).

The motion vectors of the three blocks are then coded according to signature and the rest of the compression is performed, followed by a decoding, creating frame$_d$(n). Now, when an attempt to retrieve the signature is made, the criteria cannot be applied to frame(n), since it is not available at the retriever; instead the criteria have to be applied to frame$_d$(n). But frame$_d$(n) has purposely been changed relative to frame(n) to embed a signature, so there is no guarantee that the same blocks will fulfill the criteria. Also, because of the quantization made during the compression, it is possible for other blocks, which almost fulfilled the criteria when the signature was embedded, now to satisfy the criteria in frame$_d$(n). As a result, the error rate of the retrieving process would increase.

A way to avoid this, and always select the same blocks, is to (if possible) apply the criteria to frame$_d$(n-1), which are available both at the embedding time and at the retrieving time. FIG. 4.10A shows a block diagram of an encoder 493 which selects blocks to encode based on criteria that are met by blocks in frame$_d$(n-1). FIG. 4.10B shows a block diagram of a corresponding decoder 494 for encoder 493 which selects blocks to decode based on applying the criteria to frame$_d$(n-1). This, though, introduces another problem. Since the blocks are selected on the basis of frame$_d$(n-1), the criteria might not apply to the same blocks in frame(n) and some visible artifacts could thereby be created. This can be solved by including a band of a certain width around the blocks in frame$_d$(n-1) when the criteria are applied. If the block plus the band in frame$_d$(n-1) fulfill the criteria, there is a good chance that the same block in frame(n) also fulfills the criteria.

Hybrid Criteria

The four individual developed criteria can now be combined to create three appropriate hybrid criteria. Since the value of the standard deviations seems to be the most important factor, restrictions about the standard deviation are made in all three hybrid criteria:

1. First hybrid criterion: A first criterion for the standard deviation is combined with the criterion for the maximum distance to the median: $C_{o1}$ and $C_{hist}$.
2. Second hybrid criterion: A second criterion for the standard deviation is combined with the criterion for the shape of the frequency plot: $C_{o2}$ and $C_{bw}$ and $C_z$.
3. Third hybrid criterion: A third criterion for the standard deviation is combined with the size of the motion vectors: $C_{o3}$ and $C_{size}$.

The first two hybrid criteria are applied to frame$_d$(n-1), whereas the criteria involving the size of the motion vectors obviously must be applied to frame(n). All the above threshold values are determined below, together with the improvements in quality the use of the criteria involves.

Four different individual criteria for selecting blocks have been developed: the standard deviation of the gray levels in a block, the shape of the frequency amplitude plot of a block, the size of the motion vector, and the maximum distance to the median gray level. The four individual criteria have been combined in various combinations into three hybrid criteria. In one embodiment, if any one of the three hybrid criteria applies for a given block, the block is selected for coding.

A Probabilistic Coding Procedure

As mentioned above, problems arise in embedding when fewer than 16 blocks can be modified in a frame. To overcome this problem, a probabilistic coding technique has been developed.

If in a sequence, the extreme case occurred that only one block could be coded in each frame, then how should one determine which part of the signature to code in this block? One solution would be to start from one end of the signature, and then code two bits (one block enables a coding of two bits) in each frame until the end-of-signature is reached. This procedure could then be repeated throughout the motion picture. This could be a good solution if no frames ever are lost, but if the first frame for one reason or the other was missing in the retrieving process, then the retrieved signature would be a version of the original version, but shifted/rotated by two bits. The problem gets even more complicated when an arbitrary number of blocks is coded in each frame. To overcome this, a synchronization mark could be inserted to signify when a signature starts and stops. However, such synchronization marks would occupy many of the blocks which could be used for coding the signature.

To avoid a synchronization mechanism, a technique has been developed where virtually at least 32 bits are always coded in a frame if any blocks are selected.

Using a Binary Random Sequence

If a Binary Random Sequence (B.R.S.) R(i), $i = 1, 2, \ldots, n$, is generated and compared bitwise to a signature S(i), $i=1, 2, \ldots, n$, then each bit in the B.R.S. has the probability $p = q_e = 0.5$ of being correct, so on average half of the bits will be correct. As described previously, a necessary condition for retrieving a signature from a number of bit-streams is that $p > 0.5$. That is, the probability for a given bit to be correct in a bit-stream should be higher than 0.5.

If c and w denote the number of correct and wrong bits, respectively, one of the following three situations can arise when a B.R.S. is generated:

$$\left.\begin{array}{l} c = (n-w) > n/2 \\ c = w = n/2 \\ c = (n-w) < n/2 \end{array}\right\} \{n = 2 \cdot i \mid i \in I^+\}$$

Clearly, in the last situation, $w > n/2$.

If R is bitwise inverted, the number of right bits and the number of wrong bits will be swapped, i.e., if the following inversion rule is applied to the B.R.S., one can always ensure that $c \geq n/2$.

If $c<n/2$, invert all bits in R; otherwise do nothing. (Equation 5.1)

So by generating an n-bit B.R.S., comparing it to an n-bit signature and then applying Equation 5.1, one can produce a bit-stream where, in the worst case, only half the bits correspond to the given signature. That is, the probability for a given bit to be correct has been increased, i.e. p>0.5. This probability is calculated for different values of n below.

In one embodiment the B.R.S. is a pseudo-random sequence generated from a seed, in order that the same seed will generate the same B.R.S. at both the encoder and the retriever.

Calculating the Probability p

The exact value of p depends on the length of the bit-stream. The following expression determines p as a function of n.

$$p_n = \frac{1}{2^n} \cdot \binom{n}{n/2} \cdot \frac{1}{2} + \frac{2}{2^n} \sum_{i=n/2+1}^{n} \binom{n}{i} \cdot \frac{i}{n}$$ (Equation 5.2)

The first term is the situation where $c=w=n/2$. There are $$\binom{n}{n/2}$$

possibilities of having n/2 correct bits out of a total of $2^n$ combinations. Since half the bits are correct, theoretically the probability for each bit is ½. Using exactly the same arguments, the second term is the situation where $c>n/2$. Notice that each situation will occur twice, explaining the factor 2 in front of the summation. Table 5.1 shows the probability p for different values of n.

Practical Use

In practice, if the same B.R.S. could be generated at the embedding time and at the retrieving time, then a partly correct signature could be embedded by coding only whether the B.R.S. should be inverted or not. Let a '1' signify an inversion, and '0' signify no inversion. To generate the same B.R.S. when embedding and retrieving, a pseudo-random generator initialized with the same seed can be used. However, a necessary condition is that the seed should be different for each generated B.R.S. and as 'random' as possible. Theoretically, if the seed is not a random number, then each generated B.R.S. is not independent and Equation 5.1 does not apply.

The B.R.S. can be utilized in two different ways. One creates a dependency between the blocks inside the frame, whereas the other does not.

Dividing the Signature Between Blocks

For a given frame, m blocks are selected for coding, and these m blocks are divided into groups each having a power-of-two size with a maximum size of 16; e.g., with m=13, the partitioning would be three groups having sizes 8, 4, and 1, respectively. Let $m_2$=1, 2, 4, and 8, the following procedure can be used:

1. The signature is divided in 32 ($2m_2$) subparts;
2. For each subpart, a B.R.S. of length 2 $m_2$ is generated;
3. Equation 5.1 is applied to the random sequence, using the corresponding subpart of the signature as reference; and
4. If the random sequence should be inverted, a '1' is coded, and if not, a '0' is coded.

For example, a 32-bit signature has been coded L times in each frame. To retrieve the signature, almost the same procedure is carried out. The only difference is that the bits obtained from the decoding of the blocks, are used to determine whether the generated B.R.S. should be inverted or not. Finally, the different B.R.S.'s are put together to create a 32-bit signature.

Coding 32-Bit Blocks

The other solution is to always code 32 bits in each block. The signature is split into two parts (respectively for the x and y coordinates of the motion vector), a 16-bit B.R.S. is generated for each part and then according to Equation 5.1, a '1' or a '0' is coded. At the retrieving side, the coded information is then, as before, used to determine whether the two generated B.R.S.'s should be inverted or not.

Calculation of Reliability

Before determining which solution is the most attractive, it is appropriate to look at the reliability obtainable with the two different solutions. It has been described how an estimate of the reliability of a signature could be calculated as the probability of having more than half the bits correct after a given number of coded signatures. For each of the different probabilities (except for p=1) in Table 5.1, an estimated reliability of a 32-bit signature (as a function of the number of blocks coded) using B.R.S. of different lengths to embed the signature has been calculated.

TABLE 5.1

| n | 1 | 2 | 4 | 8 | 16 |
|---|---|---|---|---|---|
| p | 1 | 0.75 | 0.69 | 0.64 | 0.60 |

Table 5.1 shows the probability p for different values of n.

The results are illustrated in FIG. 5.1. FIG. 5.1 shows the reliability of a 32-bit signature using different lengths of B.R.S.'s. The probabilities in Table 5.1 are multiplied with $(1-q_e)$, to have the real error rate.

As FIG. 5.1 shows, the reliability decreases as the length of the B.R.S. is increased. Specifically, with a B.R.S. of 16 bits, the reliability is visibly lower, and around 800 blocks have to be coded before an acceptably high reliability is reached. This speaks for the first of the two solutions, since a higher reliability can be reached using a shorter B.R.S. But if the motion picture is attacked and some blocks in a frame are erroneously not selected, then the rest of the blocks in the frame will be worthless, since the splitting of the signature makes the blocks dependent on one another. It might be that this will make the practical reliability much lower that it appears from the curves. If each block is coded independently using B.R.S.'s of 16 bits, there is no dependency between blocks, and the reliability will not decease remarkably if a block in a frame is not selected in the retrieving process.

A probabilistic coding model has been developed to solve the synchronization problems that arise when fewer than 16 bits can be coded. Two different ways of using this model are presented. Since it is desirable to have the highest possible reliability under all conditions, the solution where blocks always are coded with 32 bits (two B.R.S.'s of 16 bits each) are preferred. This is believed to create the most robust embedding of the signature.

Combining the selection criteria and the probabilistic model each described above, a preferred watermark system 600 is presented in FIGS. 6.1 and 6.2. The embedding system 610 and the retrieving system 620 are described, and some remarks about the seed for the random generator are made.

The Watermark Embedding System 610

FIG. 6.1 shows a block diagram of one preferred embedding system 610. The inputs are the motion vector set V(n)

and frame$_d$(n−1), the secret key and the signature. From the first two inputs, the subset U(n) of blocks suitable for coding is selected using the selection criteria. From frame$_d$(n−1), the subset U(n), and the secret keys, a seed is generated for each of the B.R.S.'s to be generated. The method to calculate the seed is explained below. The seed is then coupled to the pseudo-random generator, where the B.R.S.'s are generated and sent to the embedder, where the B.R.S. is compared to the signature, and U(n) is then coded accordingly. The motion vector set V(n)* containing the embedded information is provided as output.

The Watermark Retrieving System 620

FIG. 6.2 shows a block diagram of one preferred retrieving system 620. The inputs are the motion vector set V$_d$(n), frame$_d$(n−1), and the secret key. Based on the first two inputs, the subset U$_d$(n), is selected using the criteria. Using U$_d$(n), frame$_d$(n−1), and the secret keys, a seed is calculated for each B.R.S. to be generated. The bit values retrieved from U$_d$(n) determine whether or not the B.R.S.'s should be inverted. A signature is then generated based on the results of all the previous generated signatures, as described above.

Generation of the Seed

The generation of the seed 615 for the random generator 616 is a very important component of the watermark system. It is clear that for a given block in a given frame, the same seed must be generated both during the embedding process (seed (n) 615) and the retrieving (seed$_d$(n) 625). Otherwise, the generated B.R.S.'s will not be identical, and no signature will be retrieved. So the seed has to be invariant to attacks applied to the frames. At the same time, the seed must have a random nature, or else the theory behind the probabilistic coding model will not apply. These properties make the integration of a secret key very easy. As already illustrated, the secret key can be used as input to the generation of the seed. The seed then becomes dependent upon the secret key, and without having the secret key, the correct seed cannot be generated and the signature cannot be retrieved. During the tests of the system, no key has been used, since it makes no difference in the performed tests. The way the seed is calculated in tests follows:

For each block, the seed is calculated as:

$$\text{seed} = \text{floor}(\bar{x} \cdot 10) \cdot d_c \qquad \text{(Equation 6.1)}$$

where $\bar{x}$ is the mean gray level value of the block and $d_c$ is the distance from the center of the block to the center of the frame. This should make the seed invariant at least to mirroring. Further, there is reason to believe that if small changes are made to the signed sequences, the seed remains the same. Using this seed, 32 random bits are generated, and then split up into the two B.R.S.'s needed per block.

Watermark system 600 has been described above. The seed for the random generator is an important component of the watermark system, and the way the seed is calculated during the tests has been described. It should be noted that in calculating the seed, the seed should be invariant towards changes made to the signed sequence.

In one embodiment, the LTS compression encoder 610 is implemented on a CRAY T3D Massive Parallel Supercomputer 710 and the decoder 620 on a Silicon Graphics workstation 720. This section briefly describes the way the two computers work together, as well as the hardware involved to make this possible. The architecture of the T3D 710 is described in general and some of the principles about how to program in parallel on the T3D 710 are briefly described. The idea of using parallel technology for image processing is presented. The visualization system on the Silicon Graphics computer is described.

FIG. 7.1 illustrates one entire compression system 700, in which the encoding is performed on the CRAY T3D 710 and the decoding on the Silicon Graphics workstation 720. The T3D 710 is accessed through a CRAY Y-MP 730 which acts as a front-end system for the T3D 710. All programs for the T3D 710 are compiled on the Y-MP. Between the T3D 710 and the Y-MP there is a special high-bandwidth connection. The T3D 710 has no disk for storage of data, but has access to a disk via the Y-MP. The data pathway is as follows. The Y-MP gets an image frame from the hard disk (HD), and sends the frame to the T3D 710. The T3D 710 performs a compression of the frame, and transmits it back to the Y-MP. From here, the frame is sent via an optical net link to the Silicon Graphics computer (SGI 720), where the frame is decompressed and visualized on a monitor. Connected to the SGI 720, is a tuner unit, from which the different parameters in the compression process can be controlled. The changes of the parameters are sent back to the T3D 710, and will have effect from the next image frame to be compressed.

The Cray T3D 710 is a massively parallel processing (MPP) machine with CPU nodes connected according to a three-dimensional torus topology (hence T3D). The microprocessor used in each processing-element node of T3D 710, the DECchip 21064 (more familiarly known as the DEC Alpha), is capable of 150 MFLOPS peak performance. Each microprocessor has its own local DRAM memory with a capacity of 64 Mbytes (8 Mwords). Each processing element (PE) in the CRAY T3D 710 system comprises the DEC Alpha microprocessor, local memory and some support logic. Although the memory is physically distributed, it is globally addressable; any microprocessor can address any memory location in the system. More information about the T3D 710 architecture can be found in Cray Research Inc., "CRAY T3D System Architecture Overview," 1994.

Software Implementation

The programming language used for the implementation is C. Some additional libraries are available for handling the communication between the processor element and their respective memory areas. How many processor elements are used can be specified either at compile time or at run time. The number of processor elements has to be a power-of-two number, and a maximum of 256 processor elements. Only one program exists, which is executed on all processors at the same time. Some predefined variables as _NPES, the number of processors available, and _MYPE, my processor (holds the current processor number), are used to make the execution different on the different processors. These variables also make it possible to make the system scalable; that is, to be able to run with a different number of processors without changing the C-code. Whenever two PE's want to exchange data in some way, the two PE's have to be synchronized by special commands. For further details about how to synchronize the T3D see U.S. Pat. No. 5,434,995 issued Jul. 18, 1995, which is incorporated by reference.

Image Processing Using Parallel Technology

A parallel processing structure like the one in the T3D 710 is especially useful when processing images. When an image is processed, the same operations are often repeated to the different parts of the picture. So the image could actually be divided into a number of partitions, in which each partition is processed separately on different PE's and then subsequently put together again to form the entire processed image. This concept is illustrated in FIG. 7.2. Ideally, if no time is wasted in synchronizing and exchanging data between the different PE's, the processing time should be reduced with a factor corresponding to the number of processors used. In practice, the execution time can only reduced to a certain value, because the time used for synchronization and data exchange becomes dominant relative to the processing time. Beyond this point, there is no speed gain by further increasing the number of processors.

Implementation of the Watermark System

The software implementation of the watermark system 700 follows the block diagrams in FIG. 6.1 and FIG. 6.2. The blocks are divided between the different processors using the following principle: Each processor handles at least:

$$B_{pe} = floor\left(\frac{m_b}{NPES}\right) \qquad \text{(Equation 7.1)}$$

blocks, where $m_b$ is the number of blocks in the image. Further, the first $m_b$–$(B_{pe} \cdot NPES)$ processor handles $B_{pe}+1$ blocks.

Figure 15:
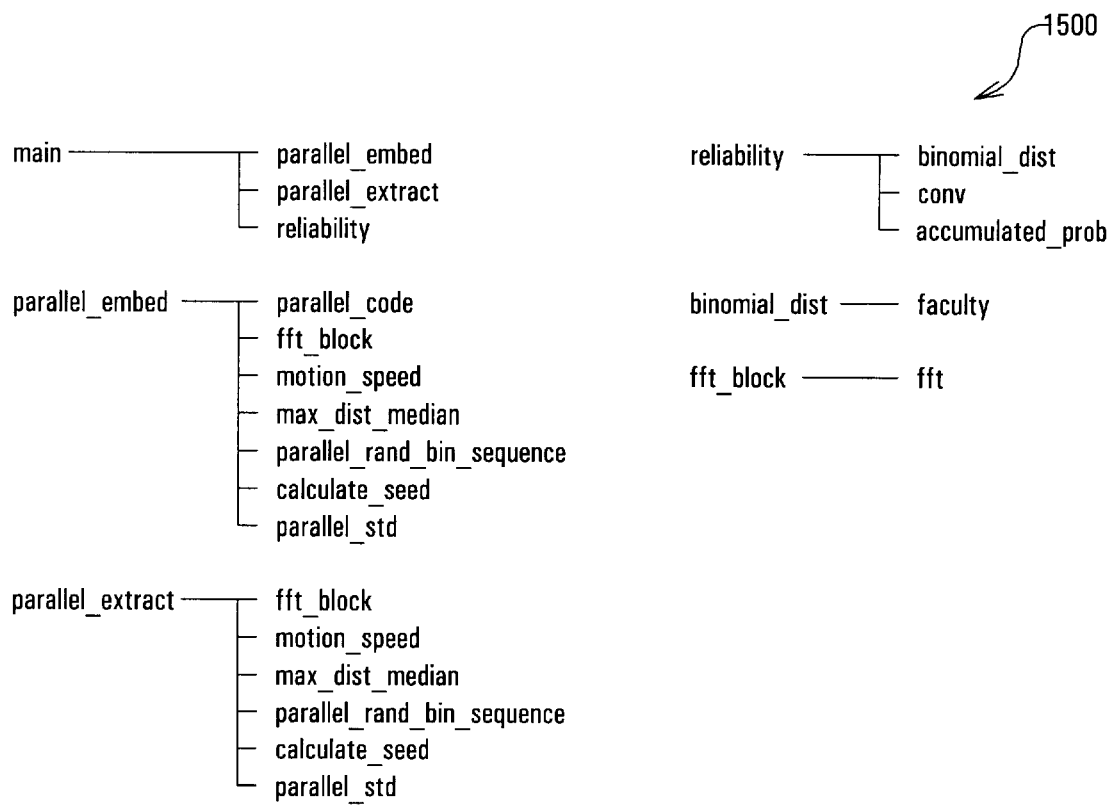
FIG. 15 shows the tree structure 1500 of the relationships between the functions 1000, 1100, 1200, 1300, and 1400.

FIGS. 10–15 give an overview of all the C-functions used in one embodiment. FIG. 10 shows the main watermark functions 1000. FIG. 11 shows the criteria functions 1100. FIG. 12 shows the reliability-calculation functions 1200. FIG. 13 shows the I/O functions 1300. FIG. 14 shows various miscellaneous functions 1400. FIG. 15 shows the tree structure 1500 of the relationships between the functions 1000, 1100, 1200, 1300, and 1400.

Figure 16:
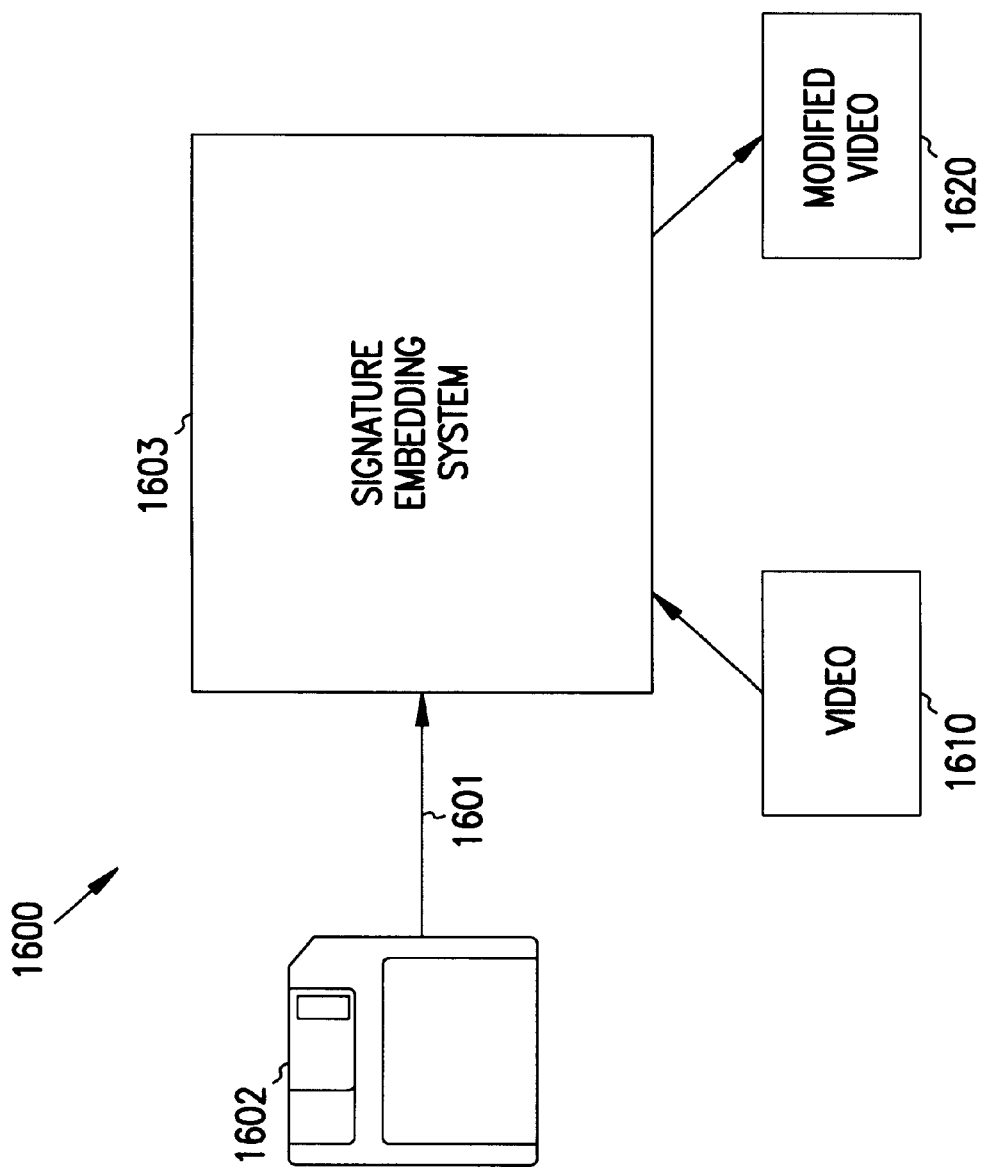
FIG. 16 illustrates a system implementing one embodiment of the present invention 1600 having program code 1601 delivered on computer-readable media 1602.

FIG. 16 illustrates a system 1600 implementing one embodiment of the present invention, wherein computer program software 1601 is stored on storage medium 1602 for transporting and loading into signature-embedding system 1603. Storage medium 1602 has a computer program 1601 stored thereon for causing a suitably programmed system 1603 to produce a modified video signal by performing one or more of the methods of the present invention, as described above. System 1603 receives input video 1610, and using one or more of the above-described methods, generates modified video 1620. Input video 1610 can be raw analog video, or can be digital video either before or after compression (such as MPEG-2 compression). In one embodiment, if input video 1610 is analog, it is digitized in system 1603. In one embodiment, if input video 1610 is digital and not compressed, (or was analog and is now digitized) it is compressed using MPEG-2 techniques to extract motion vectors in system 1603. Using techniques such as described above, suitable blocks are selected, and their motion vectors modified to encode the digital signature. The result is then output as modified video 1620.

Figure 17:
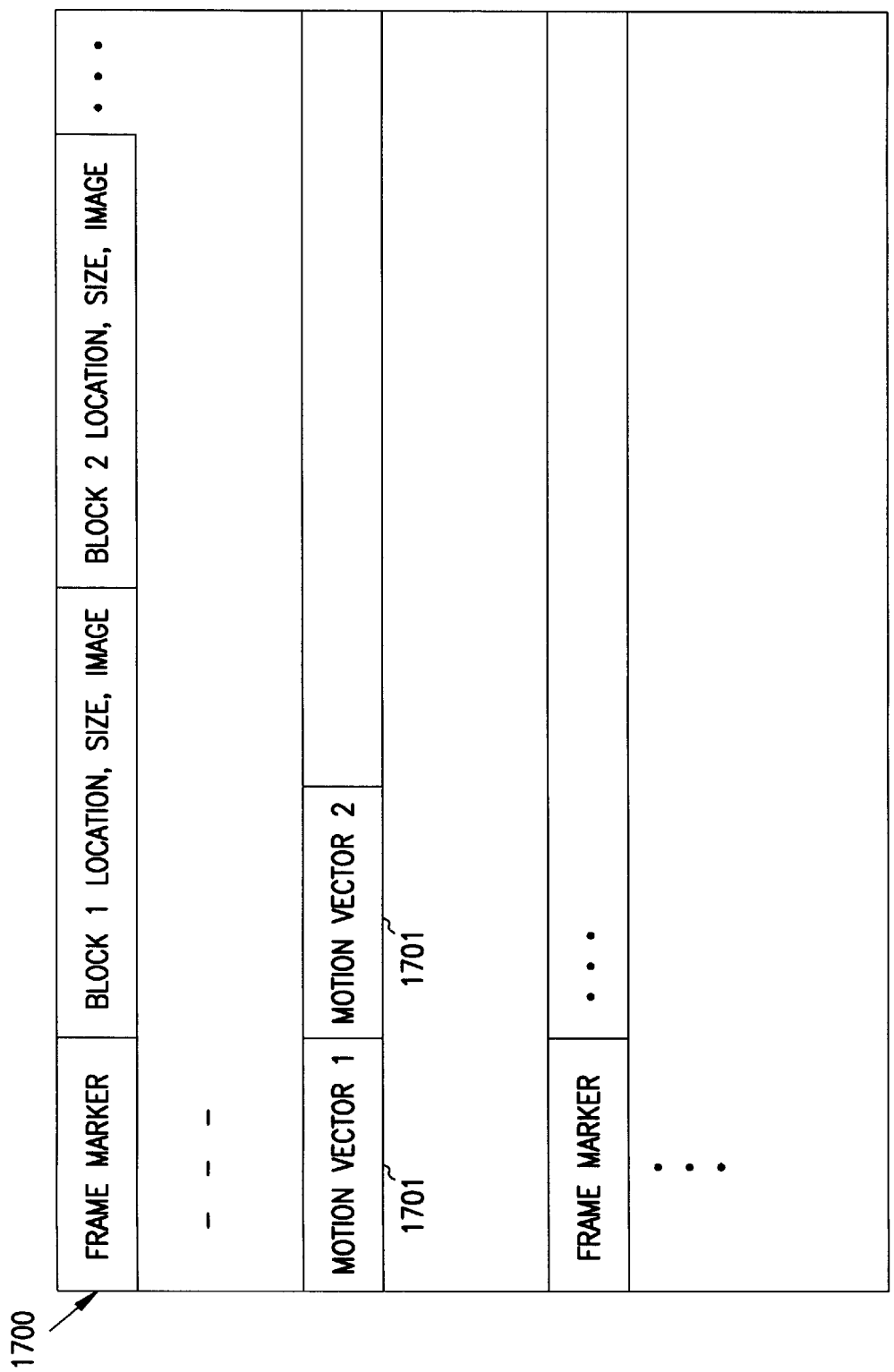
FIG. 17 illustrates a data structure for implementing one embodiment of the present invention 1700.

FIG. 17 illustrates a data structure 1700 for implementing one embodiment of the present invention. Data structure 1700 can be used to hold the modified video 1620. In one embodiment, data structure 1700 is otherwise identical to a conventional MPEG-2 video frame, except that some of the motion vectors 1701 have been modified based on criteria determined from the video sequence, as described above, such that a subsequent examination, by a suitably programmed system, of the modified video sequence will be able to retrieve the signature information based on information in data structure 1700.

Direct View

The software on the Silicon Graphics workstation 720, a software visualization system named DirectView, has been adapted to the watermark system 700. As mentioned earlier, it is possible from DirectView to control the parameters in the compression process, thereby making it possible in real time to tune the parameters of the compression. The program has been changed to instead include the threshold values. This way, the threshold values for all the selection criteria can be adjusted and the effect of the adjustments can be visualized immediately. This makes a great difference when trying to determine the optimal threshold values. An off-line fine tunning of the threshold values would be a very time-consuming process. From DirectView, the threshold values $C_{o1}$, $C_{o2}$, $C_{o3}$, $C_{hist1}$, $C_{z2}$, $C_{bw2}$, and $C_{size3}$ can be adjusted. The final tuning of these parameters is described below. The calculated reliability, together with the number of coded blocks, are also transmitted to the Silicon Graphics workstation 720 and visualized.

When 64 processor elements are used in T3D 710, it is possible to obtain an average performance of almost 5 frames per second. Since every second frame is left uncoded, there is a small variation in the processing time between the frames that are coded and the ones that are not. However, five frames per second is fully sufficient to make on online tuning of the threshold values possible. When the values are changed, the effects in the motion picture are seen almost immediately.

The implementation environment has been briefly described in this section. Using the CRAY T3D 710 parallel computer, a performance averaging five frames per second has been obtained when 64 processor elements are used. The performance could be improved, since the C-code developed for the test system was not completely optimized for speed.

Fine Tuning of Threshold Values

Tuning threshold values to give the maximum coding redundancy while keeping visible artifacts at a minimum is now described. The quality of the sequences after a coding of all selected blocks is evaluated by the PSNR and the subjective quality measure described. The threshold values are then used to test the reliability and the robustness of the embedding procedure.

Tuning threshold values

As described, the threshold values are tuned online in two steps.

1. First, the threshold values are tuned individually for each sequence in order to find the optimal set for each of the four sequences.
2. Secondly, to obtain a set of threshold values that applies for all four test sequences, the most conservative threshold values found during the first fine tuning are combined to the final set of values.

To obtain the worst possible situation, the motion vectors of all blocks are changed. If a signature is coded, not all vectors have to be changed, since some already have the value which should be coded.

Individual tuning

FIGS. 8.1, 8.2, 8.3 and 8.4 show the number of blocks selected in the Basketball, Flower-garden, Calendar and LTS sequences using the three different criteria individually and all together, as the sequence is processed using the threshold values specified for each of the sequences in Table 8.1. Since no blocks are selected in any second frame, they are excluded from the plots. The threshold values have been adjusted for the Basketball sequence only. In FIG. 8.1 (basketball sequence), the second hybrid criterion (the shape of the FFT), completely dominates the selection of the blocks, and the third hybrid criterion (size of the motion vectors) dominates toward the end of the sequence. This is a natural consequence of the fact that only fast motion occurs in the latter part of the sequence. In FIGS. 8.2, 8.3 and 8.4, the first hybrid criterion (standard deviation and maximum distance to median) is the most dominating criteria, especially in the LTS sequence. In all the sequences, the number of blocks selected does not increase remarkably when all three criteria are applied simultaneously. This indicates that a majority of the blocks fulfill more than one criteria. Table 8.1 provides the tuned threshold values for each of the four sequences, as well as the final selected values.

TABLE 8.1

| Hybrid Criterion | Threshold values | Basketball | Flower Garden | Calendar | LTS | Final values |
|---|---|---|---|---|---|---|
| First | $C_{\sigma 1}$ | 4.2 | 4.9 | 4.2 | 3.0 | 3.0 |
|  | $C_{hist1}$ | 8.3 | 8.5 | 8.3 | 8.1 | 8.1 |
| Second | $C_{\sigma 2}$ | 6.1 | 5.9 | 4.4 | 5.7 | 4.4 |
|  | $C_{bw2}$ | 0.059 | 0.059 | 0.059 | 0.102 | 0.102 |
|  | $C_{z2}$ | 180 | 180 | 180 | 180 | 180 |
| Third | $C_{\sigma 3}$ | 4.3 | 7.8 | 5.8 | 5.8 | 4.3 |
|  | $C_{size3}$ | 6.0 | 4.6 | 5.7 | 5.9 | 6.0 |

FIG. 8.5 shows the PSNR values after the first tuning versus the frame number for each of the four sequences. The PSNR is calculated using the unchanged compressed and decompressed sequences. FIG. 8.5 shows that the PSNR is remarkably high for all sequences—overall minimum is 49 dB. An interesting observation is that even for the frames that are not coded, the PSNR is not infinitely high, except for the first few frames where no blocks have yet been changed. This is believed to be a result of the quantization of $frame_{dfd}(n)$ in the compression process. As discussed previously, every second frame is left unchanged to avoid an accumulation of the errors introduced. This implies that even though a frame is not coded, it will have a different $frame_{dfd}(n)$ than the corresponding frame in the unchanged sequence. This will most likely produce a different result after the quantization.

Selecting final threshold values

Using the threshold values in the last column of Table 8.1, the number of blocks selected in each sequence when all the threshold values in the previous tuning phase are combined into the most conservative values is illustrated in FIG. 8.6 for each of the four sequences. Every second frame is again eliminated from the plots. The average number of blocks selected is 2.2 for the calendar sequence, 3.2 for the basketball sequence, 41.2 for the flower-garden sequence and 26.5 for the LTS sequence. The average values have been calculated by considering only the frames where blocks are actually selected. To obtain the real rate, divide the values by two. FIG. 8.7 shows the final PSNR values for each of the sequences compared to the unchanged compressed and decompressed sequences. No frames have been excluded from the plots. Compared to FIG. 8.5, the changes are not dramatic; the lowest values have increased slightly.

Each of the four sequences have been shown to three test persons who had no knowledge whatsoever of what artifacts to look for. The results were very satisfactory. None of the three test persons remarked about anything unusual in any of the four sequences after having seen each sequence ten times. Thus, according to the quality measure defined above, all the sequences have a quality of 10.

Appropriate values for the seven threshold values have been found and the quality of the sequences after a selection and coding of blocks has been evaluated. The criteria of a PSNR larger than 40 dB is completely fulfilled with a margin of around 10 dB. The subjective quality measure has confirmed that the quality of the sequences is very high.

Reliability and Robustness

Below, the reliability of an embedded signature is tested with the robustness of the developed embedding method. Each of the four sequences are compared, and the one with the highest reliability is exposed to different kinds of attacks. Then, an attempt is made to retrieve the signature.

Using the final threshold values found in Table 8.1, a 32-bit signature is embedded in each of the four sequences, and then a retrieval attempt is made. FIG. 9.1 shows the number of errors versus the number of processed frames for each of the four sequences. For all four sequences, the number of errors in the retrieved signature decreases as more frames are processed. For the calendar and basketball sequences, the number of errors never reaches the zero level. FIG. 9.2 shows the estimated retrieving reliability versus the number of frames coded (that is, indirectly the number of blocks coded, see FIG. 8.6). As the graph shows, the estimated reliability for the two sequences after 75 frames is around 0.03 for the calendar sequence and 0.1 for the basketball sequence. This means that the number of blocks selected within the 75 frames is not sufficient to get a reliable embedding of the signature in the two sequences. In reality, it is most likely that the sequences will have a much longer duration, since the 75 frames only correspond to 3 seconds of real-time motion picture. Previously it was estimated that around 800 blocks should be embedded to have a high reliability of retrieving the signature again. For the calendar sequence, the average number of coded blocks per second is 27.5, and for the basketball sequence 40. This means that with 29 seconds and 20 seconds of sequences, respectively, a good reliability can be obtained. For the flower-garden sequence and the LTS sequence, the signature is completely retrieved after 16 and 10 frames, respectively. These results are well supported by the estimated embedding "reliabilities" for each of the four sequences which are very close to 1 after 75 frames in both cases, as illustrated in FIG. 9.2. The flower-garden sequence has a slightly higher reliability as a result of a higher number of coded blocks.

It was found that the sequence with the highest retrieving reliability is the flower-garden sequence. To test the robustness of the embedding method, the sequence (with the signature embedded) is exposed to different kinds of attacks, whereupon signature retrieval is attempted. Five different attacks which are applied individually to all the frames are made.

1. A mirroring around the vertical axis.
2. A left-to-right roll of the entire frame by one pixel.
3. A clockwise rotation around the center of the frame by one degree followed by a cropping, to keep the dimensions.
4. A JPEG compression with a quality factor of 90.
5. A JPEG compression with a quality factor of 70.

FIG. 9.3 shows the number of errors in the retrieved signature versus the number of processed frames after independently applying each of the five attacks. As shown, all the curves have a tendency to decrease towards zero, but the curves never go below eight errors for the two JPEG compressions. By the more or less decreasing nature of the two curves, it is thought that in time, with a longer sequence, it would be possible to completely retrieve the signature. For the mirror sequence, the signature is, as expected, retrieved after the same number of frames as if it had not been attacked. In addition, as a very positive result, the signature has been completely retrieved for both the left-rolled sequence and the rotated sequence.

The reliability of the signature embedded in each of the four test sequences has been tested. For the basketball sequence and the calendar sequence, the signature was not completely retrieved, but these results are in agreement with the developed theory. Not enough blocks are embedded during the 75 frames to retrieve the signature. Extending the length of the sequences could compensate for this problem. For the flower-garden and LTS sequences, the signature was completely retrieved, after less than a third of the frames were processed. The robustness of the embedding method has been tested for five different attacks using the flower-garden sequence. The method proved not to be robust against JPEG compression. However, the results indicate that it is likely that robustness will improve with a longer sequence. For mirroring, left-rolling by one pixel and rotation by one degree, the signature was retrieved in all three cases, indicating a good robustness.

Conclusion

The development of a watermarking system for digital motion pictures has been described. One of the major problems with watermarking is the ability to resist changes after a compression and decompression are performed when a motion picture is distributed/broadcasted. The watermark system has been integrated into a MPEG-2 like compression scheme to ensure the presence of the watermark after compression and decompression. The watermark is a 32-bit signature, which is repeatedly coded into the motion picture frames to provide a high redundancy. A secret key is used at the embedding and retrieving time to obtain a higher robustness against hacker attacks. The signatures are retrieved without use of the original motion picture.

At the LTS(Laboratoire de Traitement des Signeaux) department at the Swiss Federal Institute of Technology in Lausanne, a compression scheme has been developed that, as in the MPEG-2 standard, makes use of block-based motion estimation. The developed watermark system has been integrated into this compression scheme. The watermark can be embedded into the motion vectors produced during the compression of the motion picture. This is accomplished by slightly changing, if necessary, the x- and y-coordinates of the motion vectors and thereby encoding a bit in the parity in each of the vector coordinates. Test results show that in approximately 95% of the cases, it is possible to retrieve the embedded bits by repeating the motion estimation procedure on the signed and decompressed motion picture. Using this result, a measure of the reliability as a function of the number of coded vectors/blocks has been developed. The results also show that the quality of the signed motion picture becomes very low if the motion vectors are changed without regard to the content of the texture in the corresponding blocks. Further, if the motion vectors are changed for the same block in two successive frames, an accumulation of the artifacts is made. To avoid this, the watermark is coded in every second frame only.

Three criteria have been developed for determining whether a block should be coded or not. Based on the texture of the blocks, each criterion calculates different measures of how visible it will be if the blocks are changed. For the criteria to be fulfilled, the measures must be within given ranges which are determined by threshold values. If any of the three criteria are fulfilled, the blocks are selected for coding. In all three criteria, the standard deviation of the gray-level values inside a block is used. If the standard deviation is sufficiently small, there is reason to believe that a change of the motion vectors will be invisible. In addition, a maximum value for the maximum distance to the median gray level-value is added for the first criterion. The second criterion gives a measure of how well the energy in the frequency domain should be distributed. The third criterion is based on a minimum size of the motion vector. To ensure the selection of the same blocks at the embedding and retrieving point, the criteria is applied to the previous frame, if possible.

A probabilistic embedding procedure can solve the problems that arise if fewer than 16 blocks can be coded in a frame. The method is based on the fact that on average, if a binary random sequence (B.R.S.) of the same length as the signature is generated, half of the bits will be correct. This property is used to generate a bit sequence that always will have half or more of the bits correct. A B.R.S. is compared to the signature and inverted if more than half of the bits are wrong. The information of whether or not the B.R.S. should be inverted, is then coded in the motion vectors. At the retrieving side, the same information is used to decide whether the newly generated B.R.S.'s should be inverted. To generate the same B.R.S. at the embedding and retrieving point, a seed for the random generator is calculated for each vector that is coded. Since two bits can be coded in each motion vector, two B.R.S.'s with a length of 16 bits are generated for each block.

The complete watermarking system has been implemented on a CRAY T3D 710 massively parallel supercomputer. This has made it possible to obtain a near real time embedding speed, with an average of 5 frames per second. This speed has made it possible to tune the threshold values for the selection criteria online in order to optimize the number of coded blocks contra the decreasing quality. The quality of the embedded sequences after the fine tuning has also been evaluated. The results show that it is possible to obtain, as a minimum, the average of 2.2 blocks selected for coding in every second frame for the calendar sequence, and as a maximum, the average of 41.2 blocks for the flower-garden sequence. The PSNR level for any frame in the signed test sequences was always higher than 50 dB. This good result was supported by visual tests that confirmed the quality of the embedded sequences to be very high.

The reliability and robustness of the signature has also been tested. It was estimated that approximately 800 blocks/vectors should be coded to have a high reliability. The results show that for the basketball sequence and the calendar sequence, the number of selected blocks was not high enough to retrieve the signature completely (2 and 3 bit errors, respectively). This was not surprising when the estimated reliability versus the number of coded blocks was calculated, since the number of coded blocks was significantly less than 800. To improve the reliability, the duration of the sequences could be extended. For the flower-garden sequence and the LTS sequence, the signature was completely retrieved after less than one-fifth of the sequences was processed. These results were supported by high reliability estimates for the two sequences. The results also show a high robustness of the signatures against attacks. After individually applying mirroring, rotation of one degree around the center and a left-to-right rolling of all frames by one pixel, the signature was in each case retrieved for the flower-garden sequence. After a JPEG compression with quality factors 90 and 70, the system failed to retrieve the complete signature. However, the number of errors in the retrieved signature decreased in both cases as the number of processed frames increased. This indicates that with a longer test sequence, the embedded signature would most likely also resist JPEG compression.

Even though not used during the tests, the use of a secret key can easily be added to the watermark system as a part of the calculation of the seed for the random generator.

The developed watermark system fulfills the objectives. The watermark procedure is portable to a MPEG-2 encoder. The watermark is invisibly embedded into the motion picture, using time to dilute the distortion. The reliability increases as the number of signed frames increases and finally, the method has shown good resistance against various attacks. The system could be further improved to achieve an even more reliable and robust watermarking procedure.

Perspectives

The largest disadvantage of one embodiment that codes every other frame is the lack of watermark information in every second frame, which is left uncoded to avoid an accumulation of artifacts. This can be solved by adding a selection mechanism that never selects the same blocks for coding in two successive frames.

As presently implemented, the watermark can be erased if one of the following attacks are made: every second frame is removed; the motion picture is re-signed with another signature; or all blocks that fulfill the selection criteria are changed randomly. The first attack, which implies great loss of quality, can be solved by coding some blocks in every frame with motion information going two frames back instead of one. To avoid a re-signing of the motion picture to erase the old signature, a block selection mechanism based on the secret key, could select blocks for coding by some algorithm, leaving room for another signature to be coded, without erasing all of the old signature. No suggestions for solving the last problem of randomly changing all vectors selected by the criteria has currently been found. However, it is likely that the quality after such an attack would be very low, due to the accumulation of artifacts made when the same block in two successive frames is changed.

A number of factors can improve the reliability. Since the LTS scheme uses CIF format, the number of coded blocks in a PAL format would typically be four times as high. Further, the selection criteria could be optimized or expanded with new criteria. Finally, a new splitting method can significantly improve the reliability. If the splitting of the 32-bit binary random sequence into two 16-bit B.R.S.'s is changed to B.R.S.'s of 15 bits and 17 bits, the probability for a given bit to be correct can be improved. The new split ensures that more than half of the bits in each B.R.S. always will be correct after a possible inversion. The improvements in the reliability by using this new splitting method has been estimated to be approximately a factor of two.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for embedding and retrieving information in a video signal, the method comprising the steps of:

selecting a first subset and a second subset of the video signal;

determining a relationship between the first subset and the second subset of the video signal;

changing the relationship between the first subset and the second subset of the video signal, wherein the step of changing includes encoding the information into the video signal to produce a changed video signal having a changed relationship; and detecting the changed relationship from the changed video signal and, from the detected changed relationship, retrieving the encoded information;

wherein the first subset belongs to one frame and the second subset belongs to a different frame of the video signal.

2. The method according to claim 1, wherein the step of selecting includes selecting image element subsets using one or more visual perception criteria.

3. The method according to claim 1, wherein the first and second subsets each represent rectangular blocks in the frames of the video signal.

4. The method according to claim 1, wherein the step of selecting includes selecting visually similar subsets.

5. The method according to claim 4, wherein the relationship is a motion between selected subsets.

6. The method according to claim 5, wherein the steps of selecting, or changing the relationship, or both, include using a key to encrypt the encoding of the information into the changed relationship.

7. A system for embedding digital information into a video signal such that the digital information can later be retrieved, the digital information including a plurality of bits, the system comprising:

a selector that selects a first subset and a second subset of the video signal;

a comparator that determines a relationship between the first subset and the second subset of the video signal; and a changer that changes the relationship between the first subset and the second subset of the video signal by encoding the information into the video signal to produce a changed video signal having a changed relationship;

wherein the first subset belongs to one frame and the second subset belongs to a different frame of the video signal.

8. The system according to claim 7, wherein the selector selects image element subsets using one or more visual perception criteria.

9. The system according to claim 7, wherein the first and second subsets each represent rectangular blocks in the frames of the video signal.

10. The system according to claim 7, wherein the step of selecting includes selecting visually similar subsets.

11. The system according to claim 10, wherein the relationship is a motion between selected subsets.

12. The system according to claim 11, wherein the changer uses an encryption key to encrypt the information.

13. The system according to claim 11, wherein the selector uses an encryption key to select subsets in order to encrypt a location of the information.

14. The system according to claim 11, wherein the selector and/or changer use an encryption key in order to encrypt the encoding of the information into the changed relationship.

15. A method for embedding a retrievable watermark into a video signal, the video signal providing a series of video frames including a first frame and a second frame, the method comprising the steps of:

detecting a change between the first frame and the second frame;

producing change information based on the change; and encoding the retrievable watermark into the change information.

16. A method for embedding a retrievable watermark into a video signal, the video signal providing a series of video frames including a first frame and a second frame, the method comprising the steps of:

detecting a change between the first frame and the second frame;

producing change information based on the change; and encoding the watermark into the change information;

wherein the step of encoding modifies a motion vector based on the watermark.

17. The method according to claim 16, wherein the step of encoding includes using a encryption key to encrypt the encoding of the watermark into the change information.

18. The method according to claim 16, further comprising the step of:

obtaining a set of motion vectors $V(n)=\{v_1, v_2, \ldots v_n\}$, where $V_i=(x_i, y_i)$, $i=1, 2, \ldots, m$, and m is the number of blocks in each frame, on basis of frame(n−1) by a minimum mean-square-error fit of each block in frame (n), and wherein the step of encoding uses the set of obtained motion vectors.

19. The method according to claim 16, further comprising the step of:

selecting the subset of blocks based on criteria that are met by blocks in frame$_d$(n−1), and wherein the step of encoding uses the selected subset of blocks.

20. The method according to claim 16, further comprising the step of:

selecting the subset of blocks based on criteria that include a threshold value $C_{hist}$: max $(|x_m-x_i|)<C_{hist}$, I=1, 2, ..., M where $x_m$ is the median value, M is the number of pixels in the block and $C_{hist}$ (histogram criterion) is the maximum-allowed distance to the median value, wherein the difference in pixel intensity from the median intensity for surrounding pixels is smaller than the threshold value $C_{hist}$, and wherein the step of encoding uses the selected subset of blocks.

21. The method according to claim 16, further comprising the step of:

selecting the subset of blocks based on criteria that include a threshold value $C_\sigma$, wherein a block is selected if $\sigma < C_\sigma$ where $C_\sigma$ (standard deviation criterion) is a threshold value determining the visible limit, and wherein a standard deviation σ is calculated for the block b(k) using a definition $$\sigma = \sum_{i=1}^{M} \frac{(x_i - \bar{x})^2}{M-1}$$

where $$\bar{x} = \sum_{i=1}^{M} \frac{x_i}{M},$$

x is the gray-level value, and M is the number of pixels in the image, and wherein the step of encoding uses the selected subset of blocks.

22. The method according to claim 16, further comprising the step of:

selecting the subset of blocks based on criteria that include a threshold value $C_\sigma$, and a block is selected if, a standard deviation ($\sigma_{xy}$ of the pixel gray-level values inside a block plus a band around the block) is less or equal to a given threshold value $C_\sigma$: $\sigma_{xy} \leq C_\sigma$ where $C_\sigma$ (standard deviation criterion) is a threshold value determining the visible limit, and wherein a standard deviation σ is calculated for the block b(k) using a definition $$\sigma = \sum_{i=1}^{M} \frac{(x_i - \bar{x})^2}{M-1}$$

where $$\bar{x} = \sum_{i=1}^{M} \frac{x_i}{M},$$

x is the gray-level value, and M is the number of pixels in the image, and wherein the step of encoding uses the selected subset of blocks.

23. The method according to claim 16, further comprising the step of:

selecting the subset of blocks based on criteria that include a threshold value $C_{size}$, wherein a magnitude of a motion vector v is larger than or equal to a given threshold value $C_{size}$: $|\vec{v}| \geq C_{size}$ where $\vec{v}$ is the motion vector and $C_{size}$ (motion-vector size criterion) is the minimum size of the motion vector, and wherein the step of encoding uses the selected subset of blocks.

24. The method according to claim 16, further comprising the step of:

selecting the subset of blocks based on criteria that include:

a first hybrid criterion including a first criterion for standard deviation combined with a criterion for maximum distance to the median;

a second hybrid criterion including a second criterion for standard deviation combined with a criterion for a shape of the frequency plot; and a third hybrid criterion including a third criterion for standard deviation combined with a criterion for size of the motion vectors, and wherein the step of encoding uses the subset of blocks.

25. A method for embedding digital information into a video signal such that the digital information can later be retrieved; the digital information including a plurality of bits, the video signal providing a series of video frames including a first frame and a subsequent second frame, the first frame being subdivided into a plurality of blocks, the method comprising the steps of:

obtaining a motion vector for each one of a subset of the blocks in the first frame, each motion vector representative of a displacement between a block in the first frame and a corresponding block in the second frame; and modifying one or more of said motion vectors based on a value of one or more bits of said digital information such that the digital information can later be retrieved.

26. The method according to claim 25, further comprising the step of:

selecting the subset of blocks based on criteria that are met by blocks in frame$_d$(n−1).

27. A method for embedding digital information into a video signal such that the digital information can later be retrieved; the digital information including a plurality of bits, the video signal providing a series of video frames including a first frame and a subsequent second frame, the first frame being subdivided into a plurality of blocks, the method comprising the steps of:

obtaining a motion vector for each one of a subset of the blocks in the first frame, each motion vector representative of a displacement between a block in the first frame and a corresponding block in the second frame; and modifying one or more of said motion vectors based on a value of one or more bits of said digital information;

wherein the digital information includes a signature having a predefined bitset S(I), I=1, 2, . . . , L, where L is the number of bits in the signature, and wherein the step of modifying modifies a component of the motion vector based on one or more bits of said digital information.

28. A method for embedding digital information into a video signal, the video signal providing a series of video frames including a first frame and a subsequent second frame, the method comprising the steps of:

detecting a motion between the first frame and the second frame;

producing a motion vector set based on the motion;

selecting change information that includes a suitable subset of the motion vector set that is suitable for coding; and encoding the digital information into the change information such that the digital information can later be retrieved.

29. The method according to claim 28, wherein the step of encoding includes using a key to encrypt the encoding of the information into the change information.

30. A watermarking system for embedding digital information into a video signal such that the digital information can later be retrieved; the digital information including a plurality of bits, the video signal providing a series of video frames including a first frame and a subsequent second frame, the first frame being subdivided into a plurality of blocks, the watermarking system comprising:

a block-based motion-estimation (BBME) coder, and wherein the BBME coder generates a motion vector for each one of a subset of the blocks in the first frame, each motion vector representative of a displacement between a block in the first frame and a corresponding block in the second frame; and a motion-vector modifier coupled to an output of the BBME coder that modifies one or more of said motion vectors based on a value of one or more bits of said digital information.

31. The watermarking system according to claim 30, wherein the subset of blocks is selected based on criteria that include:

a first hybrid criterion including a first criterion for standard deviation combined with a criterion for maximum distance to the median;

a second hybrid criterion including a second criterion for standard deviation combined with a criterion for a shape of the frequency plot; or a third hybrid criterion including a third criterion for standard deviation combined with a criterion for size of the motion vectors.

32. A storage medium having a computer program stored thereon for causing a suitably programmed system to embed information in a video signal by performing the following steps when such program is executed on the system:

selecting a first subset and a second subset of the video signal;

determining a relationship between the first subset and the second subset of the video signal; and changing the relationship between the first subset and the second subset of the video signal, wherein the step of changing includes encoding the information into the video signal to produce a changed video signal having a changed relationship;

wherein the first subset belongs to one frame and the second subset belongs to a different frame of the video signal.

33. The storage medium of claim 32, wherein the computer program comprises programming for further causing the system, when such program is executed on the system, to perform the following additional step:

detecting the changed relationship from the changed video signal and, from the detected changed relationship, retrieving the encoded information.

34. The storage medium of claim 32, wherein in the step of determining a relationship, the relationship is a motion between selected subsets.

35. The storage medium of claim 32, wherein the steps of selecting, or changing the relationship, or both, include using a key to encrypt the encoding of the information into the changed relationship.

36. A data structure for holding video information, the video information having embedded digital information such that the digital information can be retrieved from the video information, the digital information including a plurality of bits, the data structure comprising:

a plurality of video frames, each frame being subdivided into a plurality of blocks; and a plurality of motion vectors, each one of said motion vectors associated with one block of a selected subset of the plurality of blocks, each motion vector representative of a displacement between a block in one frame and a corresponding block in a different frame, wherein the plurality of motion vectors has been modified based on a value of one or more bits of said digital information.

* * * * *